United States Patent [19]

Counselman, III

[11] Patent Number: 4,809,005
[45] Date of Patent: Feb. 28, 1989

[54] MULTI-ANTENNA GAS RECEIVER FOR SEISMIC SURVEY VESSELS

[75] Inventor: Charles C. Counselman, III, Belmont, Mass.

[73] Assignee: Western Atlas International, Inc., Houston, Tex.

[21] Appl. No.: 147,123

[22] Filed: Jan. 21, 1988

Related U.S. Application Data

[63] Continuation of Ser. No. 35,662, Apr. 6, 1987, which is a continuation-in-part of Ser. No. 852,016, Apr. 14, 1986, which is a continuation-in-part of Ser. No. 353,331, Mar. 1, 1982.

[51] Int. Cl.⁴ .................................... H04B 7/185
[52] U.S. Cl. .................................. 342/352; 342/357
[58] Field of Search .................. 342/352, 357; 375/1

[56] References Cited

U.S. PATENT DOCUMENTS

| | | | |
|---|---|---|---|
| 3,860,921 | 1/1975 | Wood | 342/109 |
| 3,900,873 | 8/1975 | Bouvier et al. | 342/103 |
| 3,906,204 | 9/1975 | Rigdon et al. | 342/357 X |
| 3,943,514 | 3/1976 | Afendykiw et al. | 342/156 |
| 4,045,796 | 8/1977 | Kline | 342/103 |
| 4,054,879 | 10/1977 | Wright et al. | 342/192 |
| 4,114,155 | 9/1978 | Raab | 342/394 |
| 4,170,776 | 10/1979 | McDoran | 342/458 |
| 4,232,389 | 11/1980 | Loiler | 455/12 |
| 4,368,469 | 1/1983 | Ott et al. | 342/352 |
| 4,443,799 | 4/1984 | Rubin | 375/1 X |
| 4,445,118 | 4/1984 | Taylor et al. | 342/357 |
| 4,455,651 | 6/1984 | Baran | 375/1 X |
| 4,463,357 | 7/1984 | MacDoran | 342/460 |
| 4,468,793 | 8/1984 | Johnson et al. | 342/460 |
| 4,484,335 | 11/1984 | Mosley et al. | 375/1 |
| 4,578,678 | 3/1986 | Hurd | 342/357 |
| 4,601,005 | 7/1986 | Kilvington | 375/1 |
| 4,613,864 | 9/1986 | Hofgen | 342/352 |
| 4,613,977 | 9/1986 | Wong et al. | 324/420 X |
| 4,652,884 | 3/1987 | Starker | 342/357 |
| 4,656,642 | 4/1987 | Apostolos et al. | 375/1 |
| 4,672,382 | 6/1987 | Fukuhara et al. | 342/357 |

FOREIGN PATENT DOCUMENTS 852191 5/1985 Norway .

OTHER PUBLICATIONS

Charles C. Counselman III, "Radio Astrometry", Annual Reviews of Astrometry and Astrophysics, vol. 14, 1976, pp. 197–214.

(List continued on next page.)

Primary Examiner—Theodore M. Blum
Assistant Examiner—John B. Sotomayor
Attorney, Agent, or Firm—Norman E. Brunell; E. Eugene Thigpen

[57] ABSTRACT

Method and apparatus are disclosed for accurately determining position from GPS satellites and received on a ship using observations of C/A code group delay, L1 band center frequency carrier phase, L1 band 5.115 MHz implicit carrier phase, and L2 band 5.115 MHz implicit carrier phase. A precise measurement of the range to each satellite is made based upon the L1 center frequency carrier phase. A correction for ionospheric effects is determined by simultaneous observation of the group delays of the wide bandwidth P code modulations in both the L1 and L2 bands. These group delays are determined by measuring the phases of carrier waves implicit in the spread-spectrum signals received in both bands. These carriers are reconstructed from both the L1 and L2 band signals from each satellite without using knowledge of the P code. The unknown biases in the L1 center frequency carrier phase range measurements are determined from simultaneous, pseudorange measurements, with time averaging. The instantaneous position of the antenna receiving these signals, and therefore the ship, may then be determined from the ranges so determined, with both the bias and the ionospheric effects having been eliminated. Additional antennas are positioned on the ship and a seismic streamer towed by the ship to reject false signals, compensate for blockage of signals by the ship's structure, and determine the position of sensors in the streamer.

9 Claims, 25 Drawing Sheets

OTHER PUBLICATIONS

Counselman, Shapiro, Greenspan and Cox, "Backpack VLBI Terminal with Subcentimeter Capability", NASA Conference Publication 2115—Radio Interferometry Techniques for Geodesy, 1980, pp. 409–414.

Counselman, Gourevitch, King, Herring, Shapiro, Greenspan, Rogers, Whitney and Cappallo, "Accuracy of Baseline Determinations by MITES Assessed by Comparison with Tapes, Theodolite, and Geodimeter Measurements", EOS, The Transactions of the American Geophysical Union, vol. 62, Apr. 28, 1981, p. 260.

Counselman and Shapiro, "Miniature Interferometer Terminals for Earth Surveying", Bulletin Geodesique, vol. 53, 1979, pp. 139–163.

W. O. Henry, "Some Developments in Loran", Journal of Geophysical Research, vol. 65, Feb. 1960, pp. 506–513.

Pierce, "Omega", IEEE Transactions on Aerospace and Electronics Systems, Vol. AES-1, No. 3, Dec. 1965, p. 206–215.

J. J. Spilker, Jr., "GPS Signal Structure and Performance Characteristics", Navigations, vol. 25, No. 2, 1978, pp. 121–146.

Bossler, Goad and Bender, "Using the Global Positioning Systems (GPS) for Geodetic Positioning", Bulletin Geodesique, vol. 54, 1980, pp. 553–563.

Alan E. E. Rogers, "Broad-Band Passive 90° RC Hybrid with Low Component Sensivity for Use in the Video Range of Frequencies", Proceedings of the IEEE, vol. 59, 1971, pp. 1617–1618.

M. L. Meeks, Editor, Methods of Experimental Physics, vol. 12, (Astrophysics), Part C (Radio Observations), 1976, pp. v–ix and as follows: Chapter 5.3: J. M. Moran, "Very Long Baseline Interferometer Systems", pp. 174–197, Chapter 5.5: J. M. Moran, "Very Long Baseline Interferometric Observations and Data Reduction", pp. 228–260, Chapter 5.6: I. I. Shapiro, "Estimation of Astrometric and Geodetic Parameters", pp. 261–276.

Counselman and Gourevitch, "Miniature Interferometer Terminals for Earth Surveying: Ambiguity and Multipath with Global Positioning Systems", IEEE Transactions on Geoscience and Remote Sensing, vol. GE-19, No. 4, Oct. 1981, pp. 244–252.

Counselman and Shapiro, "Miniature Interferometer Terminals for Earth Surveying", Proceedings of the 9th GEOP Conference, An International Symposium on the Applications of Geodesy to Geodynamics, Oct. 2–5, 1978, Dept. of Geodetic Science Report No. 280, The Ohio State University, 1978, pp. 65–85.

Peter F. MacDoran, "Satellite Emission Radio Interferometric Earth Surveying Series-GPS Geodetic System", Bulletin Geodesique, vol. 53, 1979, pp. 117–138.

Peter F. MacDoran, "Series—Satellite Emission Radio Interferometric Earth Surveying", Third Annual NASA Geodynamics Program Review, Crustal Dynamics Project, Geodynamics Research, Jan. 26–29, 1981, Goddard Space Flight Center, p. 76 (plus) Three View Graph Figures entitled: Satellite L-Band Ionospheric Calibration (SLIC); Series One-Way Range Receiver Simplified Block Diagram; and Series Receiver Range Synthesis.

Peter F. MacDoran, "Satellite Emission Range Inferred Earth Surveying, Series—GPS", JPL, presented at Defense Mapping Agency Meeting, Feb. 9, 1981, 13 pp.

MacDoran, Spitzmesser and Buennagel, "Series: Satellite Emission Range Inferred Earth Surveying", Presented at the Third International Geodetic Symposium on Satellite Doppler Positioning, Las Cruces, N.M., Feb. 1982, 23 pp.

MacDoran, Spitzmesser and Buennagel, "Series: Satellite Emission Range Inferred Earth Surveying", Proceedings of the 3rd International Geodetic Symposium on Satellite Doppler Positioning, vol. 2, 1982, pp. 1143–1164.

"Operating Manual STI Model 5010 GPS Receiver", Stanford Telecommunications Inc., STI-O & M-8707B, Feb. 25, 1980, selected pages as follows: Title page, i–iv, 1–1, 1–3, 2–1 through 2–5, 3–1 through 3–3, 6–1 through 6–9.

"Pioneer Venus Project, Differenced Long-Baseline Interferometry Experiment, Design Review Document", NASA Ames Research Center, Moffett Field, Calif., Jul. 1, 1977, 23 pp.

C. Goad, "Visit with P. MacDoran, Aug. 6, 1981", Memo to Capt. Bossler, sent to Dr. Counselman, Aug. 12, 1981, 3 pp.

Peter F. MacDoran, Statements made at the 3rd International Geodetic Symposium on Satellite Doppler Positioning, Feb. 1982.

(List continued on next page.)

OTHER PUBLICATIONS

A. E. E. Rogers, C. A. Knight, H. F. Hinteregger, A. R. Whitney, C. C. Counselman III, I. I. Shapiro, S. A. Gourevitch and T. A. Clark, "Geodesy by Radio Interferometry: Determination of a 1.24-km Base Line Vector with 5-mm Repeatability", J. Geophysics. Res., vol. 83, pp. 325-334, 1978.

W. E. Carter, A. E. E. Rogers, C. C. Counselman III, and I. I. Shapiro, "Comparison of Geodetic and Radio Interferometric Measurements of the Haystack-Westford Base Line Vector", J. Geophysics. Res., vol. 85, pp. 2685-2687, 1980.

R. A. Preston, R. Ergas, H. F. Hinteregger, C. A. Knight, D. S. Robertson, I. I. Shapiro, A. R. Whitney, A. E. E. Rogers, and T. A. Clark, "Interferometric Observations of an Artificial Satellite", Science, vol. 178, pp. 407-409, 1972.

C. C. Counselman, III and I. I. Shapiro, "Miniature Interferometer Terminals for Earth Surveying", Proc. of the 2nd Int.'l Geodetic Symposium of Satellite Doppler Positioning, vol. 2, pp. 1237-1286, 1979, (avail. from Appl. Res. Lab., University of Texas, Austin, Tex. 78758).

R. J. Anderle, "Application of the NAVSTAR GPS Geodetic Receiver to Geodsey and Geophysics", Naval Surface Weapons Center Tech. Rept., No. 80-282, 27, pp., 1980.

J. J. Spilker, Jr., Digital Communications by Satellite, Prentice-Hall, Englewood Cliffs, N.J., pp. 302-303, 1977.

P. L. Bender, "A Proposal to the National Aeronautics and Space Administration for the Support of GPS Satellite Orbit Determination Using the Reconstructed Carrier Phase Method for Tracking", Quantum Physics Division, National Bureau of Standard, Boulder, Colo., pp. 1-12, submitted Aug. 5, 1980.

Peter L. Bender, National Bureau of Standards, Private Communication, 1978.

C. C. Counselman III, D. H. Steinbrecher, "The Macrometer TM: A Compact Radio Interferometry Terminal for Geodesy with GPS", Proceedings of the Third International Geodetic Symposium on Satellite Doppler Positioning, pp. 1165-1172, Feb. 8-12, 1982.

C. C. Counselman III, R. J. Cappallo, S. A. Gourevitch, R. L. Greenspan, T. A. Herring, R. W. King, A. E. E. Rogers, I. I. Shapiro, R. E. Snyder, D. H. Steinbrecher, and A. R. Whitnet, "Accuracy of Relative Positioning by Interferometry with GPS: Double-Blind Test Results", Proceedings of the Third International Geodetic Symposium on Satellite Doppler Positioning, pp. 1173-1176, Feb. 8-12, 1982.

R. L. Greenspan, A. Y. Ng, J. M. Przyjemski, & J. D. Veale, "Accuracy of Relative Positioning by Interferometry with Reconstructed Carrier GPS: Experimental Results", Proceedings of the Third International Geodetic Symposium on Satellite Doppler Positioning, pp. 1177-1198, Feb. 8-12, 1982.

T. P. Yunck, "An Introduction to Series-X", Jet Propulsion Laboratory, California Institute of Technology, NASA Contract NAS 7-1000, Nov. 1982.

Buennagel, MacDoran, Neilan, Spitzmesser & Young, "Satellite Emission Range Inferred Earth Survey (Series) Project: Final Report on Research and Development Phase, 1979 to 1983", JPL Publication 84 16, Mar. 1, 1984.

Crow, Bletzacker, Najarian, Purcell, Statman & Thomas, "Series-X Final Engineering Report", JPL D-1476, Aug. 1984.

MacDoran, Whitcomb & Miller, "Cordless GPS Positioning Offers Sub-Meter Accuracy", Sea Technology, Oct. 1984.

MacDoran, Miller, Buennagel & Whitcomb, "Cordless Systems for Positioning with Navstar-GPS", First International Symposium on Precise Positioning with the Global Positioning System, Positioning with GPS—1985, Apr. 15-19, 1985.

James Collins, "GPS Surveying Techniques", ACSM Bulletin, Jun. 1985, pp. 17-20.

Ron L. Hatch, "The Synergism of GPS Code and Carrier Measurements", Proceedings of the Third International Geodetic Symposium on Satellite Doppler Positioning, pp. 1213-1231, Feb. 8-12, 1982.

"Proposal for a GPS Geodetic Receiver", The Johns Hopkins University Applied Physics Laboratory, Apr. 1980.

Phil Ward, "An Advanced Navstar GPS Geodetic Receiver", Proceedings of the Third International Geodetic Symposium on Satellite Doppler Positioning, pp. 1213-1231, Feb. 8-12, 1982.

Javad Ashjaee, "GPS Doppler Processing for Precise Positioning in Dynamic Applications", IEEE Oceans '85, Nov. 1985.

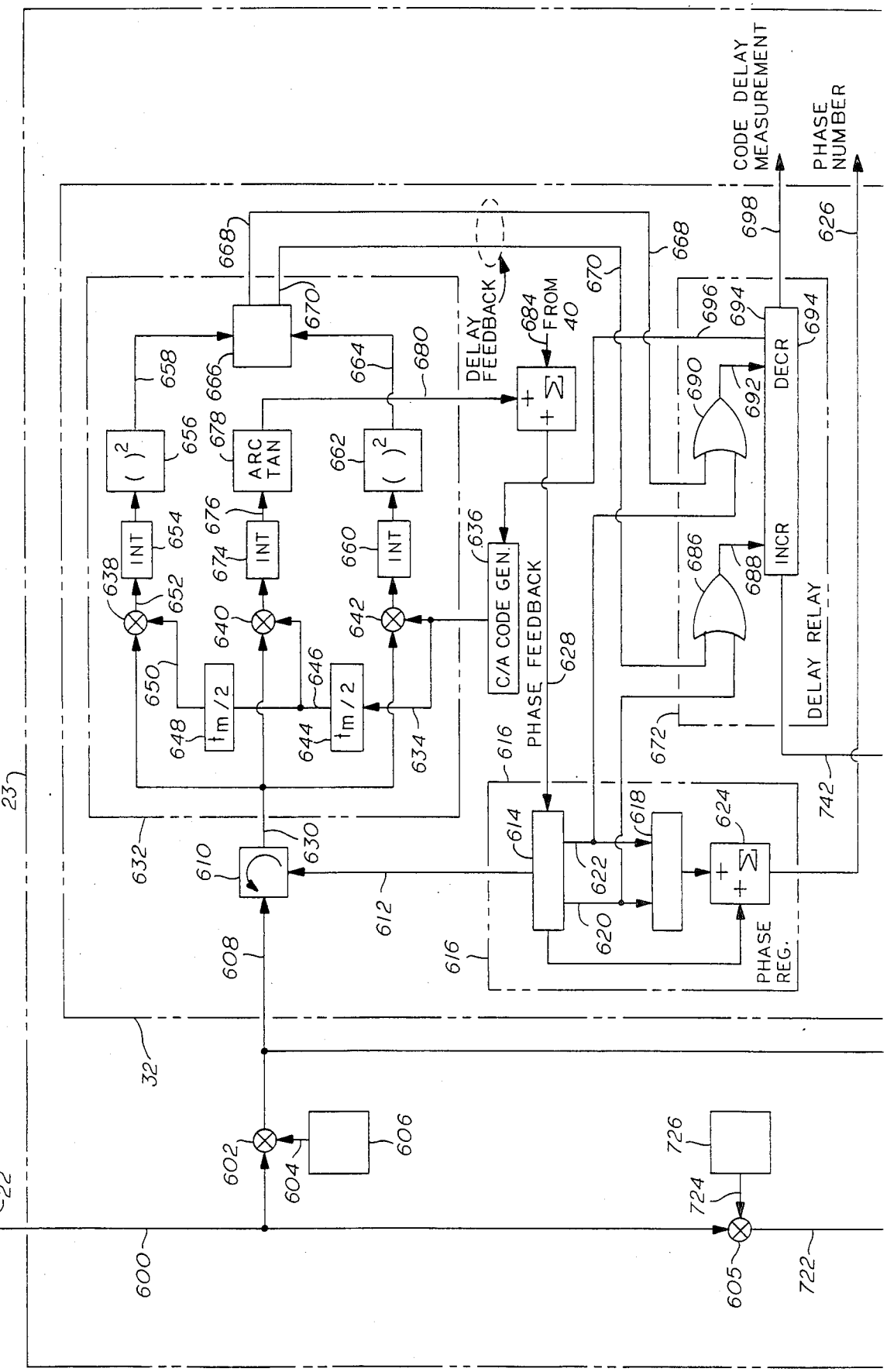

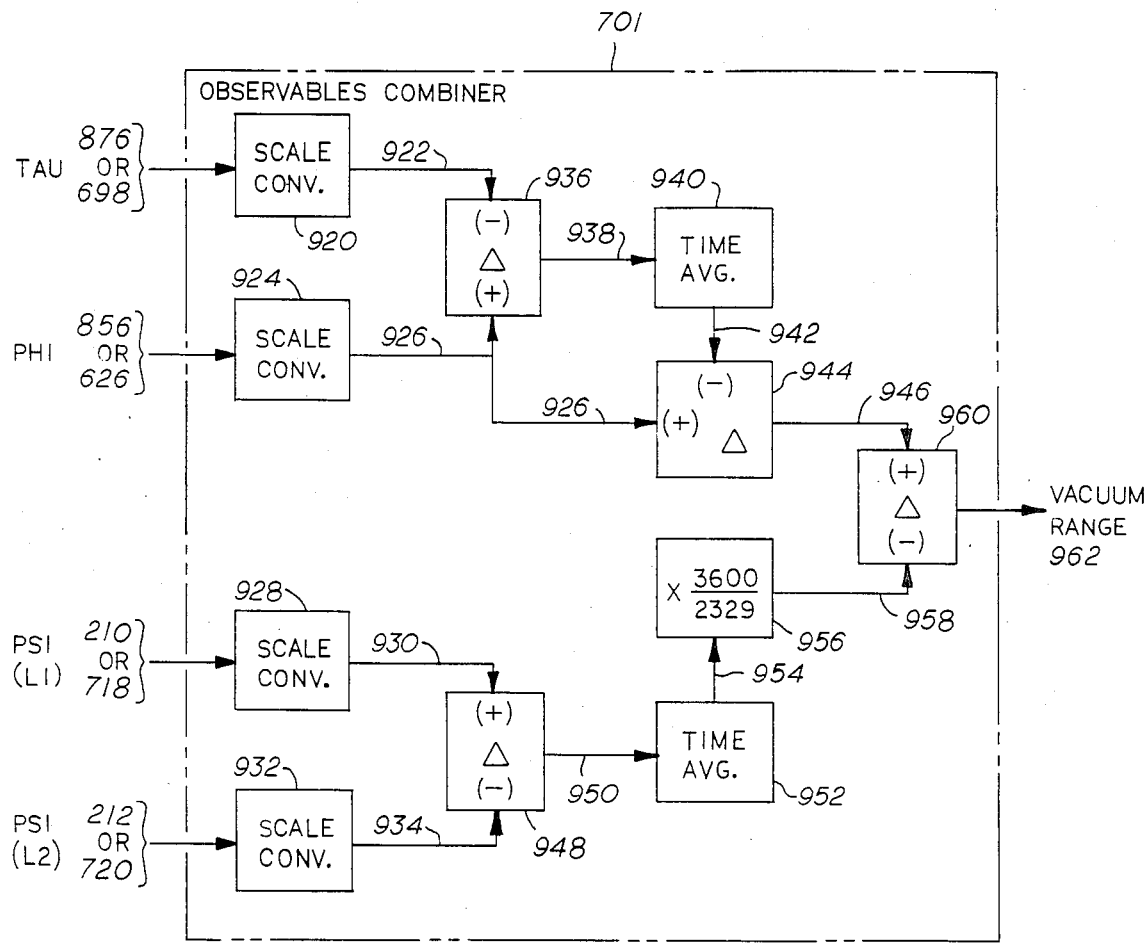
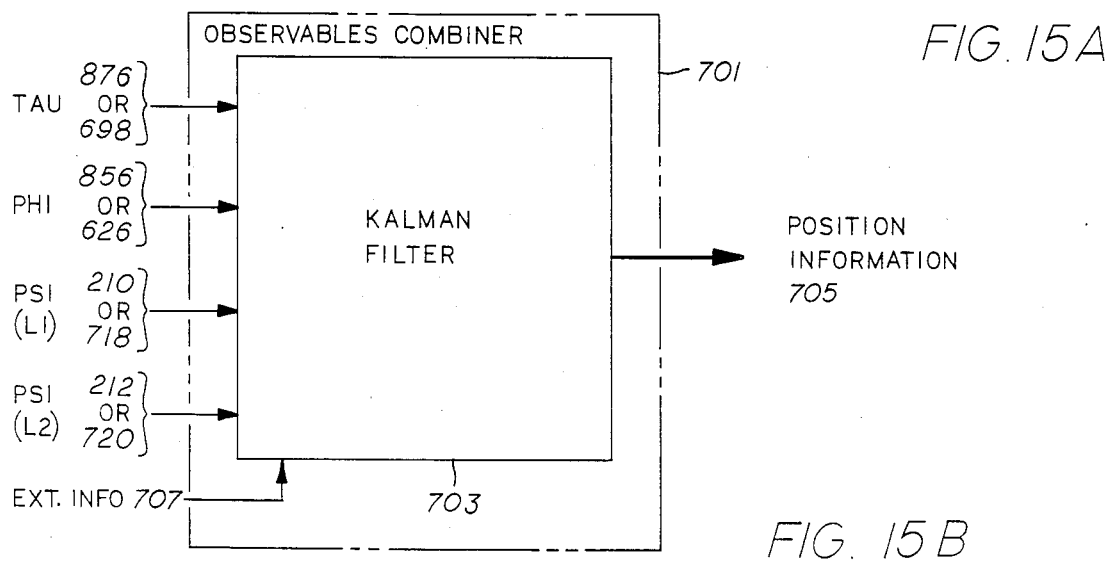
FIG. 15A
FIG. 15B

KALMAM FILTER PARAMETERS

| STATE VARIABLE | SIGMA | CORRELATION TIME T |
|---|---|---|
| LATITUDE (LAT.) | ZERO | -- |

[LATITUDE IS GIVEN EXACTLY BY THE INTEGRAL OF D(LAT)/DT.]

| | | |
|---|---|---|
| LONGITUDE (LON.) | ZERO | -- |

[LONGITUDE IS GIVEN EXACTLY BY THE INTEGRAL OF D(LON.)/DT.]

| | | |
|---|---|---|
| HEIGHT (HGT.) | 10 METERS | $10^4$ SECONDS |
| D (LAT.)/DT | 3 METERS/SEC | $10^4$ SECONDS |
| D (LON.)/DT | 3 METERS/SEC | $10^4$ SECONDS |
| DELTA LAT. | 5 METERS | 4 SECONDS |
| DELTA LON. | 5 METERS | 4 SECONDS |
| DELTA HGT. | 5 METERS | 4 SECONDS |
| CLOCK EPOCH | $7 \times 10^{-6}$ SEC | $10^{12}$ SECONDS |
| CLOCK RATE | $7 \times 10^{-9}$ SEC/SEC | $10^{12}$ SECONDS |

[THE EPOCH ERROR OF THE CLOCK IS GIVEN BY THE SUM OF THE "CLOCK EPOCH" PROCESS AND THE INTEGRAL OF THE "CLOCK RATE" PROCESS CHARACTERIZED ABOVE.]

| | | |
|---|---|---|
| PHI BIAS (EACH SAT.) | 20 CENTIMETERS | $10^8$ SECONDS |
| IONOSPHERE AT L1 | 10 METERS | $6 \times 10^4$ SECONDS |

FIG. 15C

MULTI-ANTENNA GAS RECEIVER FOR SEISMIC SURVEY VESSELS

BACKGROUND OF THE INVENTION

This is a continuation of co-pending application Ser. No. 035,662, filed on Apr. 6, 1987, which is a continuation-in-part of U.S. patent application Ser. No. 852,016 filed on Apr. 14, 1986 in the name of Charles C. Counselman III, which itself is a continuation-in-part of U.S. patent application Ser. No. 353,331 filed on Mar. 1, 1982, also filed in the name of Charles C. Counselman III.

The present invention relates generally to an improved method and system for measuring position on earth from a moving platform, such as a ship, using signals from the NAVSTAR Global Positioning System satellites, commonly called GPS satellites. In particular, the present invention relates to civilian GPS receivers, that is, receivers which do not utilize knowledge of the potentially unavailable P code component of the GPS signals to determine position information.

Conventional civilian GPS receivers utilize simultaneous pseudorange, in other words, group delay observations of the C/A code components of the L1 band signals received from a plurality of GPS satellites to determine position information. A major source of position errors with such conventional GPS receivers is multipath. Multipath errors may be reduced by time averaging of observations made from a fixed position. Conventional time averaging, however, cannot be used to improve the accuracy of receivers on ships because the resultant position information would relate to the average position of the ship during the observation period, not the instantaneous position.

Position errors also result from ionospheric group delay effects in such pseudorange measurements. The magnitude of the delay encountered by a signal in the ionosphere varies with local conditions and cannot be predicted with sufficient accuracy to be eliminated from position measurements made by GPS receivers. The magnitudes of such errors are frequency dependent, however, and can be determined from simultaneous measurements of signals in different frequency bands. In particular, the GPS system was designed so that simultaneous measurement of signals in the L1 and L2 bands could be used to determine ionospheric delay. This technique is routinely used in military GPS receivers. Conventional civilian receivers measure the C/A code group delay in the L1 band, but cannot make L2 band C/A code group delay measurements because the C/A code modulation is not presently applied to signals transmitted in the L2 band. Simultaneous measurements therefore can not be conveniently made for both L band signals.

In general, conventional civilian receivers are limited in accuracy because of their reliance on group delay, and because of their requirement for knowledge of a code modulating the signals in a GPS band in order to measure the group delay of the signals received in that band.

The present invention specifically relates to the use of civilian GPS receivers utilizing multiple antennas on seismic survey ships and on the seismic survey streamers towed thereby for determining the position of the ship as well as the position or shape of the streamer as it is towed through water. Conventional seismic survey vessels utilize various combinations of satellite and inertial navigation systems to navigate the ship and determine the position thereof, but the information determined concerning the position and shape of the streamer during the survey is often quite limited. Many times the information available concerning the actual position of the streamer during the survey is limited to an observation that a visually identifiable flag flown from a tail buoy dragged by the streamer indicates that the streamer is being towed directly behind the ship.

Such indications are useful for determining that the streamer has recovered from the effects a major change in ship direction, such as a 180° turn, so that recording of survey information can continue. These indications, however, are not usually sufficient to permit complete use of the more sophisticated forms of seismic surveys presently being developed, some of which are called 3-D surveys.

For these more sophisticated forms of seismic survey work, it is desirable to know the exact location of the streamer, and its sensors, during the survey so that information collected during one part of the survey at a particular location may be used to improve or interpret information collected at a different location during another part of the survey or even during another survey. In order to utilize such information it is necessary to know very accurately the position of the sensors detecting the information at the time of the detection.

SUMMARY OF THE INVENTION

The present invention provides method and apparatus for accurately determining position information using signals transmitted by GPS satellites and received on moving platforms, such as ships, independent of knowledge of the P code component of the signals. A precise measurement of the ship's range to each satellite is made based upon the L1 center frequency carrier phase. A correction for ionospheric effects is determined by simultaneous observation of the group delays of the wide bandwidth P code modulations in both the L1 and L2 bands. These group delays are determined by measuring the phases of carrier waves implicit in the spread-spectrum signals received in both bands. These carriers are reconstructed from both the L1 and L2 band signals from each satellite without using knowledge of the P code. The unknown biases in the L1 center frequency carrier phase range measurements are determined from simultaneous, pseudorange measurements, with time averaging. The instantaneous position of the ship may then be determined from the ranges so determined, with both the bias and the ionospheric effects having been eliminated.

In particular, the present invention provides method and apparatus for accurately determining position information related to ships and streamers towed thereby, using signals transmitted by GPS satellites and received by multiple antennas on the ship and the streamer, independent of knowledge of the P code component of the signals. The position of each antenna, and or the baselines there between, is determined in order to reject identified multipath signals, determine ship orientation and times of satellite obscuration by shipboard superstructure and to determine the positions of antennas related to the streamer to accurately determine sensor position.

BRIEF DESCRIPTION OF THE DRAWINGS

In the drawings wherein like reference numerals represent like parts:

FIG. 15, including FIGS. 15A, 15B and 15C shows alternate embodiments of observables combiners for combining 308 $f_o$ implicit carrier phase observable $\phi$, C/A code group delay observable $\tau$, L1 band implicit $f_o$ carrier phase observable $\psi_{L1}$ and L2 band implicit $f_o$ carrier phase observable $\psi_{L2}$ to unambiguously determine position relatively free from ionospheric degradation.

DETAILED DESCRIPTION OF PREFERRED EMBODIMENT

1. The GPS SYSTEM

Figure 1:
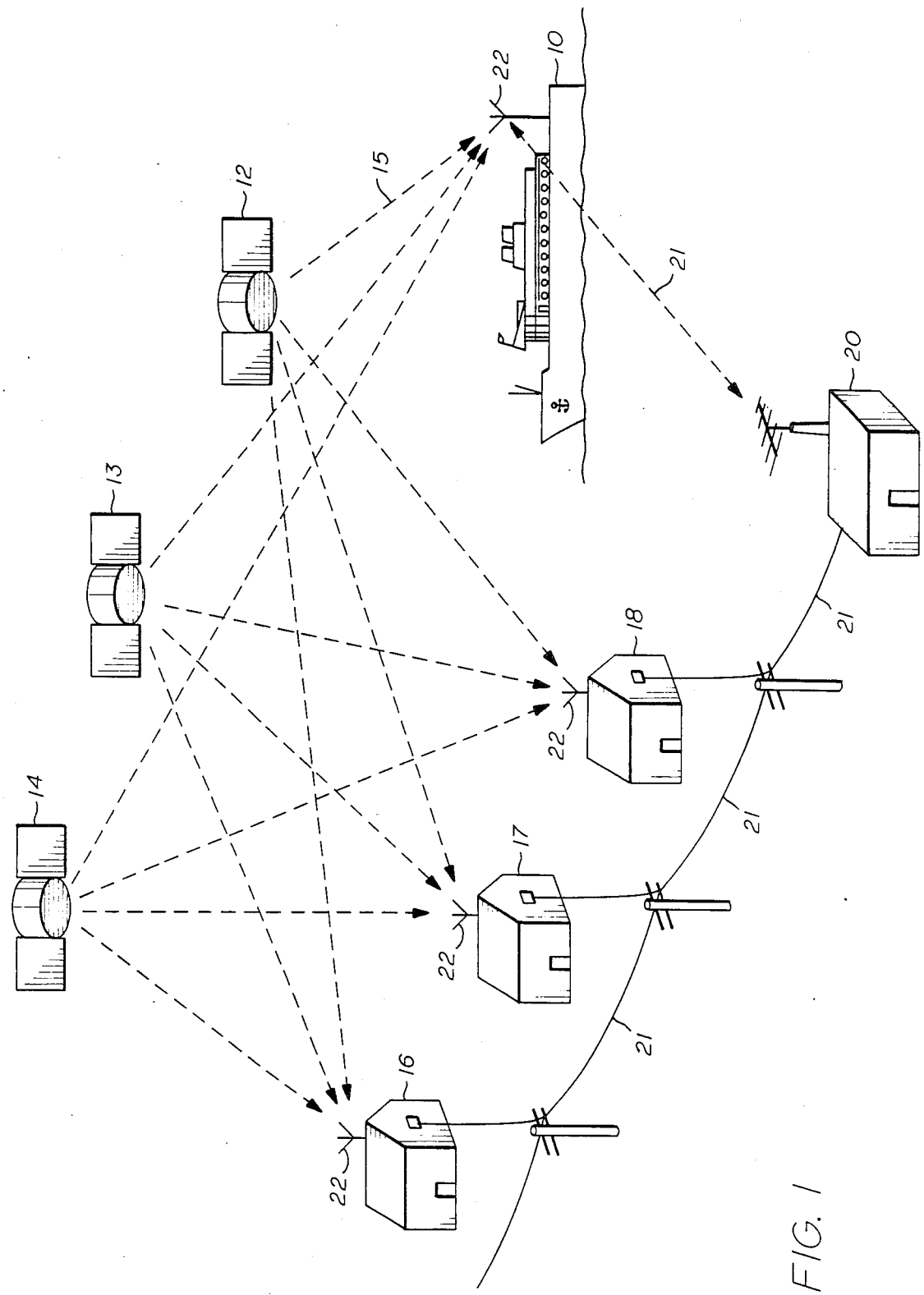
FIG. 1 illustrates a system for determining position information using signals received on a ship from GPS satellites in accordance with a preferred embodiment of the present invention.

The following description of the GPS system, and the structure of its signals, is presented for clarity and to facilitate explanation of the invention. More detailed discussions are available in the literature.

The signals of primary interest in determining position are transmitted by each GPS satellite in the same two bands of frequencies, one of which is known as the L1 band, and the other known as the L2 band.

Within each of these GPS bands, the transmitted signal is a broad band, noise-like, pseudorandom signal which contains no discrete spectral components. The signals are therefore said to be carrier-suppressed.

The term "carrier" is used herein in the same sense as it is used in the radio art, that is, a carrier is a periodic wave of essentially constant amplitude, frequency, and phase. Information may be conveyed, or "carried" by varying the amplitude, frequency and/or phase of such a signal. A carrier may be called a "subcarrier" if its frequency is less than the bandwidth of the signal. A signal may include several carriers. For example, a broadcast television signal is said to include a video carrier and an audio carrier.

Although no carriers are present in the GPS signals as transmitted, various carriers may be said to be implicit therein in that such carriers may be recovered or reconstructed from the GPS signals.

Within each GPS satellite, a frequency standard, such as an atomic cesium beam device, provides a fundamental frequency of 5.115 MegaHertz, called $f_o$, from which all other critical satellite frequencies are derived by integer multiplication or division. The frequency of the L1 band center frequency carrier of GPS signals is 308 times $f_o$ or 1575.42 MegaHertz and the frequency of the L2 band center frequency carrier is 240 times $f_o$ or 1227.60 MegaHertz. The $f_o$ fundamental frequency is a carrier frequency which may be reconstructed from the GPS signals.

GPS signals are bi-phase or quadriphase modulated. In particular, quadrature components of an L band center frequency carrier may be mixed, in the satellite, with aperiodic, pseudorandom, binary valued waves m(t) and n(t) which include several implicit periodic carrier waves. Polarity or phase reversals of m(t) and n(t) are constrained to occur only at times which are integer multiplies of fixed time intervals $t_m$ and $t_n$ known as the chip widths of m(t) and n(t), respectively. If a polarity reversal occurred at every multiple of $t_m$, then m(t) would be a periodic square wave with a frequency equal to $1/(2\ t_m)$. Because the polarity reversals actually occur pseudorandomly, just half the time on average, the $1/(2\ t_m)$-frequency carrier wave is suppressed, as is the band center frequency carrier.

The m(t) wave is the product of several different waves whose time intervals between polarity reversals are integer multiplies of $t_m$. Thus, additional carriers whose frequencies are corresponding submultiples of $1/(2\ t_m)$ are also implicit in the GPS signals. One of the waveforms used to produce m(t) for the L1 band signals is the C/A code, which is a satellite specific, pseudorandom binary sequence of 1023 chips repeated periodically with a period of 1 millisecond, or a frequency of 1 kiloHertz. For the C/A code component of the L1 band signals, $1/(2\ t_m)$ is $f_o/10$ or 0.5115 MegaHertz. Another factor in m(t) is the binary navigation data which has a 20 millisecond chip width, thus a 25 Hertz carrier frequency. These data include the current time indicated by the satellite's clock, a description of the satellite's current position in orbit, and a description of corrections to be applied to the time indicated by the satellite's clock.

The conventional method of determining the position of a receiver from signals received from GPS satellites uses observations of the times indicated by the satellite clocks as reflected in the transmitted binary navigation data. Typically, four different satellites are observed simultaneously. As discussed below with reference to FIG. 8E, at some moment when a clock in the receiver indicates a time $t_R$, the modulation of the signal being received from the $i^{th}$ satellite contains, in its navigation data, a satellite clock indication $t_i$, and satellite position coordinates $x_1$, $y_i$, and $z_i$. For simplicity in this explanation it will be assumed that any indicated clock corrections have already been applied.

If the receiver's clock happened to be synchronized with that of the satellite, then the difference between $t_R$ and $t_i$ would just equal the signal travel time between satellite and receiver. The distance, or "range" from the satellite to the receiver could then be determined by multiplying this time difference by the speed of light. Since the clocks are not synchronized, the range deduced by this method is biased by an unknown amount equal to the departure from synchronization, delta $t_R$, multiplied by the speed of light. Such range measurements are known as pseudorange measurements.

Delta $t_R$ may be determined simultaneously with the receiver's three position coordinates $x_R$, $y_R$ and $z_R$ by taking four simultaneous observations of pseudorange for four suitably positioned satellites and solving four simultaneous algebraic equations relating these four unknowns in accordance with known procedures.

Such conventional measurements of apparent propagation time delay, known as group delay, are limited by multipath and ionospheric effects. The term "multipath" refers to the simultaneous reception of signals which have reached the receiving antenna via different paths from the transmitting antenna. Harmful multipath effects most often result from the reflection of signals from objects near the receiver. Even weak multipath effects may severely limit the position accuracy available from pseudorange receivers.

Multipath effects are often in the nature of randomly fluctuating noise and may be reduced by simple time averaging of the observations as long as the position of the receiver is fixed. It is also known that multipath generally affects the phase delay of a signal much less than the group delay. Thus, the fluctuation of the range inferred from the center-frequency carrier phase is much smaller than that of the range inferred from the code modulation of a GPS signal.

The speed of propagation of a radio signal through the ionosphere is different from the speed of the same signal through other media such as the vacuum of space or the earth's troposphere. Ionospheric propagation effects limit the accuracy of conventional civilian position measurements made by pseudoranging because the ionosphere may delay the propagation of the signal modulation by an unknown amount. This amount may vary with time and location in an unknown way, but it depends on frequency in an accurately known manner. The group delay introduced by the ionosphere for a particular satellite-to-receiver propagation path at a particular time is known to be inversely proportional to the square of the center frequency of the band in which the signal is received.

2. THE PREFERRED SINGLE ANTENNA EMBODIMENT

FIG. 1

Referring now to FIG. 1, a system according to a preferred embodiment of the present invention is shown for determining the position of ship 10 from observation of the plurality of GPS satellites, illustrated by GPS 12, GPS 13 and GPS 14, currently visible to ship 10.

In accordance with the current design of the GPS system, a minimum of 18 GPS satellite will be deployed by about 1988. The manner of deployment will assure that at least 4 satellites will then always be visible from any point on earth. The present invention is best capable of determining position information if a minimum of 4 satellites are visible during an observation period. Satisfactory determinations may be made with only three satellites visible at the same time if one unknown, for example, the height of the phase center of the receiving antenna above sea level, does not have to be determined.

During operation of the system according to the present invention, measurements are made on ship 10 of at least four observables for GPS signals 15 transmitted by each of, for example, GPS 12, GPS 13 and GPS 14 and received on ship 10 via antenna 22. These four observables are:

(a) 308 $f_o$ implicit carrier phase observable $\phi$ of the L1 center frequency carrier;

(b) C/A code group delay observable $\tau$ of the C/A code component of the L1 band signals (known equivalently as the pseudorange);

(c) L1 band implicit $f_o$ carrier phase observable $\psi_{L1}$ of the fundamental frequency $f_o$ subcarrier implicit in the signals received in the L1 band; and (d) L2 band implicit $f_o$ carrier phase observable $\psi_{L2}$ of the fundamental frequency $f_o$ subcarrier implicit in the signals received in the L2 band.

These observables may be processed, in data processing equipment onboard ship 10 or in data processing center 20, either in real time or in post real time to determine position information. In addition, shore stations 16, 17 and 18 may also be utilized to receive GPS signals 15 through antennas 22 and determine position information, as well as other pertinent data, relating to the GPS satellites. This additional information and/or data could include ephemerides or orbital position information for each satellite as well as any necessary satellite clock error or synchronization information which must be determined.

At present, satellite ephemeris information and satellite clock synchronization information are provided in the navigation messages included in the signals transmitted by the GPS satellites, and may be decoded and used by civilian users of the GPS system. There is a possibility that such information may not always be satisfactorily available, either because of limitations in its accuracy or by intentional encryption of the information for military reasons. In any case, it is desirable, for high accuracy civilian applications, to be able to determine orbit information and clock error or synchronization information without reliance on the broadcast orbit information. This may be achieved with multiple ground stations operating in conjunction with the shipboard receivers.

Shore stations 16, 17 and 18 may contain data processing subsystems, or such subsystems may be contained in ship 10 or in separate data processing center 20 as shown in FIG. 1. Shore stations 16, 17 and 18 are also able to communicate with each other, ship 10 and data processing center 20 via data link 21. Data processing center 20 may also conveniently include radio communications equipment for the transfer of data to and from ship 10 as part of data link 21, although such radio communication may not be necessary for determining position information for some purposes. Raw data may be captured on ship 10 and later be transferred by any convenient means, not shown, to data processing center 20 for post processing. However, when the position information is being determined for real-time navigational purposes for use by ship 10 in maintaining its own course, the above mentioned radio communication link may well be required for proper operation of the system.

Shore station 18 may also be conveniently utilized to permit relative position measurements, that is, measurements of the position of ship 10 with respect to shore station 18. Such measurements are also called "baseline" measurements, the relative position vector extending from shore station 18 to ship 10 being called the baseline vector. It is known that such relative measurements may be significantly more accurate than single point position measurements made by ship 10 alone, because certain measurement inaccuracies are common to both ends of the baseline and may cancel each other when the observations at ship 10 and shore station 18 are combined.

It is conventional to chose one end of a baseline to be a point of known location, such as a geodetic survey marker. In systems of the type described herein, it is most convenient to position the shore station which forms one end of the baseline at the known location. The position of the ship may then be calculated as the end point of the baseline vector originating at the known location. It is clear that a relatively short distance between ship 10 and shore station 18 is desirable. This may not always be practical. The only real limit to the length of the baseline, that is, the maximum permissible distance between ship 10 and the nearest shore station, is that the same GPS satellite must be visible to both ends of the baseline if simultaneous observations at both ends are to be differenced directly to cancel common errors.

The terminal portions of shore stations 16, 17 and 18 may be constructed and/or operated identically to the terminal on ship 10. It may be preferable, however, for shore stations 16, 17 and 18 to measure additional observables not required on ship 10, including observations of the phase of the center frequency carrier of the L2 band signals. Simultaneous observation of the phases of the center frequency carriers of both bands can yield a more accurate determination of the ionospheric delay and therefore of the satellite orbits and the position of ship 10. Terminal 23 of ship 10, which may also be used in shore stations 16, 17 and 18 as noted above, will be discussed in detail with reference to FIG. 2.

FIG. 2

Figure 2:
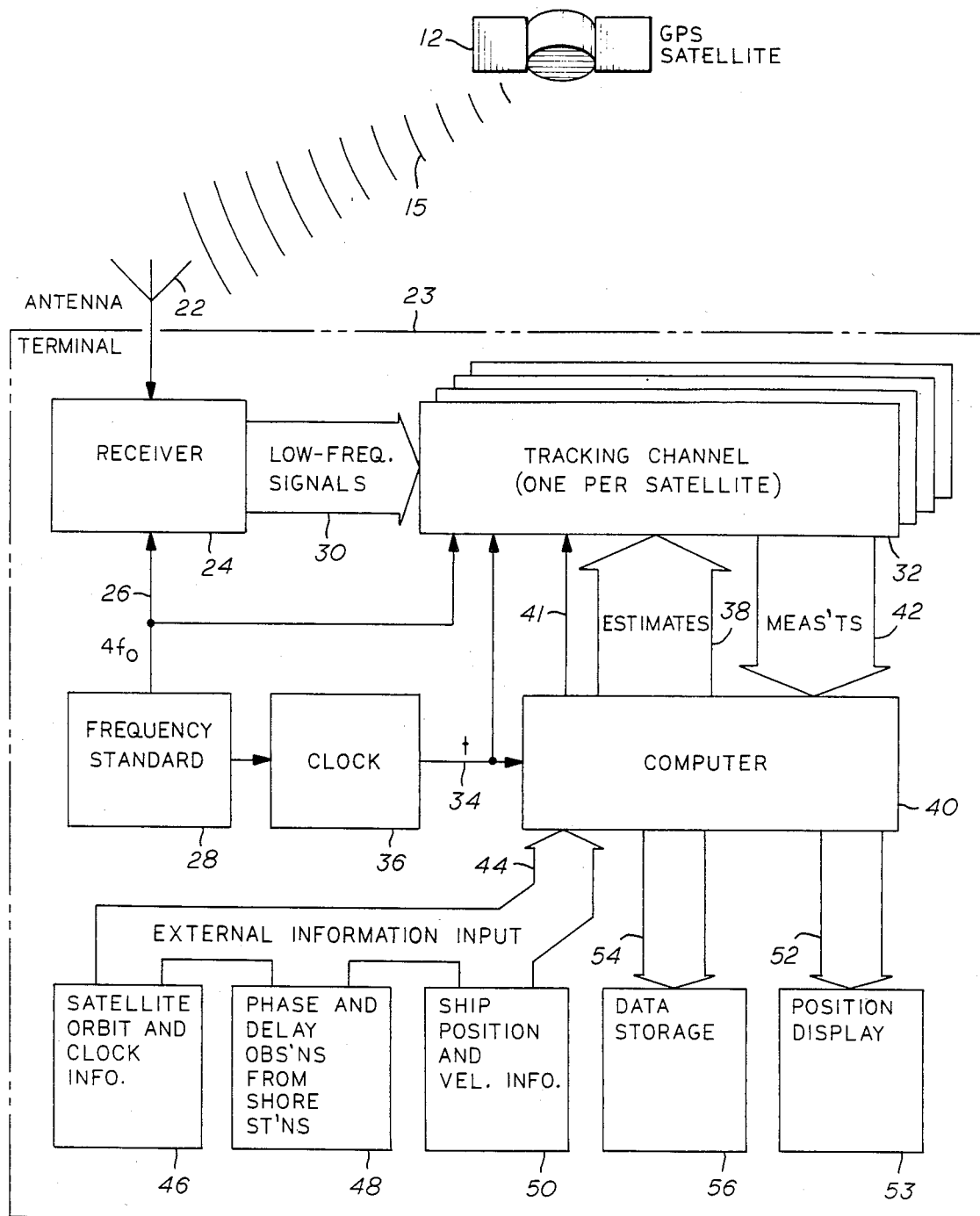
FIG. 2 illustrates a block diagram of a terminal for receiving GPS signals that may be used both onboard ships and in land installations in accordance with the system shown in FIG. 1.

Referring now to FIG. 2, terminal 23 is shown in block diagram form. As noted, identical terminals 23 may be used in both shore stations 16, 17 and 18 as well as on board ship 10 although it may be preferable to include additional equipment within terminals 23 in ship 10 or in shore stations 16, 17 and 18 such as codeless L2 center frequency carrier phase tracking channels for orbit data determination.

Terminal 23 may conveniently be positioned in a protected equipment room in ship 10 with other complex shipboard electronic equipment. It must however be connected to antenna 22 mounted above the deck of ship 10, preferably on a tall mast, not shown, above and as far away as possible from potentially interfering structures, such as metal deck plates and superstructures which might aggravate errors caused by multipath effects.

Antenna 22 receives GPS signals 15 from the plurality of the then visible GPS satellites, of which only GPS satellite 12 is shown in this FIG. 2. L band GPS signals 15 are fed from antenna 22 to receiver 24, within terminal 23, which also receives 4 $f_o$ constant frequency reference signal 26 generated by frequency standard 28. Frequency standard 28 may be a specially configured cesium atomic beam standard which provides a constant frequency output signal at exactly 20.46 MegaHertz which is four times the satellite's fundamental frequency, $f_o$. Alternately, it may be more convenient, and less expensive, to use a more readily available 5 MegaHertz cesium atomic beam standard, and a frequency synthesizer, not shown, to convert the 5 MegaHertz standard signal to the desired 4 $f_o$ constant frequency reference signal at 20.46 MegaHertz.

Receiver 24 is used to down convert GPS signals 15; that is, receiver 24 serves to provide output signals 30 which are relatively low in frequency in comparison to the L band microwave radio signals that are received by antenna 22 from GPS 12. Signals 30 are provided to a plurality of satellite tracking channels 32, only one of which is shown in FIG. 2 for clarity. An individual satellite tracking channel 32 is required for each satellite to be observed during any particular observation period. The satellite to be observed by each satellite tracking channel 32 is determined by satellite assignment 41 from real time computer 40. Terminal 23 may include 6 satellite tracking channels for redundancy although only 4 satellite channels are required for normal operation. Good operating practice suggests that more than the minimum number of satellites be tracked at any one time so that if one of the satellites is obscured or drops below the horizon or is otherwise unavailable or unusable during a portion of the observation period, the data collected will still be adequate.

Tracking channel 32 also continuously receives digital real time indication 34, t, generated by real time clock 36. Real time clock 36 is governed by frequency standard 28 which provides clock synchronization signal 29. Time t is obtained from clock 36 in a conventional manner by an initial real time adjustment or setting, and then by counting cycles of the oscillation of the signals from frequency standard 28.

The operation of all tracking channels 32, one for each of the GPS satellites, is the same. The operation of tracking channel 32 depicted in FIG. 2, which operates on GPS signals 15 from GPS satellite 12, will be explained below. The operation of tracking channels 32 for other GPS satellites may be understood therefrom. In addition to low frequency signals 30, 4 $f_o$ reference signal 26 and digital real time indication 34, tracking channel 32 receives estimates 38 which include estimates, or predictions, of received signal frequency and group delay for GPS satellite 12 from real time computer 40. Tracking channel 32 returns measurements 42 related to this satellite's signal to real time computer 40.

Real time computer 40 generates estimates 38 on the basis of external information input 44 it receives from external sources, as well as information contained in measurements 42. Such external information 44 may include data on the orbital position of satellite 12 as well as data concerning the corrections that need to be applied to the time information included in signals 15. Orbital and time correction information 46 shown in FIG. 2 could represent information transmitted over data link 21 from locations on land such as data processing center 20 as shown in FIG. 1. Information 46 could also be obtained by terminal 23 from the broadcast navigation message included in GPS signals 15 from satellite 12, by decoding the so called navigation message broadcast by GPS satellite 12, or it could be from some other means.

Real time computer 40 may also receive information from observations made by one or more of the shore stations 16, 17 and/or 18 of signals 15 from satellite 12. This information would conveniently include data representing the phases of carrier signals implicit in GPS signals 15 as received by that shore station. Additionally, such data may include pseudorange measurements related to satellite 12 determined by the observation and measurement of the group delay of the C/A code component of the L1 band signals in signals 15 received from satellite 12. This information is designated in FIG. 2 as phase and delay observations from shore stations 48. Real time computer 40 may also receive information related to the current position and/or velocity of ship 10 and various physical effects such as wind sand sea currents from ship position and velocity information 50. Such information may be provided by any of the conventionally available commercial equipment commonly used for determining such information such as conventional ship's instrumentation and navigation and dead reckoning equipment.

Real time computer 40 utilizes measurements 42 and information input 44 from sources 46, 48 and 50 to compute an improved determination of the current or past position 52 of ship 10. Position determination 52 may be supplied to position information display or utilization device 53. Real time computer 40 may also provide raw measurement data 54 from satellite tracking channel 32 to data store 56. Raw data 54 from data store 56 may be processed at some later time, onboard ship 10 or on land at data processing center 20, to provide enhanced position information based on measurements or other data not suitably available on ship 10 during the observation of satellite 12, such as enhanced satellite orbit or clock information. Similarly, phase and delay observations from some other shore stations, not shown, may be available for post processing that were not available during the observation period. Even enhanced data concerning the position and/or velocity of ship 10 may be used in post processing to improve the accuracy of the position information.

Conventional GPS receivers do not make use of external information inputs such as those discussed above with respect to external information 44. Conventional GPS receivers obtain all such satellite orbit and satellite clock information directly from the navigation message broadcast by each satellite. It is particularly important that terminal 23 be capable of utilizing external inputs as described above in order to maintain operation and accuracy during those times that the Department of Defense chooses to degrade certain of the broadcast information from the GPS system in order to deny the high accuracy normally available to military users. Although the accuracy available to users of a system according to the instant invention will not acceptable for military operations, civilian users will be able to operate surveying and navigation procedure without interruption.

It has been announced that such denial of accuracy procedures may include the intentional broadcast of inaccurate information data related to the orbits of the GPS satellite and/or on the satellite clocks. Broadcasting inaccurate information on satellite clocks is commonly called dither or dithering.

The commonly expected form of dithering of satellite clock information would be to intentionally vary the rate of the clock in GPS satellite 12, or to permit the normal variations in clock rates to degrade accuracy, and then restrict access to the clock correction information. As noted above, each GPS satellite, in its navigational data broadcast, broadcasts data including both the time indicated by the satellite's clock as well as the detailed information concerning the corrections needed in order to accuracy utilize this broadcast indicated time. An easy to implement approach to dithering would therefore be to deny public access to such clock correction information by encrypting the clock correction data included in the broadcast satellites' clock correction message.

Other sources of external information 44 might include inertial navigation systems, compass, water velocity logs, Doppler sonar or information on the attitude of ship 10, that is, its orientation in space, roll, pitch and yaw. As ship 10 rolls and pitches, antenna 22, which is at the top of a mast, is waving around in space. The position that computer 40 determines is therefore going to be the position of this moving point at the top of the mast. This additional information may be necessary to determine the center of mass of ship 10.

FIG. 3

Figure 3:
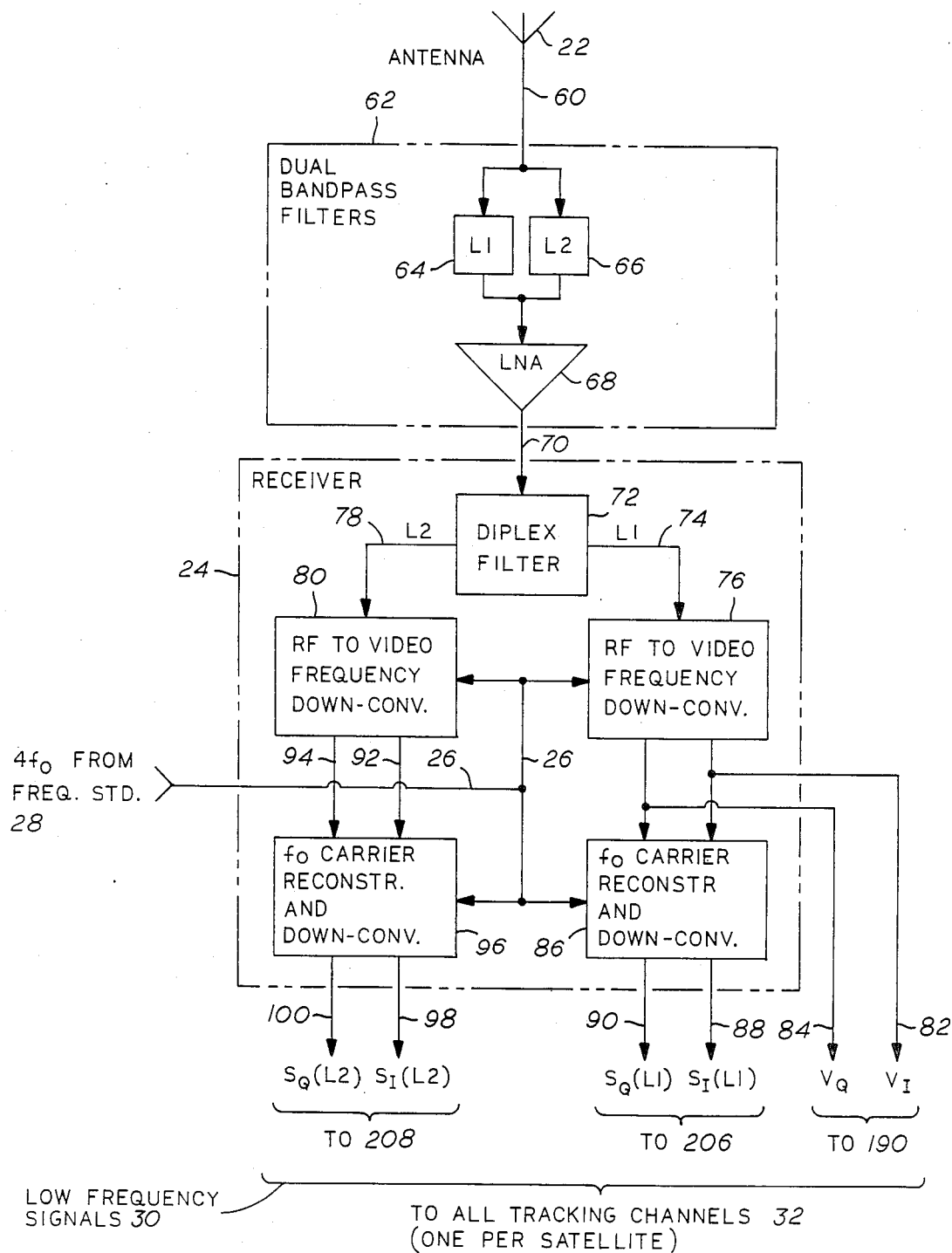
FIG. 3 is a more detailed block diagram of the receiver subsystem and related elements of the terminal shown in FIG. 2.

Referring now to FIG. 3, receiver 24 of terminal 23 is shown in greater detail together with antenna 22 and remote filter and preamplifier package 62 which is preferably located physically very near antenna 22. Remote filter and preamplifier package 62 serves to connect antenna 22 to receiver 23.

In particular, transmission line 60 carries the L1 and L2 band radio frequency signals received by antenna 22 to remote filter and preamplifier package 62. Preamp 62 is preferably positioned physically close to antenna 22 in order to minimize the transmission line losses in line 60 between antenna 22 and low noise amplifier 68 within preamp 62. It is convenient to position preamp 62 on the same mast or other superstructure on which antenna 22 is positioned.

In preamp 62, the L band signals in line 60 are coupled to the inputs of band pass filters 64 and 66. Filter 64 is a high quality, low loss band pass filter tuned to the approximate center of the L1 band at 1575.42 MegaHertz. The bandwidth of filter 64 may be of the order of 30 MegaHertz. Filter 66 is tuned to the center of the L2 band at 1227.60 MegaHertz with a similar bandwidth. Filters 64 and 66 serve to prevent strong signals originating outside the GPS frequency bands from reaching, and overloading or perhaps damaging, sensitive low noise amplifier 68. Band pass filters 64 and 66 are available commercially from a variety of vendors and should be selected for low attenuation in the L1 and L2 frequency bands and high out-of-band attenuation.

The outputs of filters 64 and 66 are combined at the input of low noise amplifier 68. The amplified L band signals available at the output of low noise amplifier 68 are fed, via transmission line 70, to receiver 24. Receiver 24 is conveniently positioned within ship 10 in a protected area, typically in the same environment used to protect other electronic equipment. Transmission line 70 may therefore be relatively long. Low noise amplifier 68 serves to amplify the L band signals fed into transmission line 70 to a level sufficient to compensate for the attenuation of line 70. Low noise amplifier 68 may conveniently be a commercially available gallium arsenide field effect transistor amplifier with a low noise figure of about 10 dB.

Receiver 24 receives the output of low noise amplifier 68 via transmission line 70 as one input and 4 $f_o$ constant frequency reference signal 26 from frequency standard 28, shown in FIG. 2, as a second input. Within receiver 24, transmission line 70 is connected to the input of diplex filter 72. Diplex filter 72 is a frequency selective signal splitter which splits the L band radio frequency signals received through transmission line 70 into L1 band radio frequency signals 74 and L2 band radio frequency signals 78.

L1 band radio frequency signals 74 are applied to radio frequency to video frequency down converter 76 in which they are mixed with quadrature components of a reference signal at the nominal center frequency of the L1 band, 1575.42 MegaHertz, which is exactly 308 times $f_o$. These quadrature components are derived from 4 $f_o$ reference signal 26. The operation of down converter 76 will be described in greater detail hereinbelow with reference to FIG. 4. In general, down converter 76 serves to convert L1 band radio frequency signals 74 from a center frequency of 308 $f_o$ or 1575.42 MegaHertz to baseband, that is, to a center frequency of 0 Hertz. As described below in greater detail with respect to FIG. 4, video frequency down converter 76 generates in-phase video signal 82 $V_I$, and quadrature video signal 84 $V_Q$, which taken together form complex video signal V.

Quadrature video signals 82 and 84 are included in low frequency signals 30 and are used by each satellite tracking channel 32 in terminal 23 as well as by L1 band $f_o$ carrier reconstructor and down converter 86 in receiver 24.

L1 band $f_o$ carrier reconstructor and down converter 86 is described in greater detail herein below with reference to FIG. 5. Reconstructor 86 serves, in general, to reconstruct satellite fundamental frequency $f_o$ carriers implicit in L1 band radio frequency signals 74. Satellite fundamental frequency $f_o$ carriers from each GPS satellite are implicit in L1 band radio frequency signals 74 from diplex filter 72, and in quadrature video signals 82 and 84 because they were implicit in GPS signals 15 and none of the operations performed on signals 15 to this stage have altered this implicit relationship.

It is important to note that converter 76 and reconstructor 86 utilize reference frequencies which are derived by fixed multiplication of constant frequency 4 $f_o$ reference signal 26 from frequency standard 28 shown in FIG. 2 so that all such signals are in phase with each other.

L1 band $f_o$ carrier reconstructor and down converter 86 generates in-phase reconstructed L1 band $f_o$ carrier composite 88, $S_{I(L1)}$, and quadrature phase reconstructed L1 band $f_o$ carrier composite 90, $S_{Q(L1)}$, which taken together form complex L1 band reconstructed $f_o$ carrier composite $S_{(L1)}$. L1 band reconstructed carrier composite phasor 89, shown below in FIG. 8D, is the instantaneous value of complex L1 band reconstructed $f_o$ carrier composite $S_{(L1)}$ resulting from the superposition of the phasors representing the reconstructed L1 band $f_o$ carriers from all GPS satellites in view. As seen in FIG. 8D, L1 band GPS reconstructed $f_o$ carrier phasor $89_{12}$ represents the particular L1 band reconstructed $f_o$ carrier from GPS satellite 12.

In-phase and quadrature reconstructed L1 band $f_o$ carrier composite signals 88 and 90 are very low frequency signals which are filtered within reconstructor 86 to a bandwidth of approximately 1 kiloHertz.

L2 band radio frequency signals 78 are applied to down converter 80 in which they are mixed with quadrature components of a reference signal at the nominal center frequency of the L2 band, 1227.60 MegaHertz, which is exactly 240 times $f_o$. These quadrature components are also derived from 4 $f_o$ reference signal 26. The operation of down converter 80 is substantially identical to the operation of down converter 76 and may be understood in detail with reference to the description of down converter 76 in FIG. 4. In general, down converter 80 serves to convert L2 band radio frequency signals 78 from a center frequency of 240 $f_o$, or 1227.60 MegaHertz, to baseband. As described in greater detail with respect to FIG. 4, L2 band video frequency down converter 80 generates in-phase L2 band video signal 92 and quadrature phase L2 band video signal 94.

In-phase and quadrature L2 band video signals 92 and 94 are used by L2 band $f_o$ carrier reconstructor and down converter 96. Reconstructor 96 operates in an identical manner to reconstructor 86 and may be understood from the description thereof with reference to FIG. 5. Reconstructor 96 serves, in general, to reconstruct the satellite fundamental frequency $f_o$ carriers implicit in L2 band radio frequency signals 78. Satellite fundamental frequency $f_o$ carriers from each GPS satellite are implicit in L2 band radio frequency signals 78 from diplex filter 72, and in in-phase L2 band video signal 92 and quadrature phase L2 band video signal 94, because they were implicit in GPS signals 15 and none of the operations performed on GPS signals 15 to this stage have altered this implicit relationship.

L2 band $f_o$ carrier reconstructor and down converter 96 generates in-phase reconstructed L2 band $f_o$ carrier composite 98, $S_{I(L2)}$, and quadrature phase reconstructed L2 band $f_o$ carrier composite 100, $S_{Q(L2)}$, which taken together form complex L2 band reconstructed $f_o$ carrier composite $S_{(L2)}$. In-phase and quadrature reconstructed L2 band $f_2$ carrier composite signals 98 and 100 are very low frequency signals which are filtered within reconstructor 96 to a bandwidth of approximately 1 kiloHertz.

FIG. 4

Figure 4:
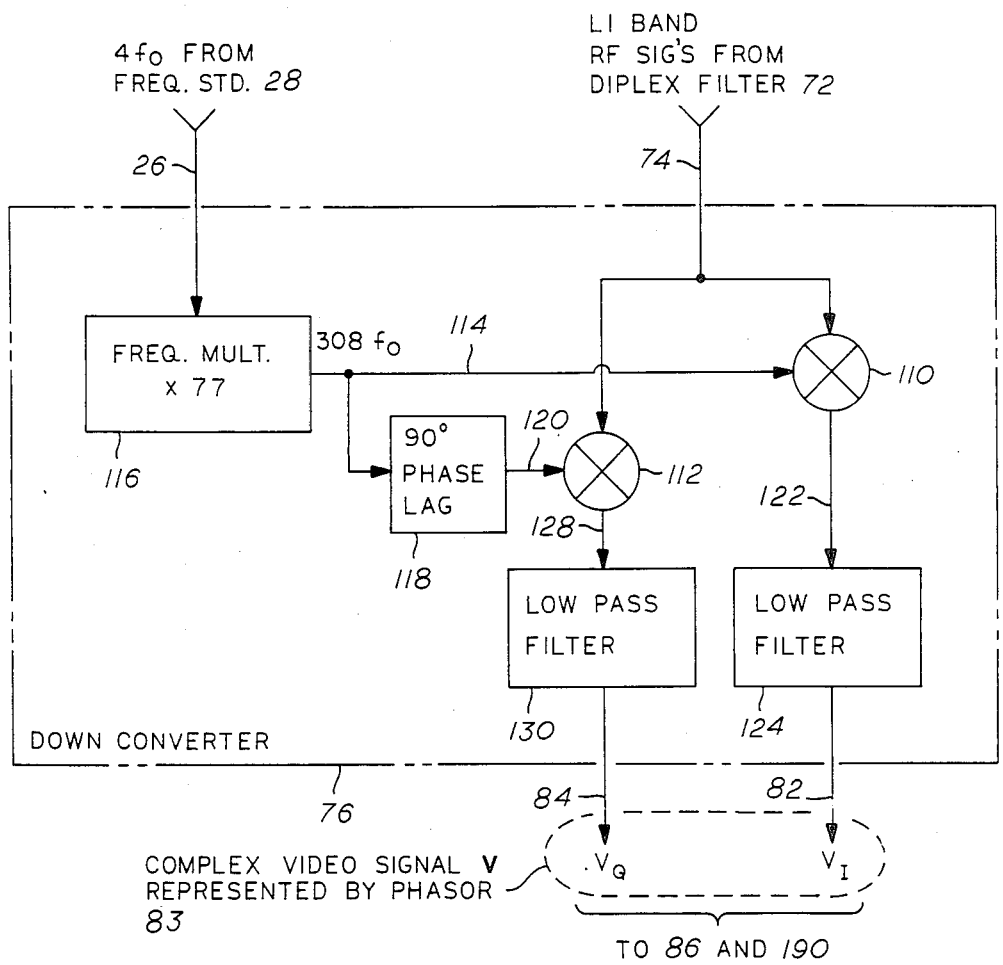
FIG. 4 is a detailed signal flow diagram of the radio frequency to video frequency down converter subsystem of the receiver shown in FIG. 3.

Referring now to FIG. 4, down converter 76 of receiver 24 shown in FIG. 3 is shown in greater detail. As noted above, converter 76 serves to down shift L1 band signals 74 in the same manner as converter 80 serves to down shift L2 band signals 78.

L1 band radio frequency input signals 74 from diplex filter 72 are applied to a pair of identical doubly balanced mixers 110 and 112. Local oscillator input 114 is applied to mixer 110 from frequency multiplier 116 which multiplies 4 $f_o$ reference frequency signal 26 from standard 28 by a factor of 77. This operation generates local oscillator input 114 at a frequency of 1575.42 MegaHertz. The equivalent frequency multiplier in L2 band video frequency down converter 80 utilizes a multiplication factor of 60 to achieve a frequency of 1227.60 MegaHertz.

Mixer output 122 includes signal components with frequencies equal to both the sum and the difference of the frequencies of signal inputs 114 and 74.

The signal components of mixer output 122 at the sum of the frequencies of the inputs to mixer 110 are at approximately twice the L1 center frequency. These signals are commonly called sum frequencies and are rejected by video low pass filter 124.

The signal components of mixer output 122 equal in frequency to the difference between the frequencies of the inputs to mixer 110 are commonly called the beat frequencies or difference frequencies. The beat frequency components of mixer output 122 have frequencies equal to the differences in frequency of L1 band signals 74 and L1 center frequency carrier reference signal 114.

GPS signals 15 do not contain useful amounts of signal power farther than about 9 MegaHertz from the center frequency of the band. L1 band signals 74 may therefore be considered to be signals with a bandwidth less than about 18 MegaHertz centered on approximately the L1 center frequency carrier. The beat frequency component of mixer output 122 is therefore the under 18 MegaHertz wide component of L1 band signal 74 down converted in frequency to baseband, that is, to a low frequency range from near zero to less than about 9 MegaHertz. This beat frequency component of mixer output 122 is not rejected by video low pass filter 124 and is included in in-phase video signal 82.

Video low pass filter 124 should be approximately matched to the baseband power spectral density of the n(t), or P-code related, component of the GPS signals. This spectral density, N(f), is given approximately by $$N(f) = \text{sinc}^2 (f/2 f_o)$$

where f represents video frequency, $f_o$ is the GPS fundamental frequency, and sinc$^2$ (f/2 $f_o$) is the square of the "sinc" function, defined by $$\text{sinc} (x) = \sin (\pi^* x)/(\pi^* x),$$

where x, equal to f/2 $f_o$, is the argument of the function, and $\pi$ equals 3.1416... N(f) has a one-sided half-power bandwidth of about 4.5 MegaHertz, and has a null at f equal to 2 $f_o$. Video low pass filter 124 may be configured in accordance with a conventional lumped-element design, preferably with 3 to 5 poles. It is important for video low pass filter 124 to have linear phase, and for filter 130 to be accurately matched in phase to video low pass filter 124, in order to optimize the performance of L1 band $f_o$ carrier reconstructor and down converter 86 which receives video signals 82 and 84. It is also desirable for video low pass filters 124 and 130 to have high attenuation at video frequency f equal to 2 $f_o$, so that video signals 82 and 84 are devoid of spurious components which could interfere with reconstructed-carrier detection and phase measurement in L1 band $f_o$ carrier phase detector 206.

In addition to rejecting the double frequency mixing products in mixer output 122, video low pass filter 124 generally serves to limit the bandwidth of in-phase video signal 82 to the bandwidth of the useful signal. This limits the amount of noise and potential interference which is passed to following stages of receiver 24 and satellite tracking channel 32.

Local oscillator input 114 is applied to 90° phase lag circuit 118 to produce delayed local oscillator input 120 which therefore lags local oscillator input 114 by exactly one-quarter cycle. Delayed local oscillator input 120 is applied as one input to mixer 112 in the same manner that undelayed local oscillator input 114 is applied to mixer 110. Mixer output 128 from mixer 112 is therefore substantially identical to mixer output 122 from mixer 110 except that the beat frequency components are shifted in phase by one-quarter cycle.

FIG. 5

Figure 5:
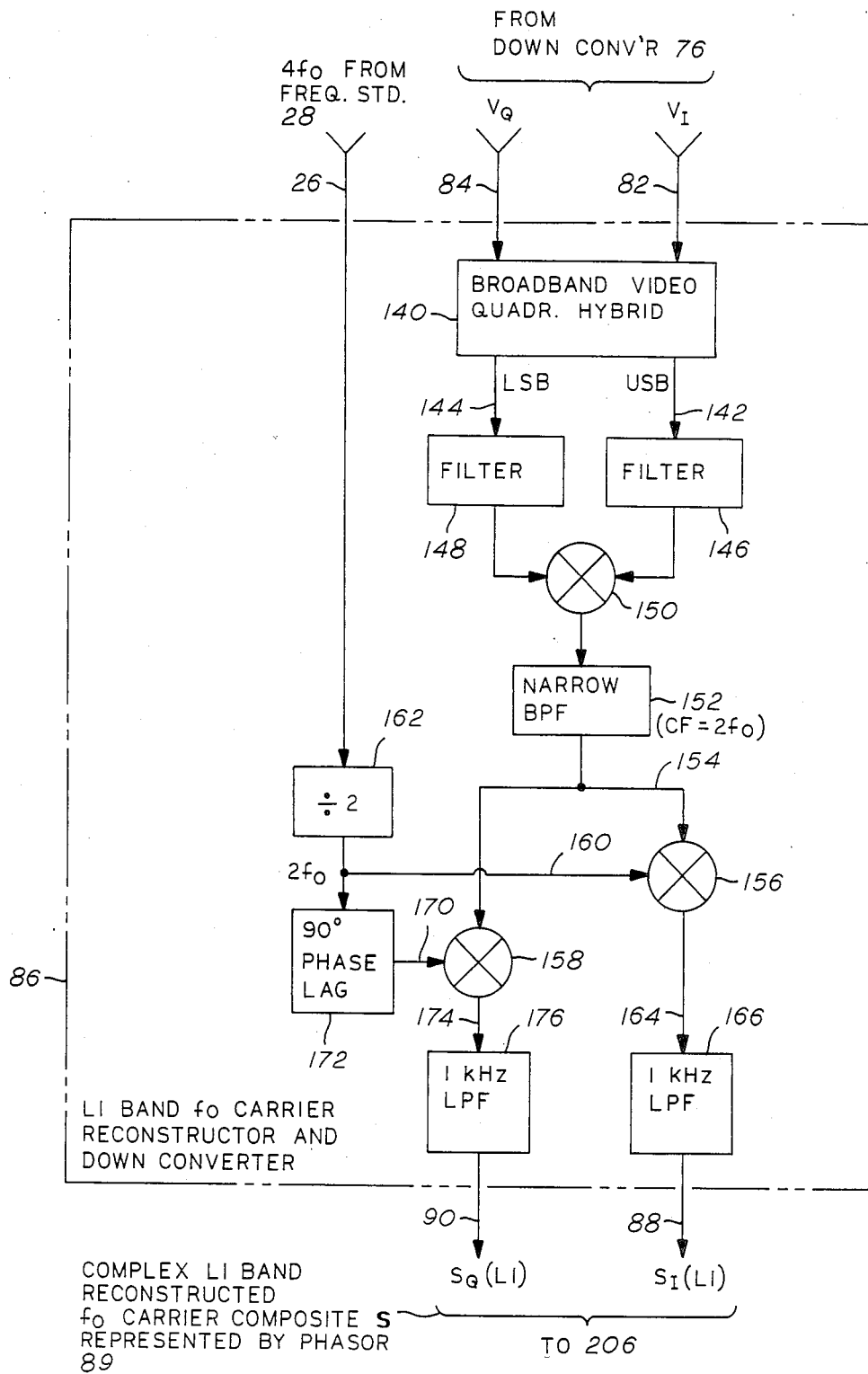
FIG. 5 is a detailed signal flow diagram of one of the $f_o$ carrier reconstruction and down conversion subsystems of the receiver shown in FIG. 3.

Referring to FIG. 5, reconstructor 86 of receiver 24 shown in FIG. 3 is disclosed in greater detail. As noted above with respect to FIG. 3, reconstructors 86 and 96 are identical in construction and operation, except that the inputs supplied to them are different. The construction and operation of reconstructor 96 may therefore be understood from the following explanation of reconstructor 86.

Downconverted, in-phase video signal 82 and downconverted, quadrature video signal 84 are generated by L1 band radio frequency to video frequency down converter 76 shown in FIG. 3. As noted above, video signals 82 and 84 are identical except for a relative phase shift of exactly 90°. The sense of this phase shift, i.e. whether there is a leading phase shift or a lagging phase shift in $V_Q$ relative to $V_I$, depends on whether the L1 band input frequency was above or below the frequency of local reference signal 114, shown in FIG. 4. Signal 114, as previously noted with respect to FIG. 4, is nominally equal in frequency to 308 $f_o$, the center frequency carrier of the L1 band signals as transmitted.

It is therefore possible to separate the upper sideband components of L1 band signals 74, (the components of signal 74 above the center carrier frequency of 1575.42 MegaHertz), from the lower sideband components thereof (the components of signal 74 that were lower in frequency than the center carrier frequency), by delaying the phase of video signal 84 an additional 90° with respect to video signal 82 and then adding and subtracting the results to form upper and lower sideband signals. Broad band video quadrature hybrid 140, to which in-phase and quadrature video signals 82 and 84 are applied as inputs, performs this additional phase shift and the addition and subtraction operations to form upper sideband signal 142 and lower sideband signal 144.

Broad band video quadrature hybrid circuit 140 may conveniently be configured as described in detail in an article in the Proceedings of the IEEE, vol. 59 (1971), pg. 1617-1618, by Alan E. E. Rogers.

Upper sideband signal 142 at the output of broad band video quadrature hybrid 140 is equal to the arithmetic sum of in-phase and quadrature video inputs 82 and 84, both inputs having been delayed in phase by amounts that are dependent on frequency, but with the phase lag of quadrature video input signal 84 greater than that of in-phase video input signal 82 by a constant 90°, independent of frequency. Lower sideband signal 144 at the output of broad band video quadrature hybrid 140 is equal to the arithmetic difference of the same two differentially phase-shifted quadrature video inputs 82 and 84.

Returning now to the operation of reconstructor 86, upper sideband signal 142 at the output of broad band video quadrature hybrid 140 is filtered by filter 146. Lower side band signal 144 is filtered by filter 148, identical to filter 146.

The outputs of filters 146 and 148 are applied as inputs to doubly balanced mixer 150. The output of mixer 150 includes mixing product signals at both the sum and difference frequencies of upper and lower sideband input signals 142 and 144. The output of mixer 150 is filtered by narrow bandpass filter 152. The center frequency of narrow bandpass filter 152 is 2 $f_o$, that is, 10.23 MegaHertz. Thus, narrow bandpass filter 152 selects the sum-frequency portion of the output of 150.

Video input signals 82 and 84, as well as upper and lower sideband signals 142 and 144, include a composite of all spread spectrum signals received from all visible GPS satellites in the L1 frequency band. The components representing individual satellites in these composite signals are spread spectrum pseudorandom signals whose spectra are noise like in character and do not contain any discrete frequency or continuous wave components. However, after upper sideband signal 142 is mixed with lower sideband signal 144 in mixer 150, continuous wave reconstructed carriers, having discrete frequencies and phases, are present in second composite signal 154 at the output of bandpass filter 152.

Filters 146 and 148 reject signals which may interfere with the $f_o$ carrier reconstruction and phase measurement operations performed in subsequent portions of L1 band $f_o$ carrier reconstructor and down converter 86 and L1 band $f_o$ carrier phase detector 206. In particular, filters 146 and 148 are provided with narrow band rejecting, or "notch", characteristics in order to reject narrow bandwidth spurious signals which may be present in upper and lower sideband signals 142. If not rejected by filters 146 and 148, such spurious signals could combine in mixer 150 to produce interfering signals with frequencies which could not be rejected by narrow bandpass filter 152. It may be particularly useful to provide each of filters 146 and 148 with a rejecting notch centered at a frequency of $f_o$, because a continuous wave component of upper sideband signal 142 having a frequency of $f_o$ could mix with a similar component of lower sideband signal 144 to produce an interfering signal of frequency equal to 2 $f_o$ in second composite signal 154.

It may also be desirable to provide filters 146 and 148 with high-pass characteristics in order to reject components of upper and lower sideband signals 142 and 144 with frequencies below about 1 MegaHertz. Included in such rejected components would be most of the m(t), or C/A-code related, power of the GPS signals. In general, it is desirable for filters 146 and 148 to reject noise and other signals while passing the desired n(t), or P-code related, components of the GPS signals.

Regardless of the specific band-rejecting characteristics which may be chosen for filters 146 and 148, it is important for these filters to be designed to introduce the smallest possible phase shifts throughout most of the video frequency band of interest, which extends from approximately 1 MegaHertz to 9 MegaHertz.

Second composite signal 154 is a composite of reconstructed carriers, each representing the fundamental frequency $f_o$ subcarrier from one GPS satellite. Each such reconstructed carrier in second composite signal 154 has a frequency near 2 $f_o$, the second harmonic of the fundamental frequency subcarrier, or approximately 10.23 MegaHertz. The frequencies of the reconstructed carriers from different satellites, however, are generally not exactly the same. The frequency of the reconstructed carrier from any GPS satellite will be observed in second composite signal 154 to differ from 2 $f_o$ primarily as a result of Doppler shift due to the relative motion of that satellite and receiver 24.

The maximum Doppler shift, which is observed when a satellite is rising or setting, is of the order of plus or minus 30 Hertz, respectively. Therefore, narrow bandpass filter 152 should have a bandwidth of at least 60 Hertz, in order to pass the reconstructed carrier signals from all satellites. It is undesirable for the bandwidth of filter 152 to be too great, because noise and interference far from the desired reconstructed subcarrier frequencies should be rejected. However, it is also undesirable to have the bandwidth of narrow bandpass filter 152 be too narrow because narrow bandwidth in a bandpass filter is usually accompanied by phase shift which varies sharply with frequency within the pass band. It is therefore preferable to use a bandwidth of several kiloHertz in narrow bandpass filter 152 in order to preserve the phase linearity of receiver 24.

Second composite signal 154 at the output of narrow bandpass filter 152 is supplied to a pair of identical, doubly balanced mixers 156 and 158. Local oscillator reference input 60, applied to doubly balanced mixer 156, has a constant frequency of 2 $f_o$ which is derived in frequency divider 162 from 4 $f_o$ reference frequency signal 26 supplied by frequency standard 28, as shown in FIG. 2.

Output 164 of doubly balanced mixer 156 contains mixing products at both the sum and difference frequencies of its inputs, the reconstructed carriers in second composite signal 154 and 2 $f_o$ local oscillator reference input 160. The sum frequencies are near 4 $f_o$. The desired difference frequencies are generally less than 30 Hertz. Output 164 is applied as an input to low pass filter 166, which has a bandwidth of about 1 kiloHertz. Low pass filter 166 serves to reject the sum frequencies and pass the difference frequencies to yield in-phase reconstructed carrier composite signals 88, labeled for convenience as $S_{I(L1)}$.

Local oscillator reference input 160 is also applied to 90° phase lag circuit 172 to obtain delayed local oscillator signal 170 which lags local oscillator signal 160 by 90°. Delayed local oscillator signal 170 is applied as an input to doubly balanced mixer 158. Output 174 of doubly balanced mixer 158 contains mixing products at both the sum and difference frequencies of its inputs, the reconstructed carriers in second composite signal 154 and delayed local oscillator signal 170. The sum frequencies are near 4 $f_o$. The difference frequencies are generally less than 30 Hertz. Output 174 is applied as an input to low pass filter 176 which has a bandwidth of about 1 kiloHertz. Low pass filter 176 serves to reject the sum frequencies and pass the difference frequencies to yield quadrature reconstructed L1 band $f_o$ carrier composite signal 90 labeled for convenience as $S_{Q(L1)}$.

As noted above with regard to FIG. 3, $f_o$ carrier reconstructor and down conversion circuit 96 operates in the same manner as $f_o$ carrier reconstruction and down conversion circuit 86, just described above. Reconstructor 96 serves to produce in-phase reconstructed carrier signals 98, labeled $S_{I(L2)}$ and quadrature phase reconstructed carrier composite signals 100, labeled $S_{Q(L2)}$.

Thus, with reference again to FIG. 3, $f_o$ carriers implicit in the signals received in each of the L1 and L2 bands are reconstructed and converted downward in frequency from the neighborhood of 10.23 MegaHertz to the neighborhood of zero. The purpose of the frequency down conversion is to enable the subsequent signal processing circuits to be operated at a lower speed.

FIG. 6

Figure 6:
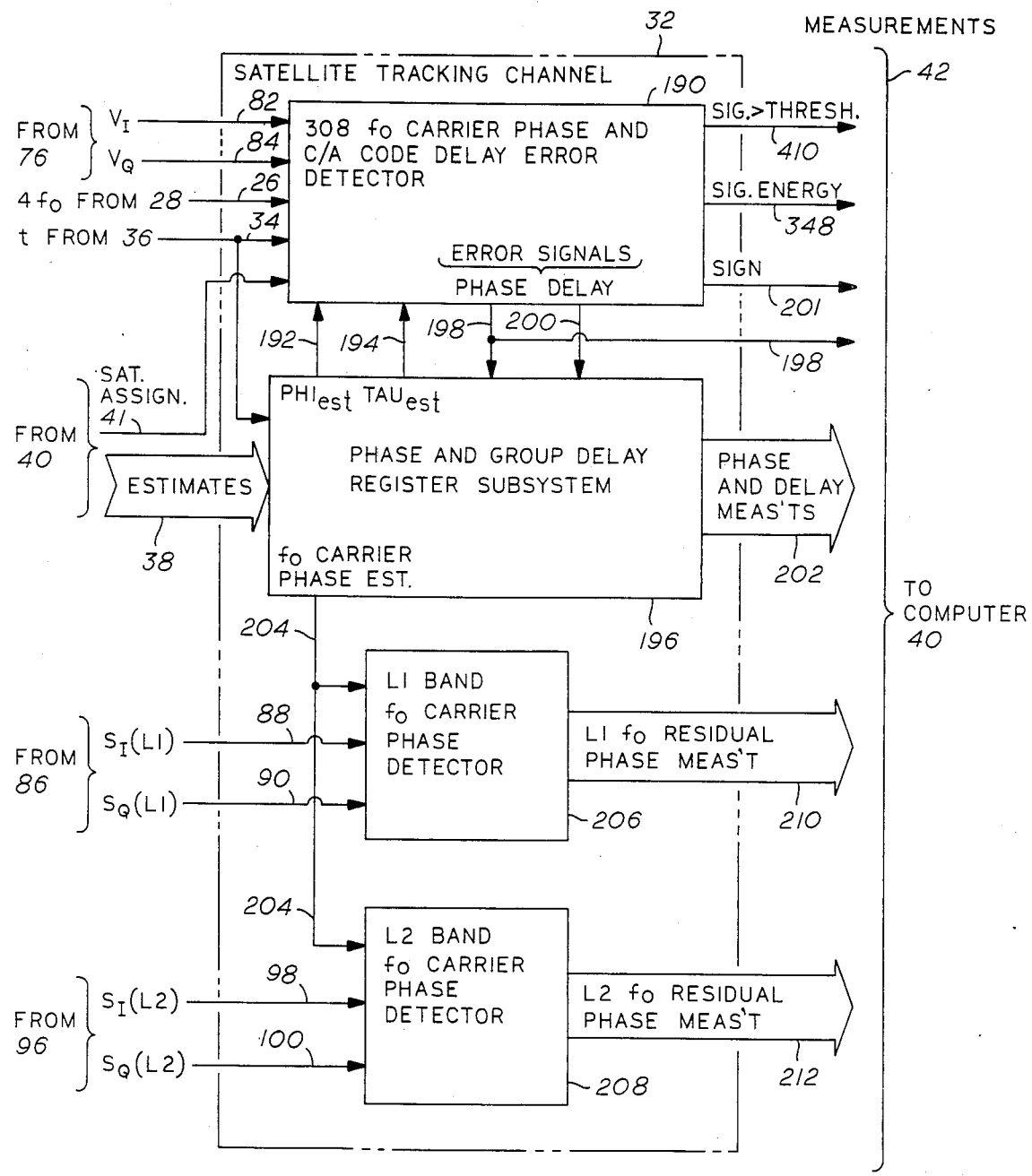
FIG. 6 is a block diagram of one of the satellite tracking channels illustrated in the terminal shown in FIG. 2.

Referring now to FIG. 6, satellite tracking channel 32, shown in FIG. 2, is disclosed in greater detail. As noted with reference to FIG. 2, one such tracking channel 32 is required per satellite tracked. Receiver 24 therefore includes, typically, 6 such tracking channels 32. All such tracking channels 32 are identical and operate in the same manner. The operation of only one such tracking channel 32 will therefore be discussed in detail with respect to this FIG. 6. For ease of discussion, it will be assumed that tracking channel 32 shown in this FIG. 6 has been assigned to GPS satellite 12 by satellite assignment 41 from real time computer 40.

All tracking channels 32 receive the same set of low frequency signals 30 from receiver 24 as shown in FIG. 2. Low frequency signals 30 include in-phase and quadrature video signals 82 and 84 from L1 radio frequency to video frequency down converter 76 as well as L1 band in-phase and quadrature reconstructed carrier composite signals 88 and 90 from reconstructor 86 and L2 band in-phase and quadrature reconstructed carrier composite signals 98 and 100 from reconstructor 96, all as shown in FIG. 3.

All tracking channels 32 also receive 4 $f_o$ reference frequency signal 26 from frequency standard 28 in FIG. 2 and continuously updated digital real time indication 34 from real time clock 36, as shown in FIG. 2. In addition, each tracking channel 32 receives estimates 38, calculated by real time computer 40, of the frequency and C/A code delay of GPS signals 15 as received at antenna 22 from the GPS satellite to be tracked by that channel.

Estimates 38 include a continuously updated estimate of the frequency of the 308 $f_o$ L1 band center frequency carrier as received from GPS satellite 12. The received frequency of any component of GPS signals 15 differs from the frequency of the corresponding component of the signals transmitted by GPS satellite 12 because of the Doppler shift resulting from the relative motion of antenna 22 and GPS satellite 12.

In addition, the frequency of the L1 band center frequency carrier implicit in the signals transmitted by GPS satellite 12 may differ from exactly 1575.42 MegaHertz by virtue of any variations, either accidental or deliberate, of the satellite fundamental frequency $f_o$ used in GPS satellite 12.

Figure 13A:
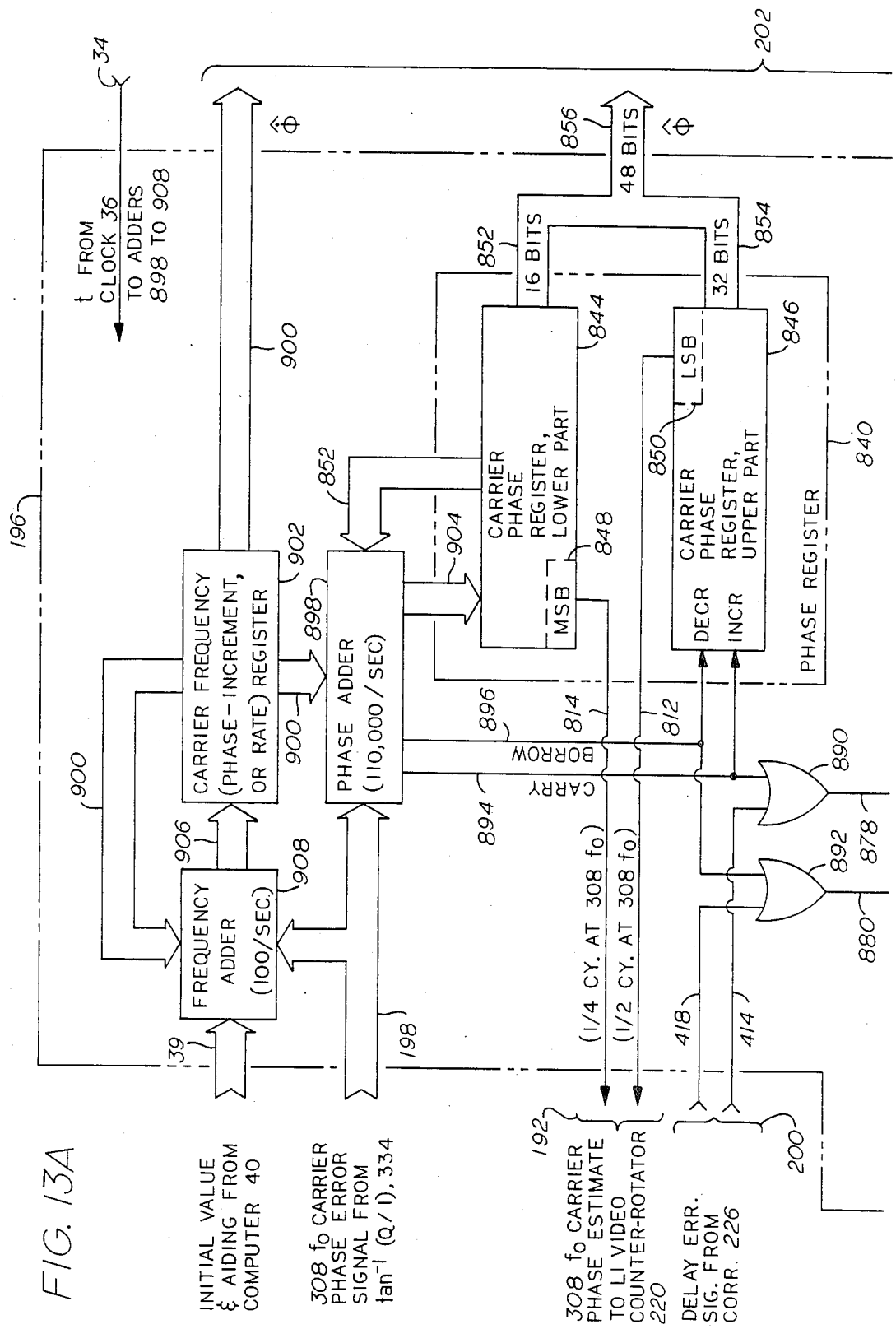
FIG. 13, formed by the combination of FIGS. 13A and 13B, is a block diagram of the register subsystem of the satellite tracking channel shown in FIG. 6.
Figure 13B:
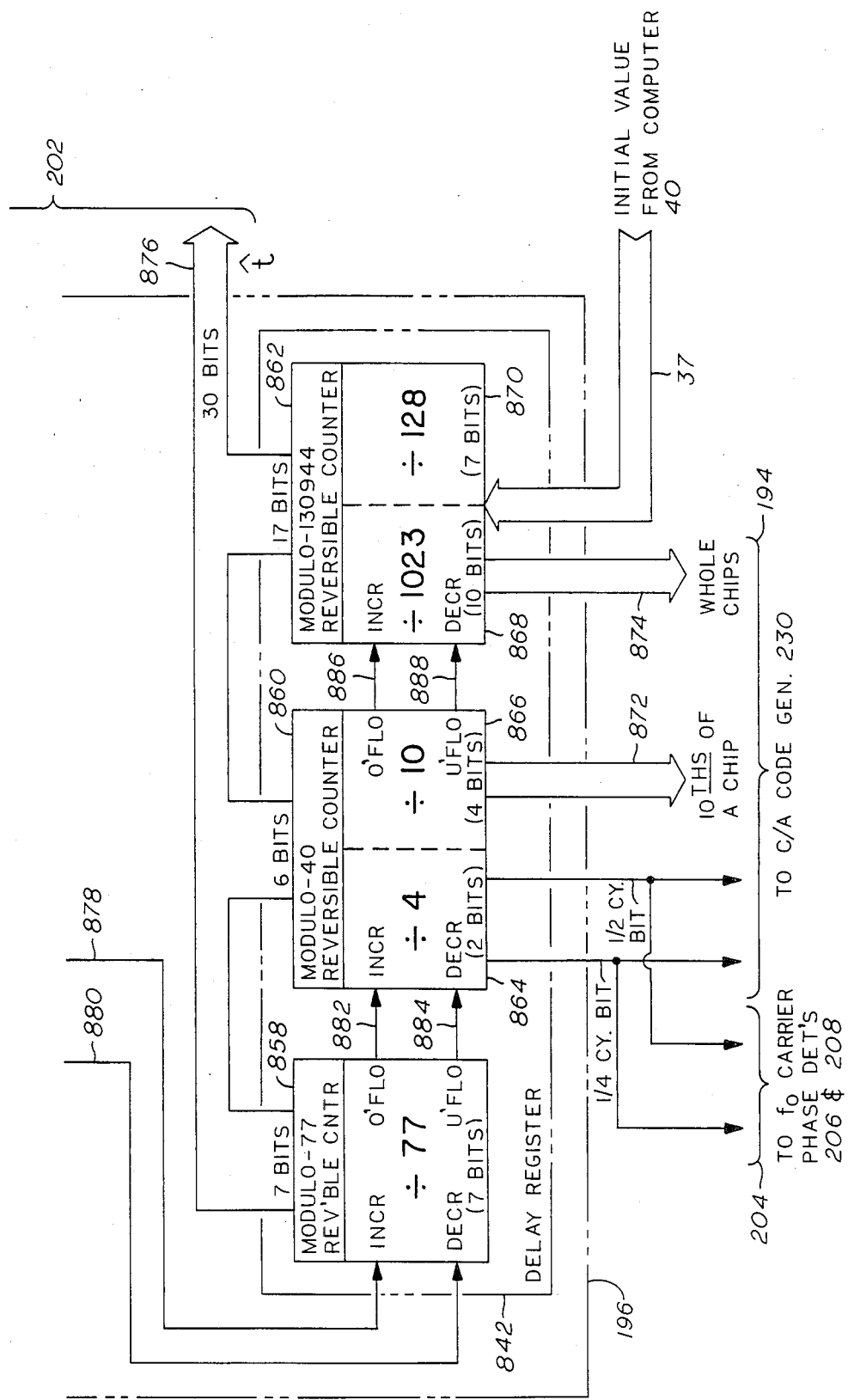

In addition to the 308 $f_o$ L1 band center frequency carrier frequency estimate, estimates 38 includes group delay intial value 37, as shown in FIG. 13.

In-phase and quadrature video signals 82 and 84, 4 $f_o$ reference frequency signal 26 and digital real time indication 34 are applied as inputs to 308 $f_o$ carrier phase and C/A code delay error detector 190 which also receives 308 $f_o$ carrier phase estimate $\phi_{est}$ 192 and C/A code group delay estimate $\tau_{est}$ 194 as inputs from phase and group delay register subsystem 196. 308 $f_o$ carrier phase estimate $\phi_{est}$ 192 is a fractional cycle part of 308 $f_o$ carrier phase estimate $\phi_{est}$ 856, as described below with reference to FIG. 13. C/A code group delay estimate $\tau_{est}$ 194 is a fractional period part of C/A code group delay estimate $\tau_{est}$ 876, as also described below with reference to FIG. 13.

308 $f_o$ carrier phase and C/A code delay error detector 190 serves to generate phase error signal 198 and group delay error signal 200 as well as above threshold indication 410, on-time signal energy indication 348 and sign bit 201, as discussed below with reference to FIG. 7 and FIG. 10.

308 $f_o$ implicit carrier phase observable $\phi$ is implicit in GPS signals 15 as received from GPS satellite 12, and therefore is implicit in complex video signal V, that is, in in-phase and quadrature video signals 82 and 84. Similarly, the actual group delay encountered between transmission by GPS satellite 12 and reception by antenna 22 by the C/A component implicit in the L1 band portion of GPS signals 15, C/A code group delay observable $\tau$, is also implicit in complex video signal V.

Phase error signal 198 is an estimate of the difference between 308 $f_o$ implicit carrier phase observable $\phi$ and 308 $f_o$ carrier phase estimate $\phi_{est}$ 192. Group delay error signal 200 represents an estimate of the difference between C/A code group delay observable $\tau$ and C/A code group delay estimate $\tau_{est}$ 194.

308 $f_o$ implicit carrier phase observable $\phi$ and C/A code group delay observable $\tau$ are tracked by phase and group delay register subsystem 196 as a result of interaction with 308 $f_o$ carrier phase and C/A code delay error detector 190. Phase and group delay register subsystem 196 and 308 $f_o$ carrier phase and C/A code delay error detector 190 cooperate to form feedback loops to minimize phase error signal 198 and group delay error signal 200. The cooperation of 308 $f_o$ carrier phase and C/A code delay error detector 190 and phase and group delay register subsystem 196 serves therefore to form interrelated and interconnected phase and delay locked loops which track the phase and group delay respectively of signals implicit in GPS signals 15.

As will be described below in greater detail with respect to FIG. 7, carrier phase and C/A code delay register subsystem 196 also generate $f_o$ carrier phase estimate 204, which is an estimate of the phase of the satellite fundamental frequency $f_o$ carrier implicit in the 1575.42 MegaHertz L1 band signals received from GPS satellite 12. $f_o$ carrier phase estimate 204 is provided to both the L1 band $f_o$ carrier phase detector 206 and the L2 band $f_o$ carrier phase detector 208.

L1 $f_o$ carrier phase detector 206 receives in-phase reconstructed L1 band $f_o$ carrier composite signal 88 and quadrature phase reconstructed L1 band $f_o$ carrier composite signal 90 as inputs from reconstructor 86. L2 $f_o$ carrier phase detector 208 receives in-phase and quadrature reconstructed carrier composite signals 98 and 100 from reconstructor 96. L1 band $f_o$ carrier phase estimate 204 is provided to L1 $f_o$ carrier phase detector 206 which generates L1 $f_o$ residual phase measurement 210 equal to the difference between $f_o$ carrier phase estimate 204 and L1 band implicit $f_o$ carrier phase observable $\psi_{L1}$ implicit in the L1 band portion of GPS signals 15 as received by antenna 22. $f_o$ carrier phase estimate 204 also is provided to L2 $f_o$ carrier phase detector 208 which generates L2 $f_o$ residual phase measurement 212 equal to the difference between $f_o$ carrier phase estimate 204 and L2 band implicit $f_o$ carrier phase observable $\psi_{L2}$ implicit in the L2 band portion of GPS signals 15 as received. L1 $f_o$ residual phase measurement 210 and L2 $f_o$ residual phase measurement 212 are included in measurements 42 provided to real time computer 40.

FIG. 7

Figure 7:
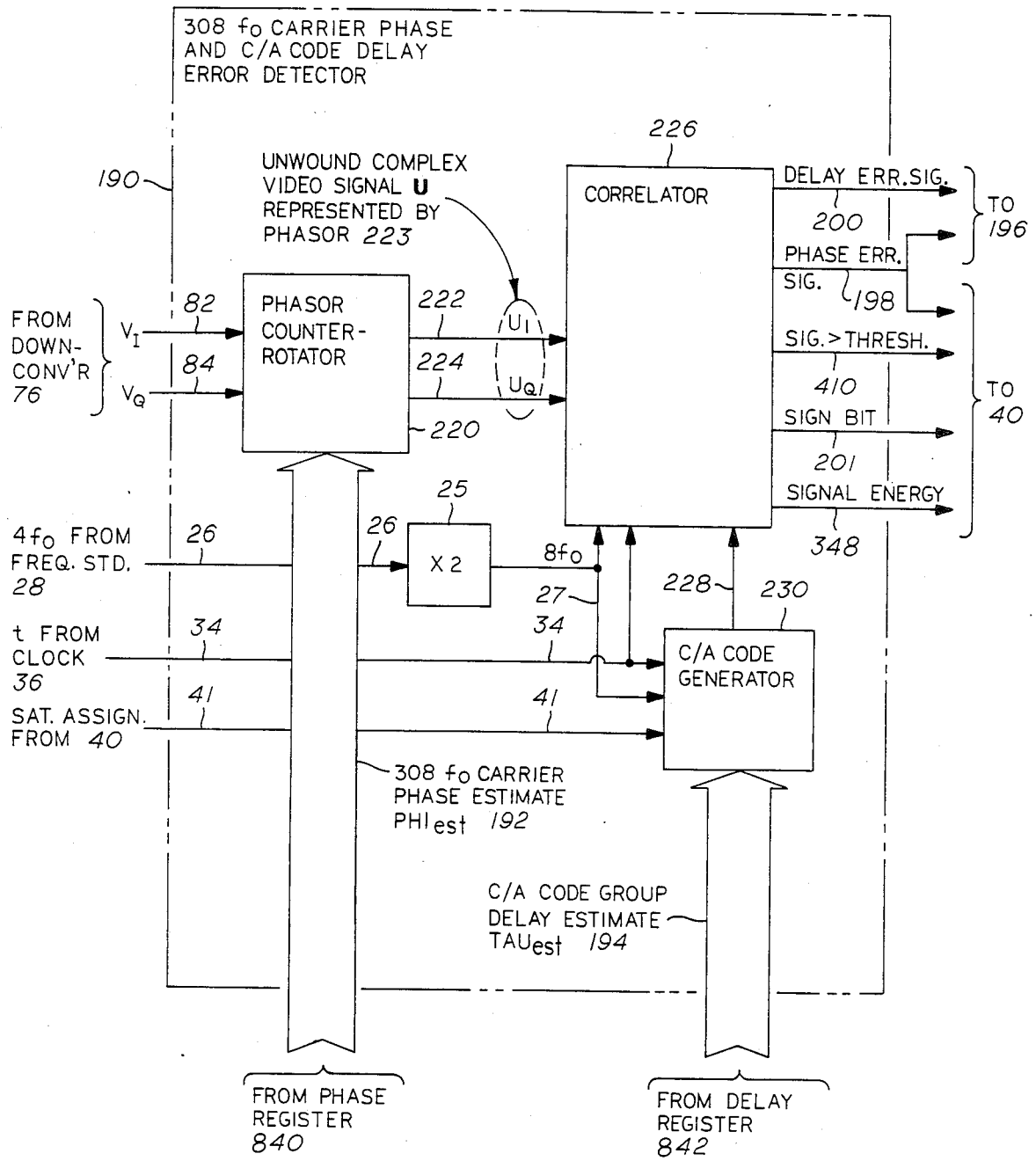
FIG. 7 is a block diagram of the 308 $f_o$ carrier phase and C/A code delay error detector subsystem of the satellite tracking channel shown in FIG. 6.

Referring now to FIG. 7, 308 $f_o$ carrier phase C/A code delay error detector 190, in satellite tracking channel 32 as shown in FIG. 6, is disclosed in more detail. As noted above with respect to FIG. 6, 308 $f_o$ carrier phase and C/A code delay error detector 190 cooperates with phase and group delay register subsystem 196 within satellite tracking channel 32 to form phase and delay locked loops. 308 $f_o$ carrier phase and C/A code delay error detector 190 receives in-phase video signal 82 and quadrature video signal 84 as inputs from L1 down converter 76 and, utilizing reference frequency input 26 and digital real time indication 34, serves to generate phase error signal 198 and group delay error signal 200 by comparing the actual 308 $f_o$ implicit carrier phase observable $\phi$ and the actual C/A code group delay observable $\tau$ which are implicit in complex video signal V with 308 $f_o$ carrier phase estimate $\phi_{est}$ 192 and C/A code group delay estimate $\tau_{est}$ 194 from phase and group delay register subsystem 196. 308 $f_o$ carrier phase and C/A code delay error detector 190 includes phasor counter rotator 220, correlator 226 and C/A code generator 230. Phasor counter rotator 220, correlator 226 and C/A code generator 230 are each shown in greater detail hereinbelow with reference to FIGS. 9, 10 and 11, respectively.

In-phase video signal 82 and quadrature video signal 84 from L1 down converter 76, shown in FIG. 3, are applied as inputs to phasor counter rotator 220 which also receives 308 $f_o$ carrier phase estimate $\phi_{est}$ 192. Phasor counter rotator 220 subtracts 308 $f_o$ carrier phase estimate $\phi_{est}$ 192 from the phase angle of complex video signal V. As a result of this subtraction, the rate of change of the center frequency carrier phase implicit in complex video signal V is reduced by an amount equal to the rate of change of 308 $f_o$ carrier phase estimate $\phi_{est}$ 192.

Phasor counter rotator 220, as described in greater detail with respect to FIG. 9 below, generates in-phase unwound video signal 222, $U_I$, and quadrature unwound video signal 224, $U_Q$, which taken together form unwound complex video signal U. The term "unwound" in the phrase "unwound complex video signal U" refers to the reduction of the speed of rotation of the phasor in the complex plane which can be used to represent unwound complex video signal U. Unwound complex video signal U is "unwound" in that it is substantially equivalent to complex video signal V except that the speed of rotation in the complex plane of the phasor of unwound complex video signal U is substantially slower than the speed of the phasor in the complex plane which can be used to represent complex video signal V. Stated another way, the constantly changing phase of unwound complex video signal U changes at a much slower rate than the constantly changing phase of complex video signal V. Representation of complex video signal V and unwound complex video signal U in the complex plane and the operation of phasor counter rotator 220 may be understood with reference to FIG. 8.

FIG. 8

Referring now to FIG. 8, the operation of phasor counter rotator 220 may be understood as follows. As noted above, in-phase video signal 82, $V_I$, and quadrature video signal 84, $V_Q$, may be regarded as the real and the imaginary parts respectively of complex video signal V; that is:

$$V = V_I + iV_Q,$$

where i equals the square root of $-1$. Similarly, in-phase unwound video signal 222, $U_I$, and quadrature unwound video signal 224, $U_Q$, are the real and imaginary parts of the unwound complex video signal U; that is:

$$U = U_I + iU_Q.$$

Phasor counter rotator 220 generates unwound complex video signal U according to the following equation:

$$V = V \cdot \exp(31 i \phi_{est}),$$

where "exp( )" is the complex exponential function $$\exp(\phi_{est}) = \cos(\phi_{est}) + i \cdot \sin(\phi_{est}).$$

Thus, the phase angle of unwound complex video signal U is equal to the phase angle of complex video signal V minus 308 $f_o$ carrier phase estimate $\phi_{est}$ 192.

Figure 8A:
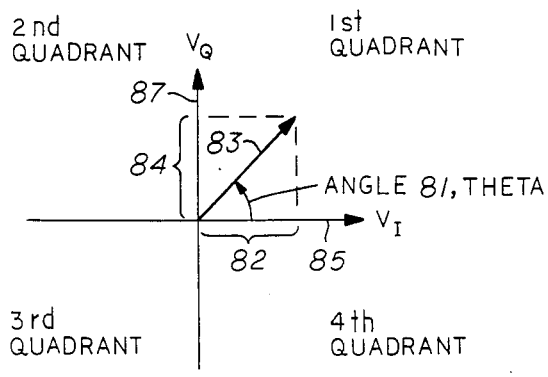
FIG. 8 is a series of graphic representations of phasors in the complex representing signals in various other figures.

FIG. 8A is a representation, in the complex plane, of complex video signal V. The in-phase or real component of complex video signal V is plotted on horizontal axis 85 and the quadrature or imaginary component of complex video signal V is plotted on vertical axis 87. In phase video signal 82 is equal to the projection on horizontal axis 85, and quadrature video signal 84 is equal to the projection on quadrature vertical axis 87, of video phasor 83. Phasor 83, whose angle is depicted as angle 82, $\theta$, represents complex video signal V.

The upper right hand quadrant of the complex plane, as shown in FIG. 8A, is the quadrant in which the signs of both in-phase video signal 82 and quadrature video signal 84 are positive. This quadrant is labeled as the 1st quadrant in accordance with common conventions. Similarly, the upper left quadrant is the quadrant in which the sign of in-phase video signal 82 is negative and the sign of quadrature video signal 84 is positive. This quadrant is labeled the 2nd quadrant. The lower left quadrant is the quadrant in which the signs of both in-phase video signal 82 and quadrature video signal 84 are negative. This quadrant is labeled as the 3rd quadrant. The lower right quadrant is the quadrant in which the sign of in-phase video signal 82 is positive and the sign of quadrature video signal 84 is negative. This quadrant is labeled as the 4th quadrant.

Figure 8B:
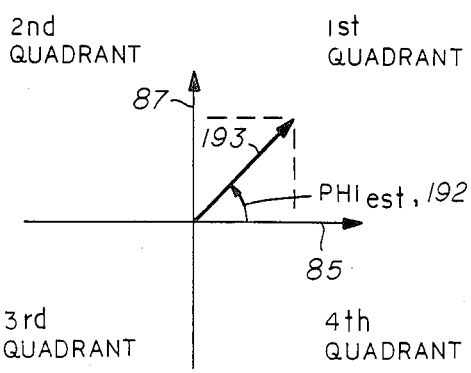
Figure 8C:
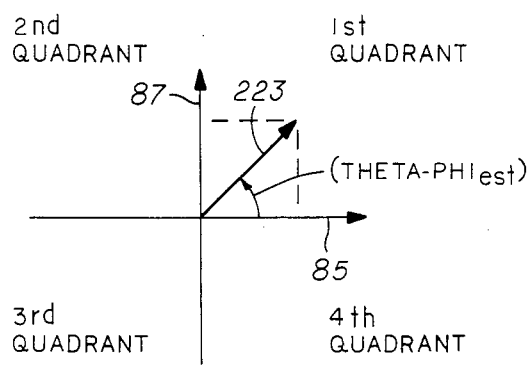
Figure 8D:
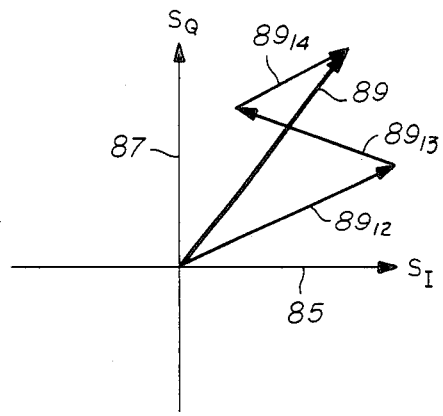

FIG. 8B is a representation in the complex plane of 308 $f_o$ carrier phase estimate phasor 193 whose angle is equal to 308 $f_o$ carrier phase estimate $\phi_{est}$ 192. Similarly, FIG. 8C is a representation in the complex plane of unwound complex video phasor 223 whose angle is equal to the difference between angle 81, $\theta$, and 308 $f_o$ carrier phase estimate $\phi_{est}$ 192.

Referring now to FIG. 8D, the complex plane of complex L1 band reconstructed $f_o$ carrier composite $S_{(L1)}$ is shown, with real part $S_{I(L1)}$ and imaginary part $S_{Q(L1)}$ plotted on the horizontal and the vertical coordinate axes, respectively. Phasor 89 is the vector sum, or resultant, of phasors $89_{12}$, $89_{13}$ and $89_{14}$, which represent the components of $S_{(l1)}$, represented by L1 band reconstructed carrier composite phasor 89, due to GPS satellistes 12, 13 and 14, respectively.

Figure 8E:
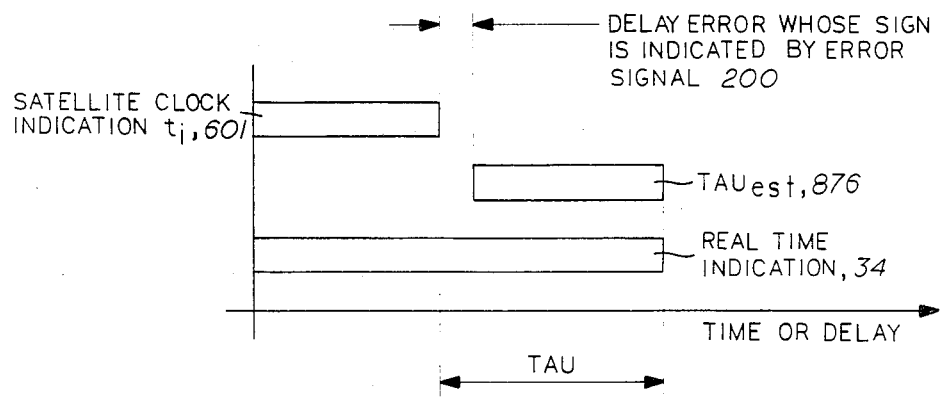

FIG. 8E is a snapshot from the viewpoint of antenna 22 at one instant of time, which indicates the relationship between satellite clock indication $t_1$ 601, delay error signal 200, 30-bit C/A code group delay estimate $\tau_{est}$ 876, and digital real time indication 34 from real time clock 36.

Satellite clock indication $t_1$ 601 is the time indicated by the signal being received from GPS satellite 12, for a particular digital real time indication 34 from real time clock 36. Satellite clock indication $t_1$ 601 is implicit in the modulation of GPS signals 15 received from GPS satellite 12, and may be read explicitly by decoding the broadcast navigation message contained in this signal.

30-bit C/A code group delay estimate $\tau_{est}$ 876 as shown in FIG. 13 is generated by or contained in delay register 842 and is an estimate of C/A code group delay observable $\tau$.

The difference between digital real time indication 34 and the sum of satellite clock indication $t_1$ 601 and 30-bit C/A code group delay estimate $\tau_{est}$ 876 is the delay error whose sign is indicated by delay error signal 200.

Referring again now to FIG. 7, in-phase video signal 82 and quadrature video signal 84 are received by phasor counter rotator 220 in analog form from L1 down converter 76 and converted to one bit digital form in which the value of each bit indicates the sign of the respective video signal. The two bits representing in-phase video signal 82 and quadrature video signal 84 therefore, when taken together, indicate the quadrant in the complex plane of video phasor 83.

308 $f_o$ carrier estimate $\phi_{est}$ 192 is received by phasor counter rotator 220 from phase and group delay register subsystem 196 in a two bit digital form which indicates the quadrant of 308 $f_o$ carrier phase estimate phasor 193. Phasor counter rotator 220 generates in-phase unwound video signal 222 and quadrature unwound video signal 224 in one bit digital form which, taken together, represent the quadrant of unwound complex video phasor 223 in the complex plane.

If 308 $f_o$ carrier phase estimate $\phi_{est}$ 192 indicates that $\phi$ is near zero, modulo 1 cycle, 308 $f_o$ carrier phase estimate phasor 193 will be in the 4th quadrant and in-phase unwound video signal 222 and quadrature unwound video signal 224 will be equal, respectively, to in-phase video signal 82 and quadrature video signal 84, that is, unwound complex video phasor 223 will be in the same quadrant as video phasor 83. If 308 $f_o$ carrier phase estimate $\phi_{est}$ 192 indicates that $\phi$ is near 90° or plus one-quarter cycle, unwound complex video phasor 223 will be one quadrant further clockwise than video phasor 83. If 308 $f_o$ carrier phase estimate $\phi_{est}$ 192 indicates that $\phi$ is near 180° then a 180° rotation is performed and so on.

In-phase unwound video signal 222 and quadrature unwound video signal 224 may therefore be formed, within phasor counter rotator 220, by logic gates not shown, which operate in accordance with a simple truth table, described in greater detail with respect to FIG. 9.

Within 308 $f_o$ carrier phase and C/A code delay error detector 190 in-phase unwound video signal 222 and quadrature unwound video signal 224 are applied as inputs to correlator 226, as shown in FIG. 7. Correlator 226 also receives 8 $f_o$ reference signal 27 from frequency doubler 25, which generates 8 $f_o$ reference signal 27 by multiplying 4 $f_o$ reference signal 26 from frequency standard 28 by a factor of 2, and digital real time indication 34 from real time clock 36 as shown in FIG. 2. In addition, correlator 226 receives one bit C/A code local model 228 from C/A code generator 230.

Correlator 226 correlates in-phase unwound video signal 222 and quadrature unwound video signal 224 with one bit C/A code local model 228. One bit C/A code local model 228 is a sequence of bit values representing the C/A code specific to GPS satellite 12. This sequence is output from C/A code generator 230 at times in accordance with the estimated arrival time of the C/A sequence from the GPS satellite to which C/A code generator 230 has been assigned by satellite assignment 41 from real time computer 40. The timing of the generation of one bit C/A code local model 228 is governed by digital real time indication 34 provided by real time clock 36, 8 $f_o$ reference signal 27 from frequency doubler 25 and C/A code group delay estimate $\tau_{est}$ 194 shown in FIG. 6.

C/A code group delay estimate $\tau_{est}$ 194 is a multibit digital representation of the estimated delay, modulo the code period of 1 millisecond, in which the least significant bit represents 1/40th of one bit or one chip of the C/A code sequence. As noted above, the C/A code is a periodic sequence of 1,023 equally wide chips transmitted with a period of exactly one millisecond. The least significant bit of C/A code group delay estimate $\tau_{est}$ 194 therefore corresponds to a path length of about 7.5 meters. Thus, the RMS quantization error of C/A code group delay estimate $\tau_{est}$ 194 is on the order of 7.5 meters divided by the square root of 12, or about 2 meters. This 2 meter RMS quantization error is negligible in comparison with the other errors that affect the C/A code as received, such as multipath errors.

One bit C/A code local model 228 will correlate constructively only with the particular component of unwound complex video signal U which originated from GPS satellite 12. The C/A code used in every other satellite is uncorrelated, that is, orthogonal, with the code of GPS satellite 12. Because of this orthogonality, correlator 226 serves to select the signals from GPS satellite 12 and to reject the signals from other satellites.

As noted with respect to the structure of the GPS signals, the C/A code related modulation is bi-phase modulation which switches the phase of a component of the 308 $f_o$ L1 center frequency carrier transmitted by GPS satellite 12 between two values 180 degrees apart according to whether the current code bit is 1 or zero. These phase reversals occur pseudorandomly at integer multiples of the C/A code chip width, $t_m$. Unwound complex video signal U appears therefore to flicker in phase by 180° at this rate.

Correlation within correlator 226 by one bit C/A code local model 228, when one bit C/A code local model 228 is generated in synchronism with the C/A code being received and matches the sequence of the C/A code specific to GPS satellite 12, stops this flickering so that the phase remains relatively constant for a time interval sufficient to permit coherent integration and detection of the signal. However, the phase does not remain constant for a very long time because, every 20 milliseconds, the phase may be reversed by the telemetry-modulation which broadcasts the navigation message.

Correlator 226 correlates in-phase unwound video signal 222 and quadrature unwound video signal 224 with one bit C/A code local model 228 for a time interval which is less than 20 milliseconds. Unless this time interval happens to contain a telemetry reversal, the phase remains relatively constant so that correlator 226 may generate phase error signal 198 which represents the difference between 308 $f_o$ implicit carrier phase observable $\phi$ and 308 $f_o$ carrier phase estimate $\phi_{est}$ 192. Correlator 226 also determines the sign of the difference between C/A code group delay observable $\tau$ and C/A code group delay estimate $\tau_{est}$ 194.

As disclosed hereinbelow in greater detail with reference to FIG. 10, correlator 226 determines the sign of this delay difference by comparing the energies of the correlation products from two correlations. The first such correlation is the correlation of one bit C/A code local model 228 with in-phase unwound video signal 222 and quadrature unwound video signal 224 discussed above. The second such correlation is the correlation of in-phase unwound video signal 222 and quadrature unwound video signal 224 with a further-delayed version of one bit C/A code local model 228 in which the further-delay equals one chip width of the C/A code. The energies resulting from each of these two correlations are compared to determine if correlation with the signal representing the early code results in greater than or less energy than correlation with the signal representing the late or delayed code. Delay error signal 200 indicates the result of this comparison and is applied to phase and group delay register subsystem 196 in which this indication of the code delay is used to advance or retard delay register 842 shown in FIG. 13, in order to maintain delay lock between the actual value of C/A code group delay observable $\tau$ and C/A code group delay estimate $\tau_{est}$ 194.

FIG. 9

Referring now to FIG. 9 phasor counter rotator 220 will be described in greater detail. As noted above with regard to FIG. 7, phasor counter rotator 220 operates to subtract 308 $f_o$ carrier phase estimate $\phi_{est}$ 192 from angle 81 $\theta$ of complex video phasor 83 to generate unwound video signal 222 and quadrature unwound video signal 224 which taken together form a two bit digital representation of the quadrant in the complex plane of unwound video phasor 223.

Figure 12:
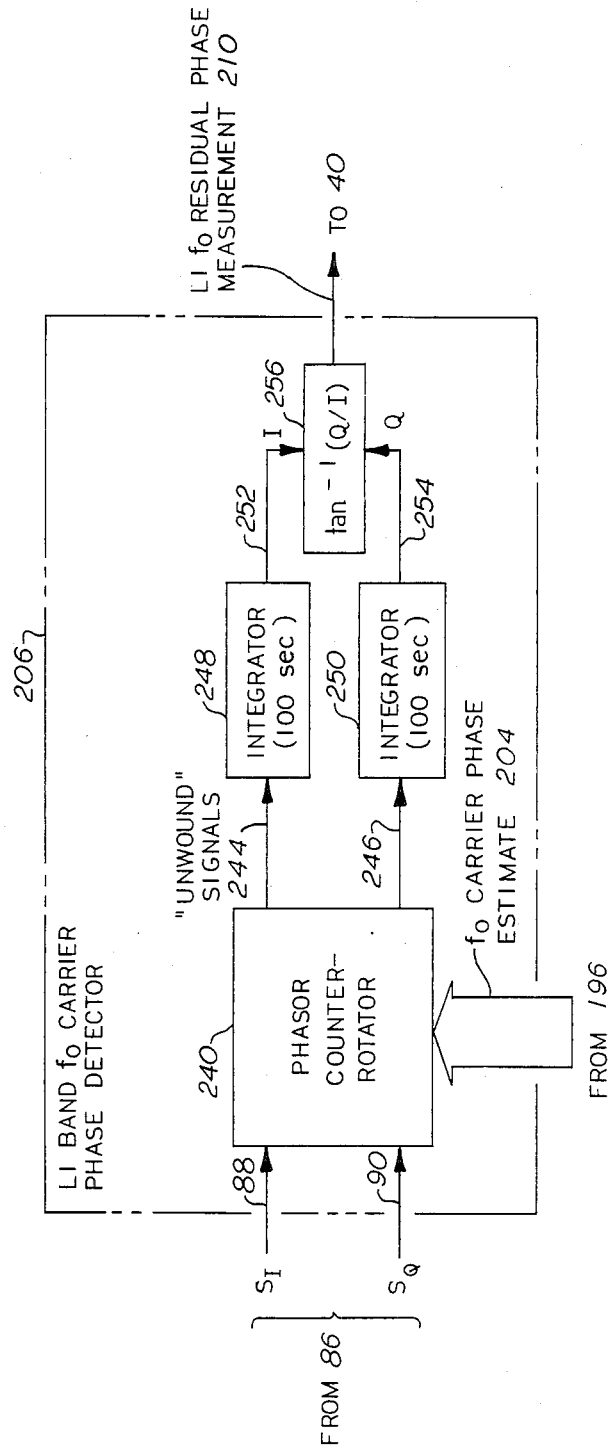
FIG. 12 is a block diagram of the $f_o$ carrier phase detector depicted in the satellite tracking channel shown in FIG. 6.

The function performed by phasor counter rotator 220 in 308 $f_o$ phase and C/A code delay error detector 190 is also required elsewhere in the system according to the present invention. Similar functions are performed within each satellite tracking channel 32 by phasor counter rotator 240 in L1 $f_o$ carrier phase detector 206, as shown in FIG. 12, and by a similar phasor counter rotator, not shown, in L2 $f_o$ carrier phase detector 208. The operation of phasor counter rotator 220 will be described in detail with regard to FIG. 9 and the operations of the phasor counter rotators in L1 $f_o$ carrier phase detector 205 and L2 $f_o$ carrier phase detector 208 can be understood therefrom.

Figures 9A, 9B, 9C, 9D:
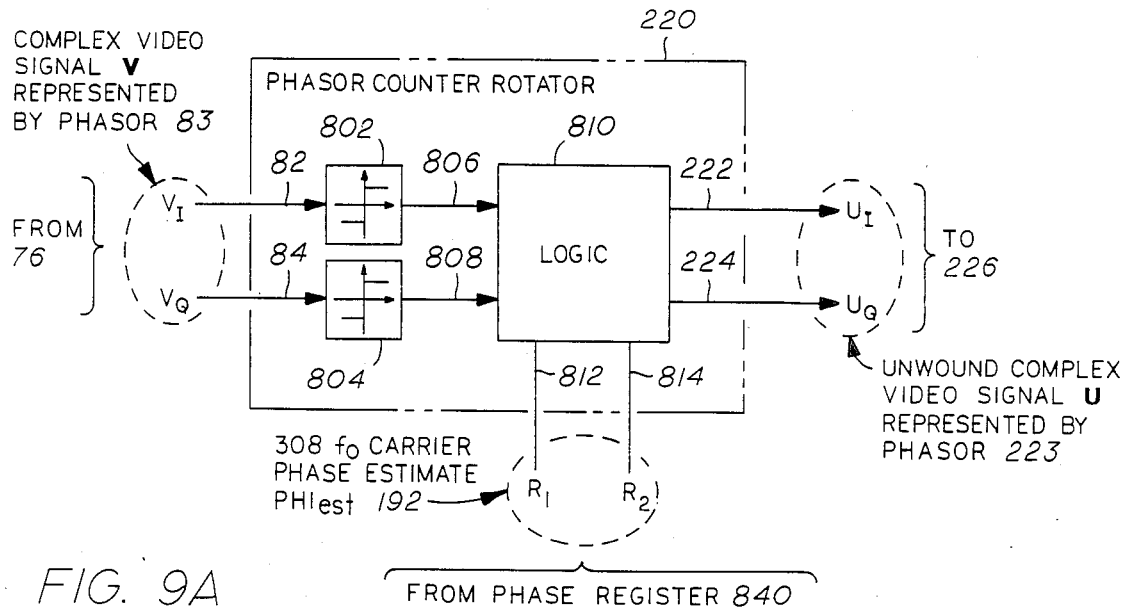
FIG. 9 is a block diagram of one of the phasor counter rotators depicted in the error detecting system shown in FIG. 7 and truth tables related to the operation thereof.

As shown in FIG. 9A in-phase video signal 82 and quadrature video signal 84 are applied at the input of phasor counter rotator 220 to a pair of identical one bit analog to digital converters 802 and 804, respectively, which operate as clippers to generate one bit in-phase video sign indicator 806 and one bit quadrature video sign indicator 808 respectively. One bit in-phase video sign indicator 806 is a logical or binary digital signal in which the true of 1 state represents that the sign of in-phase video signal 82 was positive and a zero or false state represents that the sign thereof was negative. The same relationship holds between the states of one bit quadrature video sign indicator 808 and quadrature video signal 84.

One bit in-phase video sign indicator 806 and one bit quadrature video sign indicator 808, taken together form a two bit digital representation of the quadrant of video phasor 83, as may be noted from the first three columns of the table in FIG. 9B. In particular, it can be seen by comparison between FIGS. 8A and 9B that when video phasor 83 is in the 1st quadrant, the signs of in-phase video signal 82 and quadrature video signal 84 are positive so the digital states of one bit in-phase video signal indicator 806 and one bit quadrature video sign indicator 808 must be true of 1. Similarly when video phasor 83 is in the 2nd quadrant, one bit in-phase video sign indicator 806 and one bit quadrature video sign indicator 808 are equal to 0 and 1, respectively. In the 3rd quadrant, they are both equal to zero and in the 4th quadrant they are equal to 1 and zero, respectively.

This two bit digital representation of the phase angle of video phasor 83 is modulo one cycle, that is, the integer number of cycles is ignored in this representation. An instantaneous phase angle between 0 and 1 cycle cannot be distinguished from a phase angle between 2 and 3 cycles, for example.

With reference again to FIG. 9A, 308 $f_o$ carrier phase estimate $\phi_{est}$ 192 from phase and group delay register subsystem 196 is applied as an input to phasor counter rotator 220 at the input to logic circuitry 810. In particular, as will be noted hereinbelow with respect to FIG. 13, phase register 840 contains a multibit 308 $f_o$ carrier phase estimate $\phi_{est}$ 856, of which only two bits are included in 308 $f_o$ carrier phase estimate $\phi_{est}$ 192. The first bit to the right of the binary point of 308 $f_o$ carrier phase estimate $\phi_{est}$ 856 is half-cycle bit $R_1$ 812 which indicates whether 308 $f_o$ carrier phase estimate phasor 193 is in the first two or the second two quadrants of the complex plane. The second bit to the right of the binary point is quarter-cycle bit $R_2$ 814 which indicates whether the number of the quadrant of 308 $f_o$ carrier phase estimate phasor 193 is odd or even.

308 $f_o$ carrier phase estimate $\phi_{est}$ 192 can be understood with reference to the rightmost pair of columns in the table in FIG. 9B. When 308 $f_o$ carrier phase estimate phasor 193 is in the 1st quadrant, half cycle bit $R_1$ 812 and quarter cycle bit $R_2$ 814 are both equal to zero indicating that the phasor has neither one half nor one quarter cycle of phase. When 308 $f_o$ carrier phase estimate phasor 193 is in the 2nd quadrant, half-cycle bit $R_1$ 812 and quarter-cycle bit $R_2$ 814 are equal to zero and 1, respectively. Similarly, the 3rd quadrant is indicated when half-cycle bit $R_1$ 812 and quarter-cycle bit $R_2$ 814 are equal to 1 and zero and the 4th quadrant is represented when they are both equal to 1. The difference between this binary form of quadrant representation and the sign-based representation provided by one bit in-phase video sign indicator 806 and one bit quadrature video sign indicator 808 can be seen with reference to the table in FIG. 9B.

Referring now to FIG. 9A again, logic circuitry 810 operates on complex video signal V, as represented by one bit in-phase video sign indicator 806 and one bit quadrature video quadrant indicator 808, to subtract therefrom 308 $f_o$ carrier phase estimate $\phi_{est}$ 192 in order to generate unwound complex video signal U represented by in-phase unwound video signal 222 and quadrature unwound video signal 224. In this operation, phase angles are described only in terms of quadrants. This representation is relatively coarse in that it is only accurate within plus or minus one-eighth cycle. In-phase unwound video signal 222 and quadrature unwound video signal 224 provide a two bit digital representation of the quadrant of unwound complex video phasor 223.

The required functional relationship between in-phase unwound video signal 222, output from logic circuitry 810, and the four inputs, in-phase sign indicator 806, quadrature video sign indicator 808, half cycle bit $R_1$ 812 and quarter cycle bit $R_2$ 814, is displayed in the truth table in FIG. 9C. Similarly, the required functional relationship between quadrature unwound video signal 224 output from logic circuitry 810, and these inputs is displayed in the truth table shown in FIG. 9D. With these relationships clearly defined in accordance with these truth tables, it is convenient to provide logic circuitry 810 in the form of logic gates or a Read Only Memory, not shown.

FIG. 10

Figure 10:
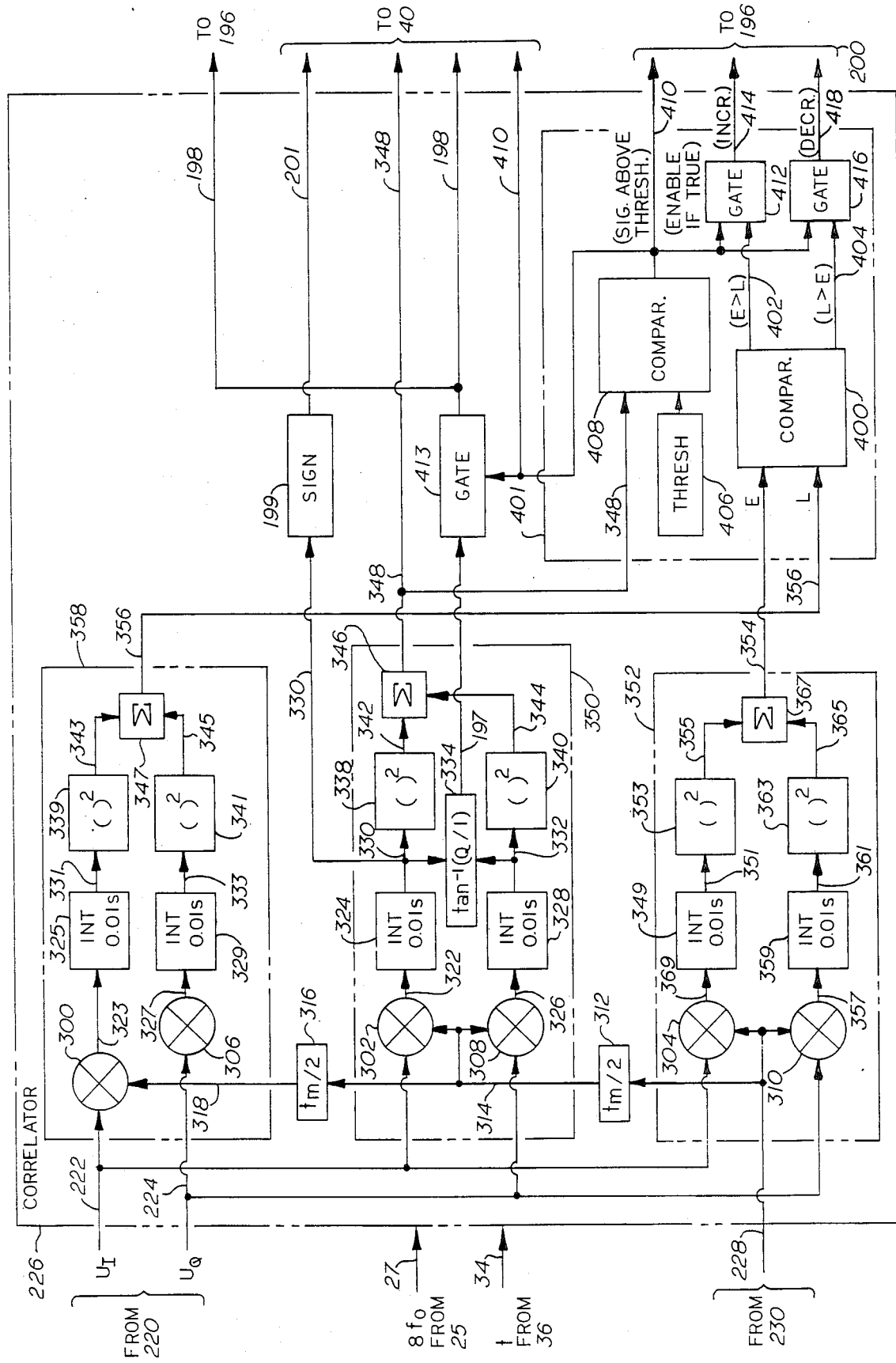
FIG. 10 is a block diagram of the correlator depicted in the error detecting system shown in FIG. 7.

Now referring to FIG. 10, operation of correlator 226 within 308 $f_o$ carrier phase and C/A code delay error detector 190 as shown in FIG. 7 is disclosed in greater detail. In-phase unwound video signal 222 from phasor counter rotator 220 is applied as an input to mixers 300, 302 and 304. Quadrature unwound video signal 224 from phasor counter rotator 220 in FIG. 7 is applied as an input to mixer 306, mixer 308 and mixer 310. The second inputs to mixers 300, 302, 304, 306, 308 and 310 are provided by one bit C/A code local model 228 and one-half and one chip delayed versions thereof, 314 and 318 respectively. In-phase unwound video signal 222, quadrature unwound video signal 224 and one bit C/A code local models 228, 314 and 318 are all one bit digital or logical signals. Therefore, mixers 300, 302, 304, 306, 308, and 310 are exclusive nor logic gates; equivalently, these mixers may be regarded as modulo-2 binary adders, or as parity detectors.

One bit C/A code local model 228 is applied as an input to one-half chip delay circuit 312 which generates one-half chip delayed C/A code local model 314. One half chip delayed C/A code local model 314 is then applied as an input to one-half chip delay circuit 316 which generates one-chip delayed C/A code local model 318 by delaying one-half chip delayed C/A code local model 314 by an additional one-half chip. One-half chip delay circuit 312 and one-half chip delay circuit 316 operate in an identical manner and each applies a delay equal to exactly one-half of the width, $t_m$, of a C/A code chip or bit.

The chipping rate of the C/A code in the GPS system is 1,023 chips per millisecond or 1.023 million chips per second or 1.023 MegaHertz or $f_o/5$. Each chip is therefore equal to 5 cycles of oscillation of the reference frequency $f_o$ or twenty cycles of 4 $f_o$ reference frequency 26 from frequency standard 28 shown in FIG. 2, or 40 cycles of 8 $f_o$ reference signal 27. 8 $f_o$ is the "clock" rate at which one bit C/A code local model 228 is generated by C/A code generator 230, as discussed below with reference to FIG. 11. Correlator 226 receives 8 $f_o$ reference signal 27 from frequency doubler 25 shown in FIG. 7 and digital real time indication 34 from real time clock 36 shown in FIG. 2.

One-half chip delay circuits 312 and 316 can therefore each be configured from a 20 bit shift register clocked by 8 $f_o$ reference frequency 27 from doubler 25 as shown in FIG. 7. 8 $f_o$ reference frequency 27 also serves to clock 0.01 second integrator 324 as discussed below. One half chip delayed C/A code local model 314, which is a one-half chip delayed version of one bit C/A code local model 228, is applied as an input to mixers 302 and 308 at the input of on-time signal detector 350 as well as the input of one-half chip delay circuit 316. One chip delayed C/A code local model 318 generated by one-half chip delay circuit 316, which is a one full chip delayed version of one bit C/A code local model 228, is applied as inputs to mixers 300 and 306 at the input of late detector 358. One bit C/A code local model 228 is applied directly, that is without any delay, to mixers 304 and 310 at the input of early signal detector 352.

The operation of on-time signal detector 350 will be discussed first. The operation of early signal detector 352 and late signal detector 358 is similar to the operation of on-time signal detector 350 and may be more easily described thereafter.

Within on-time signal detector 350 mixer 302 generates output 322 which, as noted above, is the exclusive nor function of in-phase unwound video signal 222 and one-half chip delayed C/A code local model 314. Output 322 is applied as an input to 0.01 second integrator 324 where it is integrated to form output 330.

Because output 322 is a one bit digital signal, 0.01 second integrator 324 can most conveniently be configured from a clocked counter operated in response to digital real time indication 34 from real time clock 36 shown in FIG. 2, to start, stop, and restart integration at each integer multiple of 0.01 second as indicated by real time clock 36. To start the integration, at the occurrence of digital real time indication 34 equal to an integer multiple of 0.01 seconds, integrator 324 must be reset. Then for every cycle of 8 $f_o$ reference signal 27, the count which represents the integrated value is incremented or not according to whether output 322 is 1 or zero, respectively. At the end of the 0.01 second integration period, the value contained in 0.01 second integrator 324 is read out to obtain output 330 and 0.01 second integrator 324 is then reset to zero to start the next integration.

If 0.01 second integrator 324 is configured from a clocked counter in this manner, its output 330 will be biased by one-half the number of cycles of 8 $f_o$ reference frequency 27 which are contained in one 0.01-second integration interval, or (4 $f_o$) times 0.01 second, or about 204, 600 counts. This bias is conveniently taken into account in the configurations of two quadrant inverse tangent function generator 334 and squarer 338, which accept output 330 from 0.01 second integrator 324.

Similarly, mixer 308 generates output 326 which is integrated for 0.01 second by integrator 328, beginning and ending on integer 1/100ths of a second under the control of real time clock 36, to generate output 332. At the end of the 0.01 second integration period, output 330 from 0.01 second integrator 324 and output 332 from integrator 328 are applied as inputs to two quadrant inverse tangent function generator 334. Two quadrant inverse tangent function generator 334, which may be configured from a Read Only Memory (ROM), generates phase error signal 197 equal to the angle in the range minus one-quarter cycle to plus one-quarter cycle whose tangent is Q/I where Q represents output 332 and I represents output 330. Note that phase error signal 197 from two quadrant inverse tangent function generator 334 is not affected by telemetry phase reversals in GPS signals 15 because such reversals act to change the signs of both I and Q, providing that no reversal occurs during the particular 0.01 second interval for which I and Q were generated. Phase error signal 197 from two quadrant inverse tangent function generator 334 therefore indicates the angle, modulo 0.5 cycle, of the average value during the 0.01 second integration period of the complex number whose real part is output 322 and whose imaginary part is output 326. As noted above, the angle of this complex number remains relatively constant during the integration period except for the telemetry phase reversals which occur at integer multiples of 0.02 seconds.

It is significant that the integration interval, namely 0.01 seconds, is an integer number of milliseconds, and also that it is exactly one-half of the interval between possible telemetry modulation phase reversals. The integration should be performed for an integer number of milliseconds because one millisecond is the period of the C/A code function. As noted above, the satellite-specific C/A codes are orthogonal to one another so that cross correlation of the C/A code components of the signals from one satellite with the C/A code of another satellite will yield a zero result. However, this desired lack of cross correlation is not exactly obtainable unless the integration extends over an integer number of code periods. In the present case the integer number is 10.

The fact that the integration period is exactly one-half of the telemetry phase reversal interval guarantees that all of the even numbered integration intervals, or all of the odd numbered integration periods, will be free of phase reversals for a long time.

The angle of the complex signal component from GPS satellite 12 at the inputs to integrators 324 and 328, will remain constant during the integration period, and therefore this signal will accumulate coherently within integrators 324 and 328 throughout all of the odd or even intervals, whichever contain no phase reversals. The phase reversals occurring during half of the other integration intervals, even or odd respectively, reduce the average accumulated value for those intervals. By comparing the average amount of signal energy accumulated during even numbered integration periods with the average amount of signal energy accumulated during odd numbered integration periods, it is possible to determine the phase of the 20 millisecond telemetry reversals relative to the phase of the 20 millisecond periodic signal defined by the beginning and ends of the even or the odd integration periods. It is convenient for these averages to be computed and compared within computer 40 to which on-time signal energy indication 348 for each integration interval, is furnished as described below.

Sign indicator 199 determines the sign of output 330 from 0.01 second integrator 324 and generates sign bit 201 indicating whether output 330 was positive or negative. Sign bit 201 is furnished to computer 40. The sequence of values of sign bit 201 from the even or the odd-numbered 0.01 second integration intervals, whichever are determined not to contain telemetry phase reversals, is then interpreted as the telemetry message by computer 40. For this interpretation to be possible, phase lock must have been acquired. If phase lock has been acquired, then virtually all of the on-time signal energy appears in output 330 and none in output 332.

Output 330 from 0.01 second integrator 324 is applied, at the end of every 0.01 second integration period, as an input to squarer 338 which generates output 342 representing the square of output 330. Output 332 from integrator 328, at the end of every 0.01 integration period, is applied to squarer 340 which generates output 344 equal to the square of output 332. Output 342 and output 344 are applied as inputs to summer 346 to obtain on-time signal energy indication 348 for each 0.01 second integration period. On-time signal energy indication 348 is equal to the sum of the squares of output 330 and output 332. It is convenient to obtain phase error signal 197, sign bit 201, and on-time signal energy indication 348 directly from output 330 and output 332 by using the values of output 330 and output 332 to address a ROM in which pre-computed values of phase error signal 197, sign bit 201 and on-time signal energy indication 348 have been stored.

On-time signal energy indication 348 is applied as an input to real time computer 40, shown in FIG. 2, at the end of each 0.01 second integration interval. In real time computer 40, the average of the even interval energies of on-time signal energy indication 348 is compared with the average of the odd interval energies thereof in order to determine the phase of the telemetry reversals. Phase error signal 197 from two quadrant inverse tangent function generator 334 is gated by gate 413 to obtain phase error signal 198. Phase error signal 198 is output from gate 413 if and only if above threshold indication 410, also input to gate 413, indicates that phase error signal 197 is a valid determination of phase error. As discussed below, above threshold indication 410 indicates that on-time signal energy indication 348 is above a preset threshold, and thus that sufficient signal energy was accumulated during the 0.01 second integration interval to ensure that a valid phase determination could be performed by two quadrant inverse tangent function generator 334.

Phase error signal 198, representing a valid measurement, is applied as an input to phase and group delay register subsystem 196 shown in FIG. 6 to maintain phase lock.

When 308 $f_o$ carrier phase estimate $\phi_{est}$ 192 is in lock with, and thus is remaining equal to, 308 $f_o$ implicit carrier phase $\phi_{est}$, phase error signal 198 will be nearly equal to zero.

As noted, the telemetry may be read by real time computer 40 by scanning the sequence of even or odd sign bits 201 searching for the frame synchronization pattern which is transmitted by GPS satellite 12 to mark the beginning of each telemetry frame. The parity of this synchronization pattern indicates whether sign bit 201 must be inverted to obtain the telemetry message bits.

The telemetry bit values should be determined from either the even or the odd numbered 0.01 second integration times, whichever one has been determined not to contain phase reversals as previously explained. Although phase error signal 198 is better determined from just the even or just the odd numbered integration times, whichever have been determined not to contain telemetry phase reversals, it is not strictly necessary to distinguish between even and odd numbered integration intervals for this purpose. One of the two values for phase error signal 198, for the odd interval or the even interval, will always be valid because there is no reversal within that integration period. The other, even or odd, may also be valid unless the telemetry reversals are occurring very near the midpoint of the integration interval. In the case in which the phase reversals occur near the midpoint of the integration period, the very low output value of output 330 and output 332 would result in an unreliable value 197 at the output of two quadrant inverse tangent function generator 334 which would better not be passed on as phase error signal 198.

In order to detect such invalid indications and prevent their acceptance for use as phase error signal 198, the energy of the signal received in each integration interval, as indicated by on-time signal energy indication 348 from summer 346 is compared with threshold value 406 in comparator 408. Comparator 408 generates binary valued above threshold indication 410 which indicates whether or not on-time signal energy indication 348 was greater than threshold value 406. Threshold value 406 should be set high enough so that if on-time signal energy indication 348 exceeds threshold value 406, above threshold indication 410 will indicate that phase error signal 198 is valid. Above threshold indication 410 from comparator 408 is applied as an input to gate 413 as noted above to indicate the presence of a valid measurement. Above threshold indication 410 is also used by real time computer 40 during the initial signal acquisition process which will be described below with further reference to FIG. 6.

Within late signal detector 358, mixer 300 generates output 323 which can be considered to be the exclusive nor function of in-phase unwound video signal 222 and one-chip delayed C/A code local model 318. Output 323 is applied as an input to 0.01 second integrator 325 where it is integrated to form output 331.

Because output 323 is also a one bit digital signal, 0.01 second integrator 325 can be configured from a clocked counter operated in response to digital real time indication 34 from real time clock 36 shown in FIG. 2 to start and stop integration at each integer multiple of 0.01 second as indicated by real time clock 36. Integrator 325 must be operated in the same manner as 0.01 second integrator 324 as noted above with respect to on-time signal detector 350.

Mixer 306 generates output 327 which is integrated for 0.01 second by integrator 329, beginning and ending on integer 0.01's of a second under the control of real time clock 36, to generate output 333.

Output 331 from 0.01 second integrator 325 is applied, at the end of the 0.01 second integration period, as an input to squarer 339 which generates output 343 equal to the square of output 331. Output 333 from integrator 329 is applied at the end of the 0.01 integration period to squarer 341 which generates output 345 equal to the square of output 333. Output 343 and output 345 are applied as inputs to summer 347 which generates late signal 356 which is therefore one measure of the energy of the signal received from GPS satellite 12 during the integration period.

Within early signal detector 352, mixer 304 generates output 369 which can be considered to be the exclusive nor function of in-phase unwound video signal 222 and one bit C/A code local model 228. Output 369 is applied as an input to 0.01 second integrator 349 where it is integrated to form output 351.

Because output 369 is also a one bit digital signal, 0.01 second integrator 349 can be configured from a clocked counter operated in response to digital real time indication 34 from real time clock 36 shown in FIG. 2 to start the stop integration at each integer multiple of 0.01 second as indicated by real time clock 36. Integrator 349 must be operated in the same manner as 0.01 second integrator 324 as noted above with respect to on-time signal detector 350.

Similarly, mixer 310 generates output 357 which is integrated for 0.01 second by integrator 359, beginning and ending on integer 0.01's of a second under the control of real time clock 36, to generate output 361.

Output 351 from 0.01 second integrator 349 is applied, at the end of the 0.01 second integration period, as an input to squarer 353 which generates output 355 equal to the square of output 351. Output 361 from integrator 359 at the end of the 0.01 integration period, is applied to squarer 363 which generates output 365 equal to the square of output 361. Output 355 and output 365 are applied as inputs to summer 367 which generates early signal 354 which is therefore a measure of the energy of the signal received from GPS satellite 12 during the integration period.

As noted above, on-time signal energy indication 348 from on-time signal detector 350 is applied at the input to C/A code group delay error detecting circuit 401 to generate above threshold indication 410. Early signal 354 and late signal 356 are also applied as inputs to C/A code group delay error detecting circuit 401 and, in particular, are applied as inputs to early versus late comparator 400. Early versus late comparator 400 operates to determine which of its inputs is greater and generates early greater than late indication 402 if early signal 354 is greater than late signal 356 and generates late greater than early indication 404 if the opposite is true.

Early greater than late indication 402 and late greater than early indication 404 are applied as inputs to a pair of identical logical AND gates 412 and 416. The other inputs to AND gates 412 and 416 are provided by above threshold indication 410 so that the respective delay register incrementing signal 414 and delay register decrementing signal 418 from gates 412 and 416 are enabled if one-time signal energy indication 348 is above threshold value 406. Gates 412 and 416 generate delay register incrementing signal 414 and delay register decrementing signal 418 respectively which, taken together, form group delay error signal 200 as shown above with reference to FIG. 6.

In this manner it can be seen that correlator 226 serves to generate a value for phase error signal 197, determine from the on-time signal energy if the phase error signal so generated is valid and if it is, pass this value as phase error signal 198 to phase and group delay register subsystem 196. Similarly, correlator 226 passes group delay error signal 200 to increment or decrement the value for 30-bit C/A code group delay estimate $\tau_{est}$ 876 held in delay register 842 shown in FIG. 13 in accordance with the relative power available from early or late cross correlation.

FIG. 11

Figure 11:
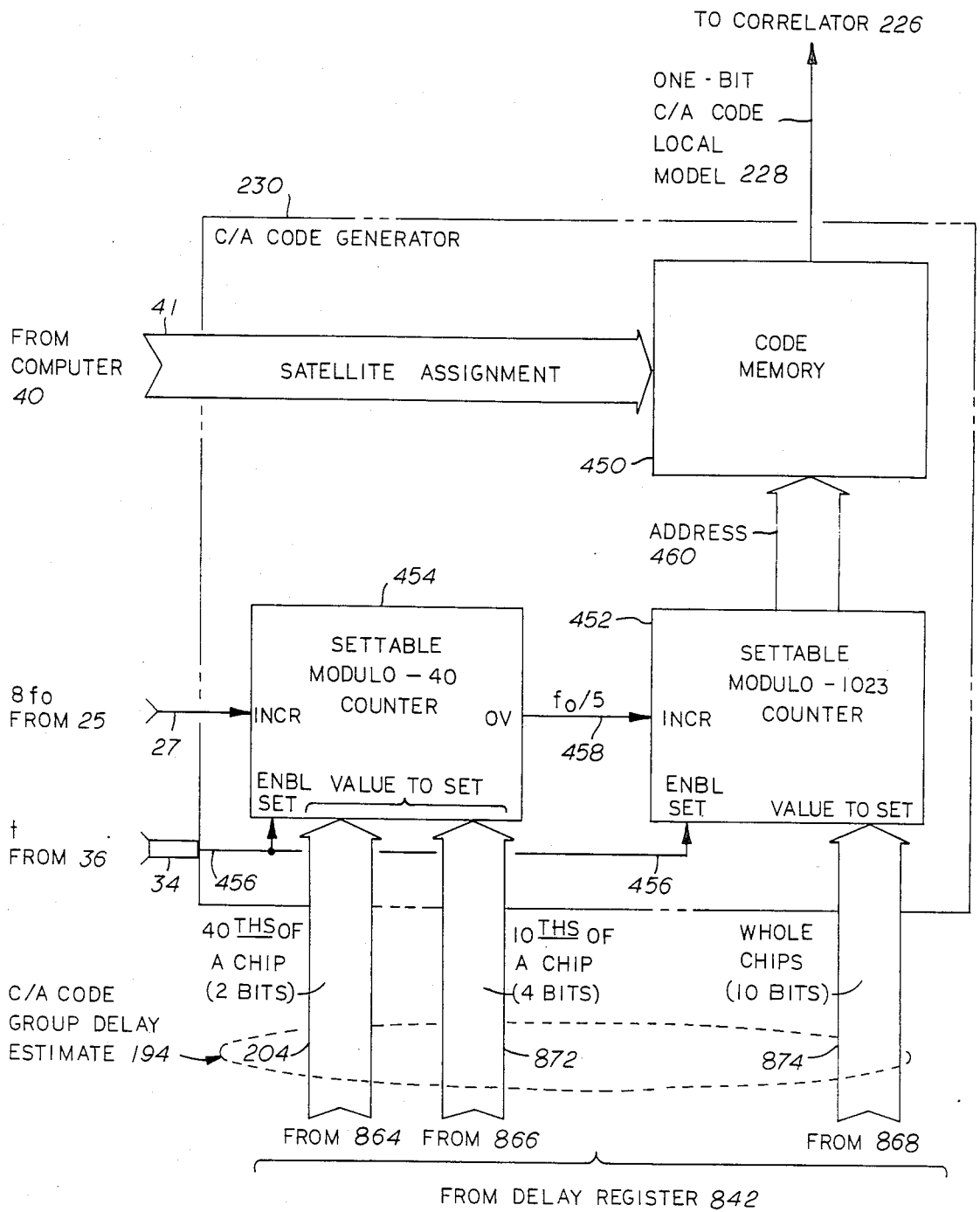
FIG. 11 is a block diagram of the C/A code generator depicted in the error detecting system shown in FIG. 7.

Referring now to FIG. 11, C/A code generator 230, shown in FIG. 7, is disclosed in greater detail. As noted with reference to FIG. 7, C/A code generator 230 generates one bit C/A code local model 228 which is a pseudorandom sequence of 1023 bit values representing the C/A code specific to GPS satellite 12. This sequence is transmitted by GPS satellite 12 periodically with a period of 1 millisecond.

One bit C/A code local model 228 from C/A code generator 230 is applied to correlator 226 wherein one bit C/A code local model 228 is correlated with unwound complex video signal U which represents inphase unwound video signal 222 and quadrature unwound video signal 224.

One bit C/A code local model 228 correlates constructively only with the particular component of unwound complex video signal U which originated from GPS satellite 12. The C/A code used in every other satellite is uncorrelated, that is, orthogonal, with the code of GPS satellite 12. Because of this orthogonality, correlator 226 serves to select the signals from GPS satellite 12 and to reject the signals from other satellites.

As discussed with reference to FIG. 2, real time computer 40 generates satellite assignment 41 which is applied to satellite tracking channel 32 in order to indicate the particular GPS satellite, GPS satellite 12, which is to be tracked by satellite tracking channel 32. As shown in FIG. 6, within satellite tracking channel 32, satellite assignment 41 is applied to 308 $f_o$ carrier phase and C/A code delay error detector 190 within which, as shown in FIG. 7, satellite assignment 41 is applied to C/A code generator 230. As discussed below, satellite assignment 41 causes C/A code generator 230 to generate the particular code sequence, one bit C/A code local model 228, which is specific to GPS satellite 12.

C/A code generator 230 also receives digital real time indication 34 from real time clock 36, 8 $f_o$ reference frequency 27 from doubler 25, and C/A code group delay estimate $\tau_{est}$ 194 from delay register 842, as shown in FIG. 7. These three inputs together govern the timing of the generation of one bit C/A code local model 228.

As discussed below with reference to FIG. 13, delay register 842 contains and generates C/A code group delay estimate $\tau_{est}$ 194, an estimate of the actual C/A code group delay observable $\tau$ of the C/A code component of GPS signals 15 received from GPS satellite 12. C/A code group delay estimate $\tau_{est}$ 194 is adjusted by the action of delay error signal 200, generated by correlator 226, in order to minimize the difference between the C/A code group delay estimate $\tau_{est}$ 194 and the actual C/A code group delay observable $\tau$. Thus C/A code generator 230 is a part of a delay-locked feedback loop which includes correlator 226 and delay register 842.

Referring to FIG. 11, C/A code generator 230 includes code memory 450, settable modulo-1023 counter 452 and settable modulo-40 counter 454. Satellite assignment 41 from real time computer 40 is applied to code memory 450. Satellite assignment 41 preferably includes the complete 1023-bit sequence which is to be reproduced by C/A code generator 230 as one bit C/A code local model 228. Transferral of this satellite-specific sequence to code memory 450 from real time computer 40 therefore has the desired effect of assigning C/A code generator 230 to GPS satellite 12. Such a transfer must be performed whenever it is desired to begin tracking a satellite with satellite tracking channel 32. Satellite assignment 41 will retained in code memory 450 until a different satellite assignment 41 is received from real time computer 40.

It should be noted that the assignment of other parts of satellite tracking channel 32 to GPS satellite 12 is accomplished by means not involving knowledge and use of the satellite-specific code. In particular, L1 band $f_o$ carrier phase detector 206 and L2 band $f_o$ carrier phase detector 208 in satellite tracking channel 32 are assigned to GPS satellite 12 by application of satellite-specific $f_o$ carrier phase estimate 204, as illustrated in FIG. 6 and FIG. 12 and discussed with reference thereto.

For special purposes, such as for test purposes, special sequences of bits might be transferred to, and stored within, code memory 450. Alternatively, code memory 450 could be configured to retain more than one sequence of bits, and a particular one of these sequences could be selected by means of satellite assignment 41. For example, every possible C/A code sequence, for every GPS satellite, could be permanently contained in code memory 450, and satellite assignment 41 could designate which code was to be read out of code memory 450.

Code memory 450 receives address 460 from settable modulo-1023 counter 452. Address 460 controls the reading of bits from code memory 450. The value of address 460 is the address in code memory 450 of the particular bit in the code sequence which is read out of code memory 450 as one bit C/A code local model 228. The bits are caused to be read out in sequence, one at a time, by repetitively incrementing the value of address 460.

If, as noted above, code memory 450 has been loaded with the 1023-bit sequence corresponding to the C/A code of GPS satellite 12, with successive bits of the sequence stored at successive addresses from zero to 1022, then the proper one-bit C/A code local model 228 can be generated by incrementing address 460 in steps of one at a rate of 1,023,000 steps per second. This is done, as shown in FIG. 11, by deriving address 460 from settable modulo-1023 counter 452, which serves as a memory-address counter, and by incrementing settable modulo-1023 counter 452 with $f_o/5$ input 458, from settable modulo-40 counter 454.

$f_o/5$ input 458 has a frequency of $f_o/5$, or 1,023,000 per second, so that address 460 increases at this rate. Settable modulo-1023 counter 452 counts upward until a maximum value of 1022 is reached. After reaching a value of 1022, instead of increasing to 1023, the count returns to zero causing a return to the starting-point of the 1023-bit C/A code sequence.

Settable modulo-40 counter 454 receives 8 $f_o$ reference frequency 27 from doubler 25, and divides this frequency by 40 to generate $f_o/5$ input 458 which is applied to settable modulo-1023 counter 452.

The relative timing, that is, the phase of one bit C/A code local model 228 relative to digital real time indication 34 from real time clock 36, is controlled by C/A code group delay estimate $\tau_{est}$ 194 from delay register 842. Millisecond tick 456, included in digital real time indication 34, is a pulse occurring once per millisecond, every time that exactly an integer number of milliseconds is indicated by digital real time indication 34. In other words, millisecond tick 456 marks integer milliseconds.

Millisecond tick 456 is applied to inputs of settable modulo-40 counter 454 and settable modulo-1023 counter 452, which are configured such that each occurrence of millisecond tick 456, marking an integer millisecond according to real time clock 36, causes the current value of C/A code group delay estimate $\tau_{est}$ 194 to be copied into settable modulo-40 counter 454 and settable modulo-1023 counter 452. In other words, millisecond tick 456 enables the setting of settable modulo-40 counter 454 and settable modulo-1023 counter 452, and C/A code group delay estimate $\tau_{est}$ 194 provides the values to which these counters are instantaneously set.

As shown in FIG. 11, and as also shown and discussed with reference to FIG. 13, C/A code group delay estimate $\tau_{est}$ 194 includes 10-bit whole chip group delay estimate 874 from modulo-1023 reversible counter 868, in delay register 842. 10-bit whole chip group delay estimate 874 indicates the whole number of C/A code chips, from zero to 1022, or modulo 1023, which should have been generated by C/A code generator 230 at the occurrence of millisecond tick 456.

The fraction of a C/A code chip which should have been generated by C/A code generator 230 at the occurrence of millisecond tick 456 is indicated by tenths-of-a-chip delay estimate 872 from 4-bit, modulo-10 counter 866, of modulo-40 counter 860 in delay register 842, and by 2-bit $f_o$ carrier phase estimate 204 from 2-binary-bit, modulo-4, counter 864, of modulo-40 counter 860 in delay register 842. As noted with reference to FIG. 13, $f_o$ carrier phase estimate 204 represents delay in units equivalent of one-quarter cycle of phase at a frequency of 2 $f_o$. These units are also 40$^{ths}$ of a C/A code chip.

As shown in FIG. 11, 10-bit chip group delay estimate 874 is applied to the "value to set" input of settable modulo-1023 counter 452, such that the instantaneous value of 10-bit whole chip group delay estimate 874 will be copied into settable modulo-1023 counter 452 at each occurrence of millisecond tick 456.

Two-bit, $f_o$ carrier phase estimate 204 and 4-bit estimate 872, which together represent the entire contents of modulo-40 counter 860, are applied together to the "value to set" input of settable modulo-40 counter 454, such that the instantaneous values of $f_o$ carrier phase estimate 204 and 4-bit estimate 872, together representing a fraction of a C/A code chip, will be copied into settable modulo-40 counter 454 at each occurrence of millisecond tick 456.

From one occurrence of millisecond tick 456 to the next, settable modulo-40 counter 454 and settable modulo-1023 counter 452 will increment at exactly uniform rates, of 8 $f_o$ and $f_o/5$, respectively, in accordance with 8 $f_o$ reference frequency 27. Therefore, one bit C/A code local model 228 will be generated at a constant rate, except for discontinuous or "step" adjustments of delay, or code phase, occurring at integer milliseconds in accordance with millisecond tick 456 from digital real time indication 34. It would be more desirable to generate one bit C/A code local model 228 with a smoothly varying rate and phase. However, the discontinuities at the integer milliseconds are minor. The range between antenna 22 and GPS satellite 12 varies typically by less than one meter per millisecond. Each millisecond, the average delay of one bit C/A code local model 228 as generated by C/A code generator 230 will be biased by one-half the amount of the delay discontinuity occurring at the integer millisecond, due to the stepwise nature of the generated delay variation. This bias is conveniently accounted for in the processing of the C/A code group delay observable $\tau$ of the C/A code component of GPS signals 15 by real time computer 40.

FIG. 12

Referring now to FIG. 12, L1 band $f_o$ carrier phase detector 206 shown in FIG. 6 is disclosed in greater detail. As noted with reference to FIG. 6, L2 band $f_o$ carrier phase detector 208 is identical in operation to L1 band $f_o$ carrier phase detector 206 except that it operates on signals received in the L2 band of frequencies. Phasor counter rotator 240 at the input to L1 band $f_o$ carrier phase detector 206 receives in-phase reconstructed L1 and $f_o$ carrier composite 88 and quadrature phase reconstructed L1 band $f_o$ carrier composite 90 as inputs from L1 band $f_o$ carrier reconstructor and down converter 86 shown in FIG. 3.

As noted above with respect to FIG. 9, the operation of phasor counter rotator 240 is identical to that of phasor counter rotator 220 shown in FIG. 7 except that phasor counter rotator 240 operates on L1 band reconstructed carrier composite phasor 89 while phasor counter rotator 220 operates on complex video phasor 83. L1 band reconstructed carrier composite phasor 89 is the phasor in the complex plane that represents the composite of all the individual, satellite specific L1 band reconstructed $f_o$ phasors such as L1 band reconstructed $f_o$ carrier phasor 89$_{12}$ from GPS satellite 12.

Phasor counter rotator 240 receives $f_o$ carrier phase estimate 2204 from phase and group delay register subsystem 196 as its second input. As noted below with reference to FIG. 13, $f_o$ carrier phase estimate 204 is derived directly from delay register 842, and indirectly from phase register 840, both of which are contained in-phase and group delay register subsystem 196. $f_o$ carrier phase estimate 204 is a two bit signal representing only the quadrant of the estimated reconstructed $f_o$ carrier, phase modulo one cycle, at the reconstructed carrier frequency. As noted above, the phase of the reconstructed $f_o$ carrier, that is, the angle of L1 band reconstructed $f_o$ carrier phasor 89$_{12}$, is double that of the corresponding $f_o$ carrier which is implicit in complex video signal V, which is a composite of suppressed-carrier, spread-spectrum signals.

As noted above with reference to FIG. 1, implicit in both the L1 and the L2 band portions of the suppressed-carrier, spread-spectrum GPS signals 15, transmitted by GPS satellite 12, is an implicit carrier wave of frequency nominally equal to $f_o$, or 5.115 MegaHertz. $f_o$ is the fundamental frequency which is generated by a frequency standard, not shown, within GPS satellite 12, and which is the basis for the construction of all signals transmitted by GPS satellite 12. The actual frequency of this implicit carrier may of course deviate from exactly $f_o$, depending on the accuracy of the satellite's frequency standard. The deviation of the actual implicit carrier frequency from exactly $f_o$ is normally less than about 0.05 Hertz, or about 1 part in $10^8$ of $f_o$.

Spread-spectrum GPS signals 15 from GPS satellite 12 received by antenna 22 and fed to receiver 24, as discussed with reference to FIG. 2 and FIG. 3, have been delayed and Doppler-shifted as a result of the relative position and velocity of the antenna in GPS satellite 12, not shown, with respect to antenna 22. The phases, $\psi_{L1}$ and $\psi_{L2}$, of the $f_o$ carriers implicit in the L1 and L2 bands of GPS signals 15, as received, reflect the group delays of the signals received in the respective bands. L1 band $f_o$ carrier phase detector 206 and L2 band $f_o$ carrier phase detector 208 measure $\psi_{L1}$ and $\psi_{L2}$, respectively. The Doppler frequency shifts of the $f_o$ carriers implicit in both the L1 and L2 bands of GPS signals 15, as received, vary between plus and minus 15 Hertz as the satellite rises, traverses the sky, and sets. Expressed as a fraction of $f_o$, this Doppler frequency shift is between about plus and minus 3 parts in $10^6$. Thus, the typical Doppler frequency shift is of the order of two orders of magnitude greater than the $f_o$ carrier frequency deviation normally due to offset of the frequency standard within GPS satellite 12.

The radio frequency to video frequency down-conversion performed within radio frequency to video frequency down converter 76, shown in FIG. 3, does not alter the frequency of the $f_o$ carrier implicit in GPS signals 15, as received, nor does this frequency down-conversion alter the spread-spectrum nature of these signals. Complex video signal V, whose real and imaginary parts are in-phase video signal 82 and quadrature video signal 84, as shown in FIG. 3, is a composite of the spread-spectrum signals received from all visible satellites. In complex video signal V, the spread-spectrum component of GPS signals 15 has an implicit carrier of frequency near $f_o$, shifted by between plus and minus 15 Hertz due mainly to the Doppler effect, as noted above.

The spread-spectrum components of complex video signal V coming from satellites other than GPS satellite 12 have implicit carrier frequencies which also are near $f_o$, but which are shifted by different amounts reflecting the different satellite motions with respect to antenna 22, and reflecting as well any differences between the offsets of the frequency standards in the different satellites.

The differences between the frequencies of the $f_o$ carriers implicit in the signals received from different GPS satellites are utilized within L1 band $f_o$ carrier phase detector 206 and within L2 band $f_o$ carrier phase detector 208 to separate the signals received from GPS satellite 12 from the signals received from different satellites. As noted with reference to FIG. 2, an individual satellite tracking channel 32 within terminal 23 is assigned to each satellite. Within satellite tracking channel 32 assigned to GPS satellite 12, as shown in FIG. 6, L1 band $f_o$ carrier phase detector 206 and L2 band $f_o$ carrier phase detector 208 receive satellite-specific $f_o$ carrier phase estimate 204, a prediction of the time-varying phase of the $f_o$ carriers implicit in this particular satellite's L1 and L2 band signals. The time-rate-of-change of $f_o$ carrier phase estimate 204 represents the predicted frequency shift of the $f_o$ carriers implicit in the signals being received from GPS satellite 12.

$f_o$ carrier phase estimate 204 is applied to both L1 band $f_o$ carrier phase detector 206 and L2 band $f_o$ carrier phase detector 208, because theoretically the same $f_o$ carrier frequency shifts should be observed in both bands, except for the presence of any time-varying dispersive effects in the signal propagation paths. Small dispersive effects are in fact present, due to the ionosphere and due to multipath. However, in the present context, these effects are normally insignificant.

As noted below with reference to FIG. 13, $f_o$ carrier phase estimate 204, and thus the frequency prediction which is used within L1 band $f_o$ carrier phase detector 206 to distinguish the signal of GPS satellite 12 from the signals of other satellites, is derived within phase and group delay register subsystem 196 from continuously updated 30-bit C/A code group delay estimate $\tau_{est}$ 876 contained in delay register 842. The reason for deriving $f_o$ carrier phase estimate 204 from the 30-bit C/A code group delay estimate $\tau_{est}$ 876 is that the time-variation of the L1 $f_o$ carrier phase $\psi_{L1}$ is similar to that of the group delay of the C/A code modulation of the L1 signal from the same satellite. That is, the C/A code group delay variation, multiplied by the implicit carrier frequency $f_o$, should approximate the implicit carrier phase variation. The necessary multiplication of the delay by the implicit carrier frequency $f_o$ is accomplished conveniently by tapping the appropriate stage in the chain of appropriate counters, or dividers, which form delay register 842, as shown and discussed in detail with reference to FIG. 13.

Referring again to FIG. 3, complex video signal V from L1 radio frequency to video frequency down converter 76 is applied to L1 band $f_o$ carrier reconstructor and down converter 86, wherein two basic operations are performed. As discussed with reference to FIG. 5, the first basic operation performed within L1 band $f_o$ carrier reconstructor and down converter 86 is to reconstruct, from complex video signal V, complex L1 band reconstructed $f_o$ carrier composite $S_{(L1)}$ which is a composite of continuous-wave components, called reconstructed carriers, representing the L1 $f_o$ implicit carrier waves. A second composite of continuous-wave components first appears at the output of mixer 150, shown in FIG. 5, wherein separate spectral component of complex video signal V are mixed together.

The phases and frequencies of the reconstructed carriers in this second composite are related to the phases and frequencies of the respective implicit carriers of the respective spread-spectrum signal components received from the respective satellites. Each reconstructed carrier has double the phase and double the frequency of the respective implicit carrier. Because of the frequency doubling, narrow bandpass filter 152, shown in FIG. 5, is centered at $2 f_o$ rather than $f_o$. As mentioned with reference to FIG. 5, in order to reduce the speed requirements of subsequent signal-processing circuitry, the reconstructed carriers in second composite signal 154 of narrow bandpass filter 152 are then down converted, from the narrow band of frequencies centered at $2 f_o$, to a narrow band centered at zero frequency. This down conversion yields complex L1 band reconstructed $f_o$ carrier composite $S_{(L1)}$, whose real and imaginary parts are respectively, in-phase reconstructed L1 band $f_o$ carrier composite 88, and quadrature phase reconstructed L1 band $f_o$ carrier composite 90.

The frequency shifts of the $f_o$ implicit carriers due to the Doppler effect and to any satellite frequency-standard offset relative to frequency standard 28 of terminal 23, shown in FIG. 2, but doubled, are preserved in the down conversion operation performed within L1 band $f_o$ carrier reconstructor and down converter 86. The effect of this down conversion is to subtract the constant $2 f_o$ reference frequency and phase of local oscillator reference input 160, shown in FIG. 5, from the respective frequencies and phases of the reconstructed carriers.

As shown in FIG. 2 and FIG. 3, the down-converted in-phase reconstructed L1 band $f_o$ carrier composite 88 and quadrature phase reconstructed L1 band $f_o$ carrier composite 90 are included in the set of low frequency signals 30 which is input to every one of the several identical satellite tracking channels like satellite tracking channel 32, shown in FIG. 6. As noted above, within satellite tracking channel 32, which is assigned to GPS satellite 12, L1 band $f_o$ carrier phase detector 206 selects the particular reconstructed carrier signal from GPS satellite 12 by use of the satellite-specific frequency prediction generated by phase and group delay register subsystem 196, and represented by the time-rate-of change of $f_o$ carrier phase estimate 204.

Referring now to FIG. 12, L1 band $f_o$ carrier phase detector 206 compares phase observable $\psi_{L1}$ of GPS satellite 12's L1 band $f_o$ carrier to $f_o$ carrier phase estimate 204, and yields L1 $f_o$ residual phase measurement 210. In like manner, L2 band $f_o$ carrier phase detector 208 compares phase observable 104 $_{L2}$ of GPS satellite 12's L2 band $f_o$ carrier to $f_o$ carrier phase estimate 204, and yields L2 $f_o$ residual phase measurement 212. Since both the L1- and the L2-related $f_o$ residual phase measurements are determined with respect to the same $f_o$ carrier phase estimate 204, any errors in this estimate will be reflected in common in both the L1- and the L2-related $f_o$ residual phase measurements. Therefore, the difference between the L1- and the L2-related $f_o$ residual phase measurements will be insensitive to errors in $f_o$ carrier phase estimate 204. This insensitivity is important because the difference between the L1- and the L2-related $f_o$ carrier phase measurements for each satellite is used by real time computer 40 to determine the amount of ionospheric delay and phase shift of the satellite's signals, in order to determine position information without loss of accuracy due to ionospheric effects.

Because local oscillator reference input 160 used in the down-conversion performed in L1 band $f_o$ carrier reconstructor and down converter 86 to generate $S_{(L1)}$ applied to L1 band $f_o$ carrier phase detector 206 is derived from the same 4 $f_o$ reference signal 26 from the same frequency standard 28 in terminal 23, as is used in L2 band $f_o$ carrier reconstructor and down converter 96 to generate $S_{(L2)}$ applied to L2 band $f_o$ carrier phase detector 208, any phase or frequency variations of frequency standard 28 will also be reflected equally in both L1 $f_o$ residual phase measurement 210 and L2 $f_o$ residual phase measurement 212. Thus, the difference between the L1- and the L2-related $f_o$ residual phase measurements is also insensitive to phase and frequency variations of frequency standard 28. This insensitivity is also important for determining accurately the amount of ionospheric delay and phase shift of the satellite's signals, in order to determine position information without loss of accuracy due to ionospheric effects.

It may readily be understood that, for the same reason, antenna 22 and terminal 23 should be constructed and arranged generally such that any source of error affecting L1 $f_o$ residual phase measurement 210 will tend to affect L2 $f_o$ residual phase measurement 212 equally. For like reasons, the entire system shown in FIG. 1 for determining position should also be constructed and arranged such that any source of error affecting any measurement of any satellite's signals will tend to affect corresponding measurements of all other satellite's signals equally.

Referring again to FIG. 12, in-phase reconstructed L1 band $f_o$ carrier composite 88 and quadrature phase reconstructed L1 band $f_o$ carrier composite 90 are applied as inputs to phasor counter rotator 240 at one input of L1 band $f_o$ carrier phase detector 206. In addition, $f_o$ carrier phase estimate 204 is applied to the other input of phasor counter rotator 240. In a manner similar to that employed by phasor counter rotator 220 shown in FIG. 7, phasor counter rotator 240 serves to subtract a phase, in this case $f_o$ carrier phase estimate 204, from complex L1 band reconstructed $f_o$ carrier composite $S_{(L1)}$.

As explained with reference to FIG. 8, the manner of phase subtraction may be understood as a counter-rotation of L1 band reconstructed carrier composite phasor 89, representing complex L1 band reconstructed $f_o$ carrier composite $S_{(L1)}$. In the complex L1 band reconstructed $f_o$ carrier composite $S_{(L1)}$, L1 band reconstructed carrier composite phasor 89 is rotated clockwise, or "unwound", by an angle equal to $f_o$ carrier phase estimate 204. However, as previously noted with respect to phasor counter rotator 220, only two bits are used to represent each phasor, and the output of phasor counter rotator 240 is just a pair of one bit digital signals, in-phase unwound reconstructed $f_o$ carrier residual phase 244 and quadrature unwound reconstructed $f_o$ carrier residual phase 246, which taken together indicate only the quadrant of the unwound complex composite reconstructed carrier residual phase signal.

This two-bit quadrant indication may seem too crude, in view of the position-determination accuracy which may be desired. The phase quantization, of one-quarter cycle, corresponds to distance quantization of one quarter of the wavelength of a radio wave of frequency equal to the reconstructed carrier frequency, 2 $f_o$, or about 10 MegaHertz. Thus, the distance quantization is about 7.5 meters, and the RMS quantization error, given by the quantization level divided by the square root of 12, is about 2 meters. It is important to note, however, that this level of phase.

As will be described below, measurements of $f_o$ carrier phase observables $\psi_{L1}$ by L1 band $f_o$ carrier phase detector 206 and $\psi_{L2}$ by L2 band $f_o$ carrier phase detector 208 result from relatively long integrations of the unwound reconstructed carrier residual phase signals, preferably over time intervals of about 100 seconds. During such a long time interval, $f_o$ carrier phase estimate 204 varies typically by very many cycles of phase, and the variation is quite non uniform due to the accelerations of GPS satellite 12 and antenna 22. $f_o$ carrier phase estimate 204 rotates through a full cycle, or four quadrants, for every 30-meter change in the distance between GPS satellite 12 and antenna 22.

The projection of the orbital velocity of GPS satellite 12 along the line of sight to antenna 22 is typically several hundred meters per second, and typically changes at a rate of the order of 0.1 meter per second per second. Any acceleration of antenna 22 will of course also contribute. Thus, the error associated with quantization tends to be averaged over a rather large number of quarter-cycle phase steps during the course of each 100-second integration, so that the quantization noise remaining in the phase measurement is likely to be negligible.

It is also important for the reduction of quantization error in L1 band $f_o$ carrier phase detector 206 and L2 band $f_o$ carrier phase detector 208 that the signal-to-noise ratio of in-phase reconstructed L1 band $f_o$ carrier composite 88 and quadrature phase reconstructed L1 band $f_o$ carrier composite 90 is extremely low. The large amount of noise in these signals acts to "dither" or smear out the quantization.

As noted above, phasor counter rotator 240 subtracts from complex L1 band reconstructed $f_o$ carrier composite $S_{(L1)}$ an amount of phase equal to the current estimate of the phase of the selected satellite's component, in order to permit selection of that reconstructed carrier component from the complex L1 band reconstructed $f_o$ carrier composite $S_{(L1)}$. By virtue of this essentially continuous phase subtraction, the phase of the selected satellite's reconstructed carrier component in the unwound complex output of phasor counter rotator 240 will be virtually stationary. Therefore, a long time-integration of the unwound complex output of phasor counter rotator 240 may be employed to select the desired signal and to reject noise and signals from other satellites. Other satellites' signals will be rejected because their unwound phasors will still rotate during the integration time interval. The counter rotation performed by phasor counter rotator 240 will not have made their phasors stationary because $f_o$ carrier phase estimate 204 was not derived for them and they have different frequency shifts.

To effect this satellite selection process, in-phase unwound reconstructed $f_o$ carrier residual phase 244 and quadrature unwound reconstructed $f_o$ carrier residual phase 246 from phasor counter rotator 240 are applied as inputs to in-phase integrator 248 and quadrature integrator 250. In-phase integrator 248 and quadrature integrator 250 may be constructed in the same manner as 0.01 second integrators 324 and 328 shown in FIG. 10 except that their integration period is set to 100 seconds, rather than 0.01 seconds. Also, since the bandwidths of the signals processed in L1 band $f_o$ carrier phase detector 206 are so much smaller than those involved in correlator 226, it is possible to use logic circuits in phasor counter rotator 240, in-phase integrator 248, and quadrature integrator 250 which are clocked at a correspondingly slower rate.

There are two reasons for the use of an extended integration period in L1 band $f_o$ carrier phase detector 206. First, as noted, the signal to noise ratio between the reconstructed $f_o$ carrier signals in complex L1 band reconstructed $f_o$ carrier composite $S_{(L1)}$ and the background noise is much lower than the signal to noise ratio of the 308 $f_o$ carrier signals reconstructed in mixers 302 and 308 in on-time signal detector 350 shown in FIG. 10, because the latter signals are greatly amplified by correlation with the matching local model of the satellite-specific C/A code.

The lower signal to noise ratio in complex L1 band reconstructed $f_o$ carrier composite $S_{(L1)}$ results from the fact that the carrier reconstruction performed by L1 band $f_o$ carrier reconstructor and down converter 86 is accomplished without the benefit of knowledge or use of the code associated with that carrier. The longer integration period used in in-phase integrator 248 and quadrature integrator 250 improves the effective signal to noise ratio by reducing the noise equivalent bandwidth to 0.01 Hertz. In other words, noise which is present in in-phase unwound reconstructed $f_o$ carrier residual phase 244 and quadrature unwound reconstructed $f_o$ carrier residual phase 246 with frequencies differing by more than about 0.01 Hertz from the frequency of the selected reconstructed carrier will be attenuated by the integration.

An equally important reason for the extended integration period used in L1 band $f_o$ carrier phase detector 206 is to reject the reconstructed $f_o$ carrier signals from the other GPS satellites not tracked by this particular satellite tracking channel 32. As noted above, the Doppler shifts of the reconstructed $f_o$ carrier signals from the various GPS satellites generally differ within a range of plus and minus 30 Hertz. $f_o$ carrier phase estimate 204 applied to phasor counter rotator 240 changes with time at a rate which reflects the Doppler shift of GPS satellite 12, to which satellite tracking channel 32 is assigned.

The Doppler shift of any particular 2 $f_o$ reconstructed carrier signal is equal to the frequency 2 $f_o$ multiplied by the time derivative of C/A code group delay observable $\tau$. As 30-bit C/A code group delay estimate $\tau_{est}$ 876 contained to delay register 842 changes, so does $f_o$ carrier phase estimate 204 which is subtracted from complex L1 band reconstructed $f_o$ carrier composite $S_{(L1)}$.

In this manner it can be seen that phasor counter rotator 240 applies a frequency shift to complex L1 band reconstructed $f_o$ carrier composite $S_{(L1)}$ equal in magnitude and opposite in sign to the Doppler shift peculiar to GPS satellite 12 at that instant of time, subject only to the accuracy of $f_o$ carrier phase estimate 204.

Therefore the rotation of GPS satellite 12's L1 band reconstructed $f_o$ carrier phasor, as indicated by phasor counter rotator 240's one-bit outputs in-phase unwound reconstructed $f_o$ carrier residual phase 244 and quadrature unwound reconstructed $f_o$ carrier residual phase 246, will have been virtually stopped, while the reconstructed $f_o$ carrier phasors from other GPS satellites will continue to rotate. Their rates of rotation will equal the differences between their frequency shifts and the frequency of $f_o$ carrier phase estimate 204.

The filter bandwidth effectively obtained by the 100 second integration, as noted above, is about 0.01 Hertz. This value is approximately 1/3000th of the maximum magnitude of Doppler shift of about 30 Hertz. Therefore, most of the time, only the desired L1 band reconstructed $f_o$ carrier component will be within the passband of the 0.01 Hertz bandwidth filter which is formed by in-phase integrator 248 and quadrature integrator 250.

Occasionally, of course, another satellite's reconstructed $f_o$ carrier will be found to have the same Doppler shift, within 0.01 Hertz, as that of GPS satellite 12. However, these occasions are infrequent and the Doppler shifts of two different satellites will not remain equal within 0.01 Hertz for very long time. In particular, it is important that the Doppler shifts of two different satellites generally do not remain equal within 0.01 Hertz for as long as 100 seconds. Therefore, the L1 band reconstructed $f_o$ carrier component from GPS satellite 12 will indeed be selected, and any other satellite's signal will be rejected, by the 100 second integrations performed by in-phase integrator 248 and quadrature integrator 250.

In-phase integrator output 252 and quadrature integrator output 254 may be regarded as the real and imaginary parts, respectively, of a complex number whose angle is the desired measurement of L1 $f_o$ carrier residual phase. In order to determine this phase, in-phase integrator output 252 and quadrature integrator output 254 are input to four-quadrant inverse tangent generator 256, whose output is L1 $f_o$ carrier residual phase measurement 210. Four-quadrant inverse tangent generator 256 may be constructed like, and may operate in almost the same manner as, two quadrant inverse tangent function generator 334 shown in FIG. 10.

Four-quadrant inverse tangent generator 256 generates L1 $f_o$ carrier residual phase measurement 210 equal to the angle in the range minus one-half to plus one-half cycle, whose sine is $$Q/(I^2+Q^2)^{\frac{1}{2}},$$

whose cosine is $I/(I^2+Q^2)^{\frac{1}{2}}$, and whose tangent is Q/T, where I is in-phase integrator output 252 and Q is quadrature integrator output 254 as shown in FIG. 12. Note that this inverse tangent function generator yields a result with a four-quadrant, or one-cycle range, whereas the inverse tangent generation performed by two quadrant inverse tangent function generator 334 shown in FIG. 10 yields a result with a two-quadrant, or one-half cycle range. In four-quadrant inverse tangent generator 256 a four-quadrant inverse tangent function generation is useful and preferable because the reconstructed $f_o$ carrier residual component present in in-phase integrator output 252 and quadrature integrator output 254 does not have phase reversals due to telemetry modulation. However, since the phase of the $f_o$ carrier implicit in the in-phase reconstructed L1 band $f_o$ carrier composite 88 and quadrature phase reconstructed L1 band $f_o$ carrier composite 90 input to L1 band $f_o$ carrier phase detector 206 was doubled by the carrier reconstruction operation performed by L1 band $f_o$ carrier residual phase detector 206, L1 $f_o$ carrier residual phase measurement 210 from four-quadrant inverse tangent generator 256 represents the phase of the $f_o$ implicit carrier uniquely modulo 0.5 cycle.

FIG. 13

Referring now to FIG. 13, phase and group delay register subsystem 196 discussed above with respect to FIG. 6 is shown in detail. Because phase and group delay register subsystem 196 is at the heart of the operation of terminal 23, a review of the manner of interaction between phase and group delay register subsystem 196, and other portions of terminal 23, will be helpful for a clear understanding of the instant invention.

As noted above with respect to FIG. 6, phase and group delay register subsystem 196 performs a major portion of the operation of satellite tracking channel 32. Within satellite tracking channel 32, the phase and delays inherent in GPS signals 15 from GPS satellite 12 are tracked. Phase and delay measurements 202, included within measurements 42, are generated by phase and group delay register subsystem 196 and applied to real time computer 40. Phase and group delay register subsystem 196 receives, included within estimate 38, group delay initial value 37 and frequency estimate 39, from real time computer 40.

Phase and group delay register subsystem 196 also generates 308 $f_o$ carrier phase estimate $\phi_{est}$ 192 and C/A code group delay estimate $\tau_{est}$ 194 which are applied as inputs to 308 $f_o$ carrier phase and C/A code delay error detector 190.

As noted above with respect to FIG. 9, 308 $f_o$ carrier phase estimate $\phi_{est}$ 192 is a modulo one cycle estimate of phase. Half-cycle bit 812 and quarter-cycle bit 814 taken together indicated only the quadrant of 308 $f_o$ carrier phase estimate $\phi_{est}$ 192.

Similarly, C/A code group delay estimate $\tau_{est}$ 194 is modulo one millisecond, that is, one period of the C/A code function. Thus C/A code group delay estimate $\tau_{est}$ 194 provides only the fractional-period part of the group delay estimate to 308 $f_o$ carrier phase and C/A code delay error detector 190.

308 $f_o$ carrier phase and C/A code delay error detector 190 determines the difference between 308 $f_o$ implicit carrier phase observable $\phi$ and 308 $f_o$ carrier phae estimate $\phi_{est}$ 192, modulo one-half cycle, and generates phase error signal 198. Similarly, 308 $f_o$ carrier phase and C/A code delay error detector 190 detects the difference between C/A code group delay observable $\tau$ and C/A code group delay estimate $\tau_{est}$ 194, modulo one millisecond, and generates delay error signal 200.

Phase error signal 198 and delay error signal 200 are applied to phase and group delay register subsystem 196 to form both a phase-tracking feedback loop, that is, a phase-locked loop, and a delay-tracking feedback loop, that is, a delay-locked loop.

As noted in greater detail with respect to FIG. 7, in-phase video signal 82 and quadrature video signal 84, represented by complex video phasor 83, are correlated with 308 $f_o$ carrier phase estimate $\phi_{est}$ 192 by phasor counter rotator 220 to generate unwound complex video signal U, represented by unwound complex video phasor 223, which is then cross-correlated in correlator 226 with one bit C/A code local model 228 to produce phase error signal 198. One bit C/A code local model 228, which is specific to GPS satellite 12, is generated by C/A code generator 230 with the appropriate delay under the control of C/A code group delay estimate $\tau_{est}$ 194.

Referring again now to FIG. 6, phase and group delay register subsystem 196 also provides $f_o$ carrier phase estimate 204 to L1 band $f_o$ carrier phase detector 206 and L2 band $f_o$ carrier phase detector 208. $f_o$ carrier phase estimate 204 is modulo one-half cycle of oscillation at $f_o$, that is, one cycle at 2 $f_o$, and has a two-bit digital form similar to 308 $f_o$ carrier phase estimate $\phi_{est}$ 192. $f_o$ carrier phase estimate 204 provides L1 band $f_o$ carrier phase detector 206 and L2 band $f_o$ carrier phase detector 208 with an estimate of the quadrant of L1 band reconstructed $f_o$ carrier phasor $89_{12}$, shown in FIG. 8D.

L1 band $f_o$ carrier phase detector 206 generates L1 $f_o$ carrier residualphase measurement 210 equal to the difference, averaged over 100 seconds, and modulo one-half cycle, between L1 band implicit $f_o$ carrier phase observable $\psi_{L1}$, implicit in the L1 band portion of GPS signals 15 from GPS satellite 12, and $f_o$ carrier phase estimate 204. Similarly, L2 band $f_o$ carrier phase detector 208 generates L2 $f_o$ carrier residual phase measurement 212 equal to the difference, modulo one-half cycle, between L2 band implicit $f_o$ carrier phase observable $\psi_{L2}$, implicit in the L2 band portion of GPS signals 15 from GPS satellite 12, and $f_o$ carrier phase estimate 204.

Referring now to FIG. 13, phase and group delay register subsystem 196 is shown in greater detail. Phase and group delay register subsystem 196 includes two major subsystems, phase register 840 and delay register 842.

Phase register 840 is divided into two parts, phase register lower part 844 and phase register upper part 846. Phase register 840 contains 48-bit, binary 308 $f_o$ carrier phase estimate $\phi_{est}$ 856, which includes 16 least significant bit phase estimate 852 generated by, or contained in, phase register lower part 844 and 32 most significant bit phase estimate 854 generated by, or contained in, phase register upper part 846. Most significant bit (MSB) 848, generated by, or contained in, phase register lower part 844 represents one-quarter of one cycle of 308 $f_o$ implicit carrier phase observable $\phi$. Least significant bit (LSB) 850, generated by or contained in phase register upper part 846 represents one-half of one cycle of 308 $f_o$ implicit carrier phase observable $\phi$.

Phase register upper part 846 generates half-cycle bit 812, applied to phasor counter rotator 220 shown in FIG. 9, equal to least significant bit (LSB) 850. Similarly, phase register lower part 844 generates quarter-cycle bit 814, applied to phasor counter rotator 220, equal to most significant bit (MSB) 848.

Delay register 842 is configured from three cascaded, reversible, up-down, counters: modulo-77 counter 858, modulo-40 counter 860, and modulo-130944 counter 862. Thus delay register 842, unlike phase register 840, may not be regarded as one binary-numerical register. Rather, delay register 842 contains a mixed-base numerical representation of C/A code group delay estimate $\tau_{est}$ 876 including $f_o$ carrier phase estimate 204 and C/A code group delay estimate $\tau_{est}$ 194.

Modulo-77 counter 858 within delay register 842 contains a 7-bit number in the range zero to 76 (decimal), representing group delay in units of one-half period of oscillation at a frequency of 308 $f_o$. Thus, modulo-77 counter 858 contains values of group delay expressed in units equivalent to the phase unit of least significant bit (LSB) 850 of phase register uper part 846. These units are equivalent in the sense that each represents a change in position equal to one-half wavelength of a radio signal of frequency equal to 308 $f_o$, traveling in a vacuum.

Modulo-40 counter 860 within delay register 842 contains a 6-bit number in the range zero to 39 (decimal), representing group delay in units equivalent to 77 half-periods of oscillation at a frequency of 308 $f_o$, which are the same as units of one-fourth of one period oscillation at a frequency of 2 $f_o$.

Modulo-40 counter 860 is configured from two cascaded stages: 2-binary-bit, modulo-4, counter 864 which serves as the input stage; and 4-bit, modulo-10 counter 866 which serves as the following stage.

2-binary-bit, modulo-4, counter 864 within modulo-40 counter 860 generates, or contains 2-bit $f_o$ carrier phase estimate 204 in the range zero to 3 (decimal) representing group delay in units of one-fourth of one period of oscillation at a frequency of 2 $f_o$. As noted above with respect to FIG. 6, 2 bit $f_o$ carrier phase estimate 204 is applied to L1 band $f_o$ carrier phase detector 206 and L2 band $f_o$ carrier phase detector 208.

Note that $f_o$ carrier phase estimate 204 is derived directly from C/A code group delay estimate $\tau_{est}$ 876, not from 308 $f_o$ carrer phase estimate $\phi_{est}$ 856. This is done because the time-variations of the $f_o$ implicit carrier phases are expected to mimic those of C/A code group delay observable $\tau$ more closely than those of 308 $f_o$ implicit carrier phase observable $\phi$. It would be possible to use 308 $f_o$ carrier phase estimate $\phi_{est}$ 856 instead or in addition as the basis for deriving $f_o$ carrier phase estimate 204, if desired.

4-bit, modulo-10 counter 866 within modulo-40 counter 860 generates, or contains, 4-bit estimate 872 in the range zero to 9 (decimal) representing group delay in units of one period of oscillation at a frequency of 2 $f_o$. This unit of group delay is also equal to one chip width of the P-code modulation, and therefore to one-tenth of one chip width of the C/A code modulation. As noted above with respect to FIG. 11, 2-bit $f_o$ carrier phase estimate 204 and 4-bit estimate 872 are applied to C/A code generator 230, as parts of C/A code group delay estimate $\tau_{est}$ 194.

Modulo-130944 counter 862 is configured from two cascaded stages: 10-binary-bit, modulo-1023 reversible counter 868 which serves as the first stage; and 7-bit, modulo-128 reversible counter d870 which serves as the second stage.

10-binary bit, modulo-1023 reversible counter 868 within modulo-130944 counter 862 generates, or contains, 10-bit whole chip group delay estimate 874 in the range zero to 1022 (decimal), representing group delay in units of whole chips of the C/A code modulation. 10-bit whole chip group delay estimate 874, 4-bit estimate 872 from 4-bit, modulo-10 counter 866, and $f_o$ carrier phase estimate 204 together form C/A code group delay estimate $\tau_{est}$ 194. 7-bit modulo-128 reversible counter 870, generates, or contains, a number in the range zero to 127 (decimal), representing delay in units of one millisecond, which is the period of the C/A code.

Before delay-locked tracking of GPS signals 15 from GPS satellite 12 begins, a program is executed by real time computer 40 to compute group delay initial value 37 which is applied to modulo-130944 counter 862 based on external information 44, as shown in FIG. 2. If external information 44 is uncertain, or unavailable, a series of trial values of group delay initial value 37 may be formed by real time computer 40. Group delay initial value 37 is applied to 10-binary-bit, modulo-1023 reversible counter 868 as well as modulo-128 reversible counter 870 within modulo-130944 counter 862. Note that the least signifient bit of group delay initial value 37 represents one chip of C/A code. This precision is sufficient to enable detection of the satellite signal by 308 $f_o$ carrier phase and C/A code delay error detector 190. This precision, being much finer than the repetition period of the C/A code, is also sufficient to prevent integer-period ambiguity in the interpretation of the delay.

30-bit C/A code group delay estimate $\tau_{est}$ 876 is applied to real time computer 40 and includes the 7-bit contents of modulo-77 counter 858, the 6-bit contents of modulo-40 counter 860 and the 17-bit contents of modulo-130944 counter 862. The total value of 30-bit C/A code group delay estimate $\tau_{est}$ 876 is equal to the sum of the numbers contained in each stage of each counter in delay register 842, each multiplied by the respective unit of delay. The total value of 30-bit C/A code group delay estimate $\tau_{est}$ 876 is thus in the range of zero to 128 milliseconds, and has a numerical precision of approximately 0.3 nanoseconds, the delay unit of modulo-77 counter 858. Of course, the instantaneous value of 30-bit C/A code group delay estimate $\tau_{est}$ 876 will differ from C/A code group delay observable $\tau$ by more than 0.3 nanoseconds, due to noise, multipath interference, etc.

The contents of delay register 842, that is, the value of 30-bit C/A code group delay estimate $\tau_{est}$ 876, may be altered, otherwise than through initialization by real time computer 40, by delay register increment 878 from OR gate 890 and by delay register decrement 880 from OR gate 892, both of which are applied to modulo-77 counter 858. Delay register increment 878 increases the value in moduo-77 counter 858 by one and delay register decrement 880 decreases the value in modulo-77 counter 858 by one.

If delay register increment 878 is received by modulo-77 counter 858 while the value contained in modulo-77 counter 858 is equal to 76, then the value will change to zero, and modulo-77 counter 858 will generate overflow signal 882 which is applied to modulo-40 counter 860 causing the value in modulo-40 counter 860 to be incremented by one. If delay register decrement 880 is received by modulo-77 counter 858 while the value in modulo-77 counter 858 is equal to zero, then the value will change to 76, and modulo-77 counter 858 will generate underflow signal 884 which is applied to modulo- 40 counter 860 causing the value in modulo-40 counter 860 to be decremented by one.

In the same manner, modulo-40 counter 860 generates overflow signal 886 and underflow signal 888 which are applied to increment and decrement, respectively, the count in modulo-130944 counter 862. In normal operation, modulo-130944 counter 862 will not overflow or underflow.

OR gate 890 generates delay register increment 878 in response to either delay register incrementing signal 414 within delay error signal 200 or phae adder carry signal 894 from phase adder 898. Similarly, OR gate 892 generates delay register decrement 880 in response to either delay register decrementing signal 418 within delay error signal 200 or phase adder borrow signal 896 from phase adder 898.

Delay error signal 200 is generated by correlator 226 as shown in FIG. 10 to indicate the sign of the difference between C/A code group delay observable $\tau$ and C/A code group N delay estimate $\tau_{est}$ 194, that is, whether the energy detected by early signal detector 352 is greater or less than the energy detected by late signal detector 358. Delay register incrementing signal 414, within delay error signal 200, indicates that 30-bit C/A code group delay estimate $\tau_{est}$ 876 should be increased to better correspond to C/A code group delay observable $\tau$, while delay register decrementing signal 418 indicates that 30-bit C/A code group delay estimate $\tau_{est}$ 876 should be decreased to better correspond to C/A code group delay observable $\tau$.

Phase adder 898 generates phase adder carry signal 894, which is applied to one input of OR gate 890 and the increment input to phase register upper part 846, and phase adder borrow signal 896, which is applied to one input of OR gate 892 and the decrement input of phase register upper part 846, in response to the sum of its three inputs: phase error signal 198 from two quadrant inverse tangent function generator 334, 16 least significant bit phase estimate 852 from phase register lower part 844 and carrier frequency register output 900. Phase adder 898 adds together at least two of these three 16-bit binary numbers 110,000 times per second in response to a timing signal included in digital real time indication 34 from real time clock 36.

Phase added 898 receives phase error signal 198 only at time intervals, according to digital real time indication 34 from real time clock 36, which are integer multiples of 0.01 second. As discussed with reference to FIG. 11, phase error signal 198 is available only at such time intervals, and then only if on-time signal energy indication 348 exceeds threshold value 406, so that above threshold indication 410 is TRUE, indicating that a valid phase error measurement was possible.

Phase adder 898 receives 16 least significant bit phase estimate 852 from phase register lower part 844 precisely 110,000 times per second, at uniformly spaced time intervals according to digital real time indication 34. Phase adder 898 also receives carrier frquency register output 900 from 16-bit frequency register 902, precisely 110,000 times per second, at uniformly spaced time intervals according to digital real time indication 34.

Carrier frequency register output 900 is also applied to real time computer 40 as part of phase and delay measurements 202.

Thus, 109,900 times per second, phase adder 898 may receive and add together just two numbers, 16 least significant bit phase estimate 852 and carrier frequency register output 900; and 100 times per second, phas adder 898 may receive and add together three numbers, including phase error signal 198. At an invariable rate of 110,000 times per second, phase adder 898 yields 16-bit phase sum 904 and, if appropriate, phase adder carry signal 894 or phase adder borrow signal 896. Phase adder carry signal 894 signifies that the addition by phase adder 898 produced a sum which overflowed 16 bits, and phase adder borrow signal 896 signifies that the addition produced a sum which underflowed 16 bits.

16-bit phase sum 904is generated 110,000 times per second and is applied, each time, to phase register lower part 844 to replace the contents thereof. 16-bit phase sum 904 always includes a contribution from 16 least significant bit phase estimate 852 and carrier frequency register output 900, and may include phase error signal 198. Whenever phase adder carry signal 894 is generated by phase adder 898, phase register upper part 846 is incremented by one. Whenever phase adder borrow signal 896 is generated, phase register upper part 846 is decremented by one. As noted above, phase adder carry signal 894 is also applied to OR gate 890 to increment delay register 842 and phase adder borrow signal 896 is also applied to OR gate 892 to decrement delay register 842.

16-bit frequency register 902 receives frequency sum 906 from frequency adder 908 100 times per second and replaces its contents with frequency sum 906 at this rate.

Frequency adder 908 may receive three 16-bit binary number inputs, carrier frequency register output 900 from 16-bit frequency register 902; phase error signal 198 from two quadrant inverse tangent function generator 334; and frequency estimate 39 from real time computer 40.

The inclusion of phase error signal 198 in the inputs to frequency adder 908 tends to improve the dynamic behavior of the phase-locked loop formed by 308 $f_o$ carrier phase and C/A code delay error detector 190 and phase and group delay register subsystem 196 discussed with reference to FIG. 6. Phase error signal 198 must be properly scaled before inclusion in frequency adder 908.

Frequency estimate 39 is included in the inputs to frequency adder 908 for two distinct purposes, initialization and satellite loss.

Frequency estimate 39 is required in frequency adder 908 during initialization so that the signal from GPS satellite 12 may be acquired before the phase locked loop has begun to track 308 $f_o$ implicit carrier phase observable $\phi$. As noted above with respect to FIG. 10, 0.01 second integrators 324 and 328 in correlator 226 have an effective bandwidth of about 100 Hertz. In phase unwound vido signal 222 and quadrature unwound video signal 224 applied to correlator 226 must therefore be accurately generated by phasor counter rotator 220 so that the signal to be integrated is within the effective bandpass of these integrators. In other words, 308 $f_o$ carrier phase estimate $\phi_{est}$ 192 applied to phasor counter rotator 220, as shown in FIG. 7 and FIG. 9, must accurately reflect the 308 $f_o$ implicit carrier frequency of the signal from GPS satellite 12 as received to within about 50 Hertz.

Similarly, frequency estimate 39 maintains 30-bit C/A code group delay estimate $\tau_{est}$ 876 generated by phase register 840, and 308 $f_o$ carrier phase estimate $\phi_{est}$ 856 generated by delay register 842, reasonably accurate even when GPS satellite 12 happens to be momentarily obscured. Operating in this manner is akin to navigating by dead reckoning, that is, maintaining an estimate of position based on a previously known position and an estimate of the change of position determined from an assumed rate of change of position multiplied by elapsed time. Frequency adder 908 may be configured to add together phase error signal 198 and carrier frequency register output 900 to produce frequency sum 906, if and only if, above threshold indication 410 indicates that phase error signal 198 is available. If above threshold indication 410 indicates that phase error signal 198 is not available, then frequency estimate 39 may be substituted for phase error signal 198. Even if phase error signal 198 is available, frequency estimate 39 may be used by frequency adder 908 for "rate aiding" purposes.

Carrier frequency register output 900 which, as mentioned, is contained in and generated by 16-bit frequency register 902, represents the amount by which phase register 840 would be incremented or decremented every time 110,000 times per second, if ther were no input to phase adder 898 from phase error signal 198. Thus 16-bit frequency register 902 may correctly be called a phase rate register. If the phase-locked loop formed by 308 $f_o$ carrier phae and C/A code delay error detector 190 and phase and group delay register subsystem 196 is in phase lock, then carrier frequency register output 900 represents a measurement of the frequency of the 308 $f_o$ L1 band center frequency carrier implicit in GPS signals 15 as received.

FIG. 14

Figure 14B:
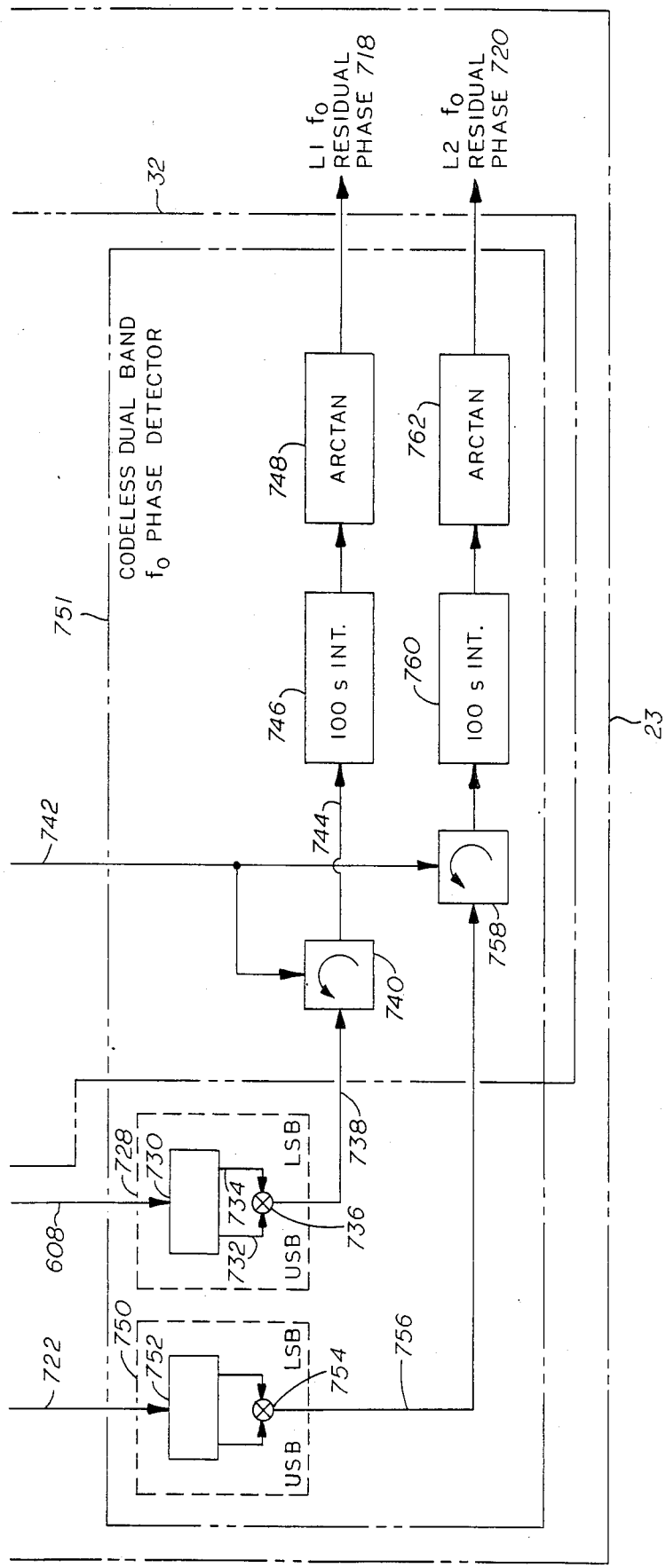
FIG. 14, formed by the combination of FIGS. 14A and 14B, is a detailed signal flow diagram of the overall system shown in FIG. 2.

Referring now to FIG. 14, a simplified, conceptual signal flow diagram is presented for the purpose of explaining the operation of terminal 23, including the operation of and interconnection between the various phase and delay locked loops and other related feedback control and measurement loops within the signal processing circuitry.

In this conceptual signal flow diagram, for simplicity, some details which were disclosed in the discussions of the other Figures have been omitted. In particular, some of the signals discussed with reference to the earlier Figures were described as having analog form, and some were described as having digital form. Some of the digital signals were represented with different numbers of bits and some of the signals were complex signals with both in-phase and quadrature parts, that is, real and imaginary parts. In this FIG. 14, however, such details are not shown. Signals are discussed without regard to analog or digital form, multiple parts or bits.

Also for simplicity in FIG. 14, multiple satellite tracking channels 32 are not shown. The operation of one such satellite tracking channel 32 is discussed in terms of the signals from only one GPS satellite. It should be understood that parallel operations are performed simultaneously or concurrently for the signals from each of the plurality of GPS satellites being observed.

Antenna 22 receives a composite of overlapping, spread spectrum L band radio frequency signals simultaneously from a plurality of GPS satellites. The composite of signals received by antenna 22 in the L1 and L2 frequency bands is applied by transmission line 600 to a pair of mixers 602 and 605. In mixer 602, the L1 band signals are down converted by mixing with locally generated, 308 $f_o$ local model 604 from local oscillator 606. It should be noted that all oscillators and other time-critical circuits and operations shown in FIG. 14 are governed by a single frequency standard, not shown, similar to frequency standard 28 shown in FIG. 2.

Video frequency output 608 from mixer 602 is applied to counter rotator 610 which subtracts the phase of phase estimate 612 from video frequency output 608 to generate output video signal 630.

If the frequency of the center frequency carrier wave, nominally at a frequency of 308 $f_o$, implicit in the signals in transmission line 600 is greater than the frequency of 308 $f_o$ local model 604, then the phase of the carrier implicit in the satellite signals is increasing more rapidly with time than the phase of 308 $f_o$ local model 604. The phase of the center frequency carrier wave implicit in video frequency output 608, generated by mixer 602 as the product of the satellite signals and 308 $f_o$ local model 604, therefore increases with time.

The phasor which represents video frequency output 608 is therefore rotating in the positive, that is, the counterclockwise direction in the complex plane. The rate of rotation in revolutions per second equals the frequency difference, in Hertz, between the frequency of the implicit center frequency carrier of the satellite signals and the frequency of 308 $f_o$ local model 604. The Doppler shift of the satellite signals as received, due to the relative motion between the satellite and receiving antenna 22, is usually the main cause for this frequency difference. Typically, the Doppler shift of the 308 $f_o$ carrier implicit in received GPS satellite signals is on the order of a few kiloHertz. In other words, the rotation rate of the phasor representing video frequency output 608 is several thousand revolutions per second.

Counter rotator 610 may be said to rotate the coordinate axes of the complex plane so that, with respect to the new rotating axes, the signal phasor is not rotating so rapidly.

Phase estimate 612 represents an angle in the range zero to one cycle, or zero to 360 degrees. This angle is the instantaneous angle, modulo one cycle, by which the rotated coordinate axes, to which output video signal 630 is referred, are rotated with respect to the stationary coordinate axes, to which video frequency output 608 is referred, by counter rotator 610. Phase estimate 612 varies with time and may increase or decrease.

Phase estimate 612 is formed in phase register 616 from a combination of externally derived and internally derived information. The term "internally derived information" refers to information derived from measurements performed within satellite tracking channel 32. Such measurements include measurements of signal properties in addition to 308 $f_o$ implicit carrier phase observable $\phi$. The term "externally derived information" refers to information derived from sources external to satellite tracking channel 32. Externally derived information may include a priori information derived from signals received at other locations, such as shore station 18 shown in FIG. 1, and information derived from measurements, within other satellite tracking channels 32 within the same terminal 23, of signals received from other satellites by antenna 22.

Accordingly, phase register 616 receives phase feedback 628 which includes information from within satellite tracking channel 32 via phase value 680 and from real time computer 40 via rate information 684, which may be generated by real time computer 40 based on information from a wide variety of other sources.

The goal is to have the phase angle of phase estimate 612 rotate at very nearly the same rate as the phase angle of the video signal phasor representing video frequency output 608. Ideally, the phase angle of phase estimate 612 would rotate at the same rate as the phase angle of video frequency output 608 so that the phase angle of output video signal 630 from counter rotator 610 would be stationary. Ideally, the value of this stationary phase angle would be zero. When the phase angle of output video signal 630 is near zero, phase estimate 612 is nearly equal to, and may serve as a measurement of, the phase of the 308 $f_o$ center frequency carrier from the selected satellite implicit in video frequency output 608, that is 308 $f_o$ implicit carrier phase observable $\phi$.

It is sufficient for normal operation to have reduced the rotation rate of output video signal 630 is less than about 50 revolutions per second. Thus, the frequency, that is, the time derivative of phase estimate 612, should be no more than 50 Hertz different from the frequency of the 308 $f_o$ center frequency carrier implicit in video frequency output 608 from the selected satellite. If the rotation rate has been successfully reduced to less than about 50 revolutions per second it is possible, as discussed below, to average the signal over a time interval of 0.01 second without having the phasor rotate more than halfway around the complex plane during this interval. It is desired to average the signal for a time interval of the order of about 0.01 second in order to reduce the effects of noise and interference which may be present. Averaging for about 0.01 second reduces the effective bandwidth of terminal 23 to about 100 Hertz, that is, to the reciprocal of the integration time. A long integration time, and thus a narrow bandwidth, are desired to reduce noise, etc., but the integration time must not be so long that the phasor to be integrated or averaged rotates more than about one-half cycle. If the phasor rotates a full cycle, its integrated or average value will be zero.

The signals received from the GPS satellites are not continuous wave signals with smoothly time-varying phases. The phase of each orthogonal component of a GPS satellite signal is, in fact, very rapidly switched back and forth between two different values 180 degrees apart due to the bi-phase modulation applied in the satellite's transmitter. The rate of this switching is about one million times per second for the C/A code-related component of the satellite signal, and ten million times per second of the P-code-related component, and in either case is much more rapid than the rate of rotation of the phasor discussed above. Thus, the "instantaneous" phasor representing video frequency output 608 at each instant of time switches back and forth between two points on opposite sides of the origin of the complex plane very rapidly, and these two points while remaining on opposite sides of the origin move relatively slowly around a circle centered on the origin of the plane.

The 308 $f_o$ center frequency carrier wave implicit in the satellite signals may be represented by a rotating, but non-switching, phasor which points to either one of the diametrically opposed rotating points. The carrier of a GPS satellite signal is suppressed by the modulation in the satellite because the average resultant position of the "instantaneous" phasor is exactly midway between the two opposite points, and therefore at the origin of the complex plane.

If no distinction can be made between the two opposite points, then the phase angle of this suppressed, implicit carrier is ambiguous by 180 degrees. This half-cycle ambiguity may be resolved, or eliminated, if one of the opposite points can be distinguished from the other. Such a distinction can be made if a certain pattern in the bi-phase modulation is known which can serve to identify one of the two phase points as the "zero" phase point, as opposed to the 180-degree phase point. The pattern of the C/A code function, in combination with a related pattern such as the frame synchronization pattern of the GPS navigation data modulation, may be used. Even partial knowledge of such patterns may be sufficient to distinguish the two phase points. An example of sufficient partial knowledge is knowledge that the C/A code sequence contains unequal numbers of "1" and "0" bits, in combination with knowledge of a fragment of, or a partial pattern in, the navigation data.

Counter rotator 610 removes most of the rotation rate or angular velocity of the phasor but it does nothing to remove the very rapid, e.g. million times per second, flickering or jumping back and forth of the instantaneous phasor between the two diametrically opposed points on the circle centered on the origin of the complex video plane. To remove that flickering, the received signal is multiplied by C/A code replica 634 which jumps back and forth in nearly perfect synchronism with the jumping of the received signal.

C/A code replica 634 is a replica, or "model", of the C/A code component of the modulation of the signal transmitted by the chosen satellite. C/A code replica 634 is generated in C/A code generator 636 and is multiplied with output video signal 630 in correlator 632. The timing of the generation of C/A code replica 634 is governed by time delay estimate $\tau_{est}$ 696 from delay register 672.

The time delay of C/A code replica 634 must continuously be adjusted to track the time delay of the signal received from the satellite. The time delay of C/A code replica 634 is controlled by delay estimate 696 which is contained in, and generated by, delay register 672.

Like the contents of phase register 616, the contents of delay register 672 are adjusted to track the satellite signal by a combination of externally derived information as well as information derived by observation of the satellite signal. However, while phase register 616 is adjusted to track the center frequency carrier phase, which is related to the phase delay of the signal, delay register 672 is adjusted to track the group delay of the signal.

Separate but interconnected registers are used for the phase delay and the group delay estimates despite the fact that the phase delay and the group delay of the satellite signal are affected virtually equally by a change in range, that is, by a position displacement of the satellite along the line of sight from receiving antenna 22. A range change of this type results in a change in the time required for the signal to propagate through space from the satellite to the receiver.

One reason for generating separate phase delay, or "phase", and group delay, or "delay", estimates with separate registers is that the phase delay and the group delay of the signal are not equally affected by propagation through the earth's ionosphere. Another reason for maintaining separate estimates is that multipath propagation of the signal affects the phase delay and the group delay unequally. Another reason is that the integer-cycle or half-integer cycle ambiguity of the implicit carrier phase observable is quite different from any ambiguity of the group delay observable. Another reason is that the two observables have different biases and therefore should be treated separately.

308 $f_o$ implicit carrier phase observable $\phi$ has the best precision of the observables. Its equivalent distance precision is of the order of one centimeter or less, essentially because the wavelength of the 308 $f_o$ implicit carrier wave is so short, about 19 centimeters, and because errors stemming from multipath and noise tend to be a small fraction, typically about 1/20th, of the relevant wavelength. The precision of 308 $f_o$ implicit carrier phase observable $\phi$ is also the best in a temporal sense. This phase may be measured accurately based on only 0.01 seconds of signal integration, or averaging. Thus, relatively rapid random motions of receiving antenna 22 do not prevent accurate measurement, and a rapidly varying position may be determined as a function of time with excellent temporal resolution as well as excellent spatial resolution.

The main disadvantage of the 308 $f_o$ carrier phase observable is that, in part because the wavelength is so short that the intrinsic integer-wavelength ambiguity in the interpretation of the phase is difficult to resolve, the observed value of 308 $f_o$ carrier phase is biased by an unknown amount of potentially enormous magnitude. This bias must be determined if full advantage is to be taken of the power of this observable. As long as observations are made continuously, or effectively so, the temporal variation of the phase may be followed or tracked, so that the continuous series of observations contains only one constant additive bias. Therefore, a long time is potentially allowable for the determination of the bias.

The bias in the time-series of 308 $f_o$ carrier phase observations may be determined by one or a combination of methods. One method takes advantage of the fact that the partial derivative of a phase observable with respect to a position coordinate, a clock synchronization parameter, a satellite orbital parameter, or any of most other parameters which might be unknown and required to be determined, varies with time due to the motion of the satellite across the sky.

While these partial derivatives reflecting the sensitivities of the observable to all other unknown variables vary with time, the partial derivative of the observable with respect to the additive bias remains constant, equal to one. Therefore a set of simultaneous equations relating all the unknowns to the observations at the series of observation times may be solved to obtain a unique, or a least-squares, solution separating the solution for the bias from the solutions for the other variables.

Although this general approach may be employed for the determination of the time-varying position of a moving vessel, additional information is required to solve the bias problem. If no additional information were available, then for each time there would be one or more additional independent position-related unknowns. With the additional presence of a bias unknown, there might be more unknowns than knowns, and a unique solution would thereore be impossible. However, given a sufficient number of satellites being observed simultaneously for a sufficiently long time, and given sufficient continuity of both the observation series and the position series or trajectory, a useful solution may still be made for the set of relevant biases simultaneously with a set of variables representing the trajectory.

Another method for determining the bias in the time-series of 308 $f_o$ carrier phase observations is to utilize observations of some other observable. This method may be utilized alone or in combination with the above described method. The other observable may be the phase of another implicit carrier of a different frequency. If the second carrier frequency is sufficiently low, then its wavelength may be great enough that its integer or half-integer wavelength ambiguity can be resolved, for example by the use of a priori position information. If the second carrier frequency is close to the 308 $f_o$ frequency, then it may be possible to resolve the integer ambiguity associated with the beat frequency between the two carrier frequencies. The latter, beat-frequency approach is akin to the method of "wide-laning" used in navigation with the Omega system.

A significant problem in the use of any other carrier phase observable to resolve bias ambiguity is that the new observable does have its own bias and ambiguity problems. If the effective wavelength associated with the second carrier phase observable, either used directly, or used indirectly as in the beat-frequency case, is very great, then the integer wavelength ambiguity may easy to resolve but by the same token, the precision of the resulting position determination is poor. The positional precision would be poor because, in general, imprecision tends to increase proportionally with wavelength.

Conversely, if the effective wavelength associated with the second carrier phase observable, used either directly or indirectly as in the case of a beat-frequency wavelength, is very small, then the potential precision is correspondingly very good; but unfortunately this potential may be unrealizable because it is impossible to resolve the integer ambiguity Therefore, in the preferred embodiment, an observable other than a carrier phase observable is used to determine the bias in the carrier phase observation. In the preferred embodiment, C/A code group delay observable $\tau$ is used for this purpose. C/A code group delay observable $\tau$ is a group-delay observable. Because the C/A code is a periodic function with a period of one millisecond, the so-called "code phase", which is the delay measured in code periods modulo one, has a potential ambiguity of 300 kilometers, the distance traveled by a signal in one millisecond. Such widely spaced ambiguities may be resolved conveniently by means of very crude a priori position information. This ambiguity is also resolvable through the use of the 50-bit-per-second navigation data modulation of the GPS signal, either by decoding the navigation message, or by measuring the phase of the 25 Hertz carrier associated with this modulation. These methods of resolving the integer-millisecond ambiguity may be combined.

The precision of C/A code group delay observable $\tau$ is limited, mainly by noise and multipath effects, typically to the level of about 15 meters. This is the level of precision which may be obtained with a relatively short signal integration or averaging time, of the order of one second or less. This level of precision is related to, and essentially is determined by, the bandwidth of the C/A code modulation, which is of the order of one MegaHertz. It may be noted that one wavelength at one MegaHertz is 300 meters, and that 15 meters is 1/20th of 300 meters.

The noise and multipath effects which account for most of the error in an "instantaneous", i.e. one-second-average, measurement of C/A code group delay observable $\tau$ are relatively large, but usually they are not significantly biased, in the sense that the error may be reduced to a relatively small value by averaging a series of observations over a long time. Quantities related to the observations, such as series of instantaneous position determinations, each such determination derived from C/A code observations of a plurality of satellites at one instant of time, may also be time-averaged. However, such an approach suffers from the problem that the desired position information may be time-varying, and it may be desired to determine position instantaneously, not on a long-time-averaged basis. Conventional time averaging would yield unacceptable data related to the average position of ship 10 during the integration period, not its actual position.

In the preferred embodiment, measurements of C/A code group delay observable $\tau$ are utilized to determine position, and a long time average is performed in such a way that fluctuating errors in these observations are reduced, or averaged out. However, the C/A code delay measurements are not simply time-averaged directly, because the position of receiving antenna 22 may be varying with time and it is not desired to average the position information.

Instead, the difference between 308 $f_o$ implicit carrier phase observable $\phi$ and C/A code group delay observable $\tau$ for the same satellite at the same time is taken, and this difference as a function of time is time-averaged. Before the difference is taken, of course, both observables must be expressed in the same units, for example time delay, or equivalent distance. Motion of antenna 22, or of the satellite, does not cause this difference to vary, except to the extent that motion may cause errors such as multipath effects to fluctuate. Thus, the bias in the difference between 308 $f_o$ implicit carrier phase observable $\phi$ and C/A code group delay observable $\tau$ is determined for each satellite, without any undesired averaging of time-variable position-related information.

Since the series of C/A code delay observations does not contain a significant bias, the result of time averaging the difference between 308 $f_o$ implicit carrier phase observable $\phi$ and C/A code group delay observable $\tau$ is just the bias of 308 $f_o$ implicit carrier phase observable $\phi$. Having thus been determined, this bias is subtracted from the original series of 308 $f_o$ implicit carrier phase observable $\phi$ observations to obtain a "new" series of 308 $f_o$ implicit carrier phase observable $\phi$ observations which are free of significant bias, yet they retain their original excellent precision both in position and in time.

The ionosphere, however, adds to the group delay and subtracts from the phase delay of signals received from a satellite, when both delays are defined such that a displacement of the satellite along the line of sight to the receiving antenna would cause equal changes, with the same sign, in both observables. Therefore, when the difference is taken between 308 $f_o$ implicit carrier phase observable $\phi$, which is a phase delay observable, and C/A code group delay observable $\tau$, which is a group delay observable, the effects of the ionosphere do not cancel. In fact they add, doubling the effect.

In order to eliminate the effect of the ionosphere, observations may be made simultaneously of the phases of other carrier waves implicit in the GPS signals received. In the preferred embodiment, the other carrier waves which are observed in part for the purpose of eliminating ionospheric errors in position determination are waves with frequencies equal to $f_o$. One such $f_o$ carrier is implicit in the signals received from each satellite in the L1 band, and one is implicit in the L2 band signals received from each satellite. The phases of these carriers indicate the group delays of the signals in the two bands. These two group delays, and thus the respective $f_o$ carrier phases, are equally affected by a position displacement of the satellite along the line of sight from receiving antenna 22, that is, by a change in the time required for the signal to propagate through space. However, they are not equally affected by the ionosphere.

The group delay indicated by C/A code group delay observable $\tau$, which is derived from a signal component in the L1 band, and the group delay indicated by L1 band implicit $f_o$ carrier phase observable $\psi_{L1}$ are derived from the signals in the same band and have equal contributions from the ionosphere. However, the group delay indicated by L2 band implicit $f_o$ carrier phase observable $\psi_{L2}$ is greater by a factor of $(77/60)^2$, the square of the ratio of the two band center frequencies. The difference between the group delays in the two bands due to the ionosphere is therefore (2329/3600) times the group delay in the L1 band.

The contribution of the ionosphere to the group delay in the L1 band is determined by multiplying the difference between the L2 and the L1 band $f_o$ phase measurements by (3600/2329). $f_o$ carrier phase is converted to group delay simply by dividing the phase by the carrier frequency, which is the same for each band.

The difference between the L2 and the L1 band $f_o$ phase measurements has a half-integer ambiguity which must be resolved. This ambiguity is easily resolved because the spacing of the equivalent distance ambiguities, one-half wavelength at a frequency of $f_o$, one wavelength at 2 $f_o$, or about 30 meters, is large.

As mentioned above, the difference between L2 band implicit $f_o$ carrier phase observable $\psi_{L2}$ and L1 band implicit $f_o$ carrier phase observable $\psi_{L1}$ is sensitive to the ionosphere but is insensitive to the position of ship 10. The effect of the ionosphere on this difference observable is known a priori to be less than about 15 meters, or less than one-half cycle of phase. Thus, in practice there is no significant ambiguity in the (L2 band implicit $f_o$ carrier phase observable $\psi_{L2}$)−(L1 band implicit $f_o$ carrier phase observable $\psi_{L1}$) difference. The value of the half-integer bias is zero.

As mentioned above, the effect of the ionosphere on the 308 $f_O$ L1 band center frequency carrier phase delay is equal and opposite to the effect on the L1 band group delay. Therefore the effect of the ionosphere on the "fundamental" 308 $f_o$ carrier phase observations may be determined, and removed.

Even if there were no ionosphere to be accounted for, the L1 and L2 band $f_o$ carrier phase observations would contribute usefully to the position determination, because each represents a group delay measurement which is useful for the purpose of determining the bias of the 308 $f_o$ carrier phase observations by the differencing and averaging approach described above in relation to the C/A code group delay observations. In fact, each $f_o$ carrier phase observation may actually be more precise than the C/A code group delay observation because the satellite signal bandwidth which contributes to each $f_o$ carrier phase observation is of the order of 2 $f_o$. As mentioned above, the equivalent position imprecision of a group delay measurement varies inversely with the bandwidth of the signal contributing to the group delay measurement. The bandwidth, 2 $f_o$, contributing to the $f_o$ carrier phase measurements is ten times the bandwidth of one MegaHertz contributing to the C/A code group delay observation.

Another advantage of the ten-times-wider bandwidth of the $f_o$ carrier phase observations is that these observations are therefore insensitive to multipath interference from reflected signals whose excess propagation path length, relative to that of the directly received signal, is greater than about 30 meters, the effective wavelength corresponding to the bandwidth of 2 $f_o$. In contrast, the C/A code delay measurements are sensitive to reflected signals with excess path lengths of up to about 300 meters, the effective wavelength corresponding to the bandwidth of about one MegaHertz. Thus, the $f_o$ carrier phase measurements help significantly to reduce the effects of multipath interference on position determination, especially on ship 10, where antenna 22 may be located atop a mast of the order of 30 meters high.

The $f_o$ carrier phase measurements may be used as described above to determine the bias in the 308 $f_o$ carrier phase measurements whether or not C/A code delay measurements are used, and whether or not the delay-locked loop which includes correlator 632 and C/A code generator 636 is locked by the action of delay error signals 688 and 692. As noted above, the functioning of correlator 632 which is normally required in order to obtain accurate 308 $f_o$ carrier phase measurments from correlator 632 and phase register 616 does require that delay estimate 696 from delay register 672 is accurate within less than one chip of the C/A code. However, it should be noted that this chip width is equivalent to about 300 meters of path length, and that position information accurate within the requisite 300 meters may be obtainable from other sources, as mentioned above.

Satellite tracking channel 32 contains means for generating measurements of the $f_o$ carrier phases relative to an estimate generated by delay register 672. These measurements of $f_o$ carrier phases are provided to real time computer 40 wherein closed loop tracking is performed by the execution of a stored program in accordance with standard techniques well known in the art. It is preferably to perform closed loop tracking of the $f_o$ carrier phases in real time computer 40, rather than with specialized hardware in satellite tracking channel 32 because these phases are so slowly varying.

Another reason for desiring to generate separate phase delay, or "phase", and group delay, or "delay" estimates with separate phase and delay registers is that, for a variety of possible causes, a valid measurement of one observable but not the other may be possilbe at a given time. Phase and delay registers 616 and 672 have the ability to "flywheel" or deadreckon, even in the absence of rate information from real time computer 40, by virtue of the action of phase adder 898 and carrier frequency or 16-bit frequency register 902, as shown in FIG. 13.

As mentioned, the phase locked loops and delay locked loops in terminal 23 generally attempt to track carrier phases and C/A code delays by means of error detection and feedback control. Each loop is coupled to the others, in the sense that its output may aid the other loops, and also in that it may be aided by the outputs of the other loops. This coupling may be included in satellite tracking channel 32 as well as in real time computer 40 which furnishes estimates 38 to satellite tracking channel 32 and in return receives measurements 42. This coupling may extend beyond terminal 23, for example to data processing center 20 which, as discussed with respect to FIG. 1, exchanges data with terminal 23 by data link 21.

The generation of accurate estimates of phase and delay observables may be aided by external information input 44 from ship position and veelocity information 50, as discussed with reference to FIG. 2. Ship position and velocity information 50 may include both translational and rotational information, and may include not only estimates of the translational and rotational state of the ship, but also statistical information related to this state, such as wind and sea conditions. The statistical information may be used to optimize the dynamic tracking performance of a loop. Rotational information may include information on the roll, pitch, and yaw of the ship. Such information may be combined in real time computer 40 with information on the direction of the satellites in order to predict or estimate obstruction of the line of sight to a satellite, and/or the presence of a reflection of the signal from the satellite by some part of ship 10 or by the sea surface.

A particularly useful function which may be accomplished by combination of ship and antenna position and orientation information with satellite direction information is the rejection of reflected signals. From such geometric information real time computer 40 may compute the expected effects of signal reflection and other position- and direction-dependent signal propagation effects such as antenna phase-center variations. The computed effects may be applied as corrections to the observed values of phases and delays. This is discussed below in greater detail with references to FIG. 25.

Means may be provided for connecting a plurality of antennas 22 to terminal 23, and corresponding satellite tracking channels 32 may be included in terminal 23 to generate measurements related to the signals received by the additional antennas. Alternatively, time-division multiplexing means may be incorporated in terminal 23, whereby signals from different antennas 22 are successively switched to terminal 23, and terminal 23 may operate on the signals from the different antennas during corresponding time intervals.

The use of multiple antennas 22 in conjunction with terminal 23 provides several benefits. One benefit is that a satellite signal could be received by one antenna while the view of the satellite from another antenna was obstructed. However, even if a satellite were simultaneously in view of more than one antenna, the simultaneous availability of observations from the plurality of antennas would be very useful. One use would be to combine the observations from different antennas to determine the relative position or baseline vector between multiple antennas 22 to derive information related to the orientation of ship 10.

If information on the orientation of ship 10 is available, from any source such as the use of multiple antennas 22 described above or from other means such as the ship's compass or an inertial navigation system on ship 10, this orientation information may be combined with the observations from multiple antennas 22 mounted at different positions on ship 10 to distinguish the signals which came directly from the satellite from other, undesired, signals which had been reflected from ship 10 or from the sea surface.

In effect, any pair of antennas 22 forms an interferometer. The baseline vector of the interferometer could be computed from the position and orientation information, as mentioned above. The expected fringe phase of the signal received from each satellite, that is the difference between the phases of the signals received simultaneously at the ends of the baseline from the satellite, may be computed from knowledge of the baseline vector and the direction of the satellite. Similarly, the fringe phase may be computed for the same interferometer receiving a reflected signal. In the latter case, the actual position of the satellite would be replaced in the calculation with the position of the satellite's reflected image. The position of the image could be computed from knowledge of the reflecting surface, which might be a surface of ship 10 such as the main deck, or the sea surface.

Based on such calculations of the fringe phases for both direct and reflected signals, a linear superposition of the complex signals received from both antennas 22 may be formed with the complex signal combination coefficients computed such that in the combined signal, the reflected-signal contributions canceled, leaving the desired, direct-signal contributions. This superposition to reject reflections may be done on a satellite-specific basis because separate phase data are availabe for each satellite. The superposition can also of course be done on a continually time-varying basis.

In other words, an interferometer or set of interferometers formed by a plurality of single antenna elements may be regarded as phased array antenna formin a beam with one or more nulls. The direction of a null can be steered relative to a coordinate frame fixed with respect to the array, by varying the relative phases and amplitudes with which the signals from individual antennas are combined. A null can be steered toward the direction from which a reflected signal is expected to arrive, based on knowledge of the relative geometry of the satellite, the reflecting surface, and the array of antennas. Thus, a reflected signal can be rejected. The computations required to accomplish this rejection may be performed by real time computer 40 with multiple antennas 22 connected to terminal 23.

Returning now to the detailed operation of the tracking loops in satellite tracking channel 32 of terminal 23, it should be noted that, whereas the operation of each loop may be aided by inputs from other sources, each loop may also operate autonomously. For example, the C/A code delay tracking loop in satellite tracking channel 32 may function to maintain delay lock regardless of whether any related phase-tracking loop is in lock. As mentioned above, the angular "rotation" rate of phase estimate 612 used in counter rotator 610 must be within plus or minus about 50 Hertz of the received signal's phasor rotation rate, to permit constructive integration of the signal in correlator 632 which forms part of the delay tracking loop. However, a sufficiently accurate rotation rate may conveniently be computed from external information without requiring phase lock.

Similarly, a phase-tracking loop may function to maintain phase lock whether or not a related delay-locked loop is in lock. Even in "open-loop" or unlocked conditions, phase and delay estimates may be maintained with sufficient accuracy by means of aiding information inputs from internal and/or external sources, as mentioned above.

Every feedback loop is also provided with means for recognizing which of its multiple information inputs are probably valid and therefore ought to be used. In some cases the validity decision is best made by real time computer 40 based on application of "reasonableness" and mutual-consistency criteria to the plurality of available inputs. However, valditiy decisions are also made within satellite tracking channel 32. For example, correlator 532 may include a comparator such as on-time signal energy indication 348, as shown in FIG. 10, in which the received signal strength is compared with a computed threshold value, every 0.01 second. Only if the signal exceeds the threshold is a phase error signal generated by correlator 632 applied to phase register 616 in order to adjust the phase estimate contained therein.

The contents of delay register 672 are adjustable by direct input of a computed value of delay from real time computer 40, as shown in FIG. 2, as well as by the feedback control action of delay error signals 668 and 670 generated by correlator 632 and fed back to delay register 672. The contents of delay register 672 are also adjusted by incrementing and decrementing signals 620 and 622 respectively, from phase register 616. These incrementing and decrementing signals may maintain an accurate delay estimate in delay register 672 even in the absence of delay error feedback signals 668 and 670. As mentioned above, phase register 616 itself is constantly receiving adjustments derived both from external information and from measurements of the received signal.

Output video signal 630 from counter rotator 610 is applied to correlator 632 wherein it is applied to mixers 638, 640 and 642 for multiplication, or cross-correlation, with C/A code replica 634 generated by C/A code generator 636. C/A code replica 634 is fed directly to mixer 642 and then to mixerr 640 after being time-delayed by an amount equaling one-half the width of one C/A code chip.

The C/A code is the satellite-specific, pseudorandom, binary code according to which the instantaneous phasor representing the GPS satellite signal is switched back and forth between the two points on the circle 180 degrees apart. The code is binary, that is, the phase switches between only two values, and the temporal pattern of switching back and forth is periodic with a period of one millisecond. The code may be said to be represented by a binary function which has a value of zero when the instantaneous signal phasor is one position and a value of one when the phasor is in the other position. The function is a periodic function of time with a period of one millisecond.

During the one millisecond period, the C/A code function switches back and forth at times which, and only at times which, are integer multiples of 1/1,023rd of one millisecond. Each of the intervals between these times, that is, each 1,023rd of one millisecond, is known as a "chip" of the code or a "code chip". In delay circuit 644, C/A code replica 634 is delayed by one-half of a chip to obtain half chip delayed version 646 which is applied to mixer 640 for correlation with output video signal 630. The output of mixer 640 is integrated for 0.01 seconds by integrator 674 and applied to arctangent generator 678 which generates phase signal 680 a measure of the phase of output video signal 630, with the fast bi-phase switching having been removed from the signal, and with the signal having been averaged over 0.01 second. Phase signal 680 is the output of the on-time correlation channel and is applied to summer 682 along the rate estimate 684 from real time computer 40.

The channel of the correlator which includes mixer 640, integrator 674 and arctangent generator 678 is called the on-time channel because half chip delayed replica 646, which is correlated with output video signal 630 in this channel, is intended to be "on time", that is, half chip delayed replica 646 switches back and forth in synchrony with the desired satellite signal contained in output video signal 630. The other two of the three similar channels of the correlator are called the "early" channel and the "late" channel because C/A code replicas 634 and 650 switch back and forth earlier and later, respectively than "on-time" half chip delayed replica 646. The main purpose of the early and late channels is to enable an error in delay estimate 696 to be detected.

Half chip delayed replica 646 is delayed by a half chip in delay circuit 648 to generate full chip delayed replica 650 applied to mixer 638. Therefore, in mixers 638, 640 and 642, output video signal 630 is correlated with the same code sequence, except for the half-chip differences in delay. Mixer 638 generates mixer output 652 which is integrated for 0.01 second by integrator 654 before being fed to squarer 656. Similar operations are performed on the output of mixer 642 by integrator 660 and squarer 662.

If the delay of the switching function generated in C/A code generator 636, after being delayed one-half chip in delay circuit 644, exactly matches that of output video signal 630, in other words, if half chip delayed replica 646 jumps or switches back and forth in synchronism with output video signal 630, then late correlation output 658 will be essentially equal to early correlation output 664. That is, the early and the late channels of correlator 632 will yield equal outputs, except, of course, for a little jitter due to noise.

Late correlation output 658 indicates the signal energy detected by the cross-correlation between output video signal 630 and full chip delayed replica 650 during each 0.01 second integration period. Similarly, early correlation output 664 indicates the signal energy detected by the cross-correlation between output video signal 630 and C/A code replica 634. If output video signal 630 is phase-switching simultaneously with "on-time" half chip delayed replica 646, then the correlation with full chip delayed replica 650 and the correlation with C/A code replica 634 will yield the same value.

On the other hand, if the received signal is arriving somewhat earlier, early correlation output 664 will be greater than late correlation output 658. Whether the locally generated code is being generated too early or too late relative to the received signal is determined by comparing late correlation output 658 with early correlation output 664 in comparator 666. Outputs 668 and 670 from comparator 666 indicate whether the early correlator channel or the late correlator channel had greater output. Therefore outputs 668 and 670 from comparator 666 indicate whether the C/A code replica 634 should be generated earlier or later by C/A code generator 636 in order to match the on-time half chip delayed replica 646 to the signal in output video signal 630.

If the late correlation yields a higher output such that the locally generated code appears to be too early, and therefore should be delayed to bring it into alignment with the received signal, then comparator output 668 in "true". Comparator output 668 is applied to delay register 672 and causes delay estimate 696, which is contained in and generated by delay register 672 and is applied to C/A code generator 636 in order to control the delay of the code generation, to be increased.

Increasing the value of delay estimate 696 causes C/A code replica 634 to be generated earlier, not later as might otherwise infer from the label "delay". Delay register 672 is called the "delay" register to distinguish its function from the function of phase register 616. By feedback control, the contents of delay register 672 are caused to track the group delay of the C/A code component of the received satellite signal. The term "group delay", which is commonly used in physics and in geodetic and astrometric radio interferometry, is the negative of the derivative with respect to frequency, of the phase of the signal. "Group delay" is also known as "envelope delay" and as "modulation delay", in electrical engineering and communications. If a signal arrives later, its group delay is increased. Group delay observables are sometimes called "pseudorange".

It should also be remembered that some observables called "phases", such as C/A code phase and $f_o$ carrier phase, are basically group delay observables; whereas some observables occasionally called "delay" may be basically phase delay observables.

In the preferred embodiment, if the satellite signal arrives later, its group delay is increased, but delay estimate 696 will decrease, and so will phase estimate 612 contained in and generated by phase register 616. The signs of the contents of delay estimate 696 and delay register 672 are defined such that both contents change in the same direction in response to a change of the distance between the satellite and antenna 22. If the satellite moves closer, that is, if the range of the satellite decreases, then both the phase estimate and the delay estimate should increase.

Special consideration must be given to the peculiar effects of the ionosphere on the propagation of radio signals. At frequencies such as those of the GPS L1 and L2 bands, the ionosphere acts to increase the apparent distance of the satellite as indicated by C/A code group delay observable $\tau$ which is tracked by delay register 672 in cooperation with correlator 632. At the same time, however, the same ionosphere acts to decrease the apparent distance of the satellite as indicated by 308 $f_o$ implicit carrier phase observable $\phi$ which is tracked by phase register 616 in cooperation with correlator 632. Thus, 308 $f_o$ implicit carrier phase observable $\phi$ and C/A code group delay observable $\tau$ give contradictory indications of the apparent change of satellite-to-receiver distance which is due to the ionosphere.

Accordingly, an increase of ionospheric density causes phase estimate 612 to increase, as though the satellite moved nearer, and the same increase of ionospheric density causes L1 band implicit $f_o$ carrier phase observable $\psi_{L1}$ and L2 band implicit $f_o$ carrier phase observable $\psi_{L2}$ to decrease. These phase observables are related to the group delays, not the phase delays, of the signals received in the L1 and L2 bands.

The group delay for each band, and therefore the phase shift of the $f_o$ carrier implicit in the signals received in each band, is inversely proportional to the square of the center frequency of each band. Thus, a given amount of ionization along the upper-atmospheric path between the satellite and the receiver causes a decrease of the phase of the L1 $f_o$ carrier equal to $(77/60)^2$ times the decrease of the phase of the L2 $f_o$ carrier phase. Both $f_o$ carrier phases are decreased, whereas the center-frequency implicit carrier phase in each band, e.g. the 308 $f_o$ carrier phase for the L1 band, is increased.

Now continuing the detailed discussion of FIG. 14, if the locally generated code model appears to have too little delay, or is switching earlier than the satellite signal in output video signal 630, then output 668 would be true and would cause the contents of delay register 672 to be decreased. Thus, correlator 632, together with delay register 672, form a closed feedback loop which maintains a number in delay register 672 that tracks the variations of the phase switching delay of the received signal and which is therefore a measurement or an estimate of the delay in output video signal 630.

As noted above, the C/A code function has 1,023 chips. In the early and late channels of correlator 632 only two possible delays of the code, spaced one chip apart, have been correlated with the signal. Of course, if the delay of the signal is different from that contained in delay register 672 by more than one chip neither the late channel, formed by mixer 638, integrator 654 and squarer 656, nor the early channel formed by mixer 642, integrator 660 and squarer 662, will yield significant correlation. This situation in which no correlator channel yields significant correlation may occur during initialization if the initial value of delay register 672 does not agree sufficiently with the actual signal delay. If significant power is not detected in any of the correlator channels, then delay register 672 must be incremented a little bit at a time until all 1,023 possible chip delays have been explored or until the correlation with the signal is found.

The delay locked loop just described yields a measurement of the time delay of the phase switching pattern of the received signal. Another measurement of interest, as described above, is a measurement of the phase angle of the received signal phasor at particular times. This measurement is performed in an analogous manner by feedback to cause the contents of phase register 616 to track the phase of the signal phasor in video frequency output 608. Phase register 616 contains a "real" number with both a fractional cycle part and an integer or signed whole number part. The fractional cycle part is continuously updated and small phase increments much smaller than one full cycle or rotation of the phasor are added into the fractional cycle portion of the phase register at a rate of 110,000 times per second. Phase feedback 628 is applied to phase register 616 and is the sum formed by summer 682 of phase signal 680 and rate-related fractional cycle value 684 from real time computer 40. Even in the absence of a phase error, rate-related fractional cycle value 684 causes the contents of phase register 616 to vary with time. Rate-related fractional cycle value 684 may be derived from a combination of a value contained by a rate register, not shown, which is included in satellite tracking channel 32, and a value from real time computer 40.

Rate-related fractional cycle value 684 is added 110,000 times per second and is computed according to the information on the satellite's orbit and the positions and motions of the receiving antenna and the satellite as well as from phase signal 680. The amount which is added into fractional cycle lower part 614 of phase register 616 of 110,000 times per second is simply equal to the expected frequency shift of the received signal in Hertz due to Doppler shift, and any other causes, divided by 110,000.

Phase register 616 is configured in two parts, fractional cycle lower part 614 which includes all bits of the binary phase number up to and including the quarter-cycle bit, and whole cycle upper part 618 which includes the more significant bits of the number.

When the lower part of the phase number reaches and passes an integer value, the fractional cycle lower part 614 of phase register 616 generates carry signal 620 which causes whole cycle upper part 618 to be incremented by one. If the expected frequency shift of the received signal is negative, then the amounts added into fractional cycle lower part 614 110,000 times per second are negative and in this case, the lower part of the number may decrease to and pass a half-integer value.

On such an occurrence, borrow signal 622 is generated and applied to whole cycle upper part 618 of phase register 616 and causes its content to be decreased by one. The total value of phase contained in phase register 616 is indicated by phase number 626 which is the sum of fractional cycle lower part 614 and whole cycle upper part 618 formed by summer 624.

The most significant bit of fractional cycle lower part 614, together with the least significant bit of whole cycle upper part 618 of phase register 616 form phase estimate 612, modulo one cycle and with one-quarter cycle resolution or quantization, by which video frequency output 608 is counter rotated in counter rotator 610. There is no need for counter rotator 610 to receive the integer portion of the phase estimate, and the quantization error associated with the coarse, quarter-cycle, resolution of phase estimate 612 is effectively averaged out because the phase varies rapidly and non-uniformly. Hopefully, the rate at which the content of the phase register increases or decreases matches that of the selected satellite's component in video frequency output 608 within less than 50 revolutions per second in magnitude. If this condition is in fact satisfied then the angle of the phasor will rotate no more than one-half revolution in 0.01 second and the signal will survive the integration in integrators 654, 660 and 674.

Output video signal 630 is mixed with "prompt" half chip delayed replica 646 in mixer 640 and is integrated in integrator 674. Phase angle 680 is computed by taking the arctangent of the imaginary, divided by the real, parts of complex signal 676 in arc tangent generator 678. Phase angle 680 is applied as a phase error feedback signal to summer 682 which generates phase feedback 628 which is applied as a small increment 110,000 times per second to phase register 616.

By this phase feedback path, the contents of phase register 616 are increased or decreased as necessary to bring the phase estimate contained in phase register 616 into alignment with the actual received signal phasor. As the received signal phasor rotates around forward and/or backward the angle of the phasor is continuously tracked by phase register 616 and all of the turns of the phasor around the complex plane are also counted within whole cycle upper part 618 of phase register 616.

The 308 $f_o$ carrier phase of the received signal is a very precise and very rapid measure of the range or path length from the satellite to the receiver. Any increase of the path length is immediately, within about 0.01 seconds, reflected in a decrease in the contents of phase register 616. For every 308 $f_o$ carrier wavelength that the satellite moves, the phase of the received carrier signal changes by one cycle of phase and the contents of phase register 616 change by one unit. Of course, fractions of a wavelength of motion are also seen.

Phase number 626 is therefore an indication or measurement of the range to the satellite, although biased as discussed above. That is, the phase in cycles equals the distance in wavelengths, plus a bias. The bias is due to the inescapable fact that when the apparatus is first put into operation, the correct initial value of phase number 626 is not known. All changes of the received signal phase are faithfully reflected by changes in this number, but the initial value is arbitary or meaningless.

Although the phase as a measurement of satellite to receiver range is biased, the bias does remain constant for the entire time that the satellite signal is being tracked by phase register 616 unless there is some interruption in the tracking. During such an interruption, the number of cycles of phase which would have been received if the signal had not been interrupted, may not be known correctly, or may not guessed correctly, so the contents of phase register 616 might have a different bias following the interruption. However, the difference in the bias must be an integer number of cycles. If the interruption is brief, there is a good chance that this integer change will be zero, because the 110,000 times-per-second increments of phase feedback 628 received during the interruption may have kept the phase estimate increasing at a rate very close to the actual signal's phase rate. In other words, phase register 616 will flywheel or dead-reckon accurately with error increasing by less than one cycle if the time duration of the outage is short.

In order to minimize the probability that the phase bias might change, rate-related fractional cycle value 684 applied to summer 682 is at all times are being computed from the best current infomation on the motion of the satellite and ship 10 and therefore of the Doppler shift and other shifts which the received signal might have. During a brief interruption of the signal, these increments from summer 682 would be very accurate predictions of the increments which phase register 616 should in fact have in order to maintain phase alignment of phase register 616 with the received signal.

The delay locked loop formed by correlator 632 and delay register 672 yields an indication or measurement of the range from the satellite antenna 22 because changes in the range are reflected not only in phase register 616 but also in delay register 672. If the satellite moves farther away, then the signal propagation time is increased and the phase-flickers arrive later. This lateness would immediately be detected by an increase in late correlation output 658, or be indicated by late correlation output 658 becoming greater than early correlation output 664. As long as this inequality persisted, comparator 666 would continue to cause delay register 672 to be increased or decreased, until finally delay estimate 696 caused the code to be generated by C/A code generator 636 with the correct delay. However it should be noted that delay register 672 would also have been receiving incrementing or decrementing inputs via carry signal 620 or borrow signal 622 from phase register 616, and that in the absence of any effects such as ionospheric dispersion which cause the group delay to vary differently from the phase delay, signals 620 and 622 by themselves would maintain a correct estimate of delay in delay register 672.

As discussed above, it is possible to determine position directly from phase number 626 from phase register 616. It is also possible to determine position by C/A code delay measurement 698, from delay register 672. As noted, an advantage of phase number 626 is that they are very precise: even a very small motion of the order of a centimeter can be detected because the wavelength of the signal is about 19 centimeters, so 1 centimeter of motion would cause a phase change of 1/20th of a cycle which could be detected.

However, these phase measurements as also noted above are biased by an unknown amount, whereas C/A code delay measurement 698 from delay register 672 do not suffer from such a bias.

As discussed above, L1 band implicit $f_o$ carrier phase observable $\psi_{L1}$ and L2 band implicit $f_o$ carrier phase observable $\psi_{L2}$ implicit in GPS signals 15 are measured, and the difference there between is used to determine, and to remove, the effects of the ionosphere from the measurements of 308 $f_o$ implicit carrier phase observable $\phi$ and C/A code group delay observable $\tau$. Codeless dual band phase detector 751, shown in FIG. 14, yields measurements of L1 band implicit $f_o$ carrier phase observable $\psi_{L1}$ and L2 band implicit $f_o$ carrier phase observable $\psi_{L2}$.

As noted above, GPS signals 15 from GPS satellite 12 are received by antenna 22 and applied via transmission line 600 to mixer 602 for correlation with 308 $f_o$ local mode 604 from local oscillator 606 to produce video frequency output 608. In addition, the signals in transmission line 600 are also applied to mixer 605 for correlation with 240 $f_o$ local model 724 from L2 band local oscillator 726 to produce L2 band video output 722. Video frequency output 608 and L2 band video output 722 are equivalent correlation products except that they are correlated with replicas of L1 and L2 band center frequency carriers, respectively.

Codeless dual band phase detector 751 receives video frequency output 608 and L2 band video output 722 from mixers 602 and 605 respectively. Mixer 605 is like mixer 602 and downconverts the L2 band portion of transmission line 600 to the video frequency band by mixing transmission line 600 with 240 $f_o$ local model 724 from L2 band local oscillator 726.

Within codeless dual band phase detector 751 video frequency output 608 is applied to L1 band $f_o$ carrier reconstructor 728 which generates L1 reconstructed carrier composite 738. L2 band video output 722 is applied to L2 band $f_o$ carrier reconstructor 750 which generates L2 reconstructed carrier composite 756. L1 band $f_o$ carrier reconstructor 728 and L2 band $f_o$ carrier reconstructor 750 are exactly alike, the only difference being that one receives an input and generates an output related to signals received to the L1 band and the other receives an input and generates an output related to signals received on the L2 band.

L1 reconstructed carrier composite 738 is applied to phasor counter rotator 740 to produce output 744 which is integrated for 100 seconds by 100 second integrator 746. The output of 100 second integrator 746 is applied to arctangent generator 748 which generates L1 $f_o$ residual phase measurement 718.

Similarly, L2 reconstructed carrier composite 756 is applied to phasor counter rotator 758 whose output is integrated for 100 seconds by 100 second integrator 760. The output of 100 second integrator 760 is applied to arctangent generator 762 whose output is L2 $f_o$ residual phase measurement 720.

L1 reconstructed carrier composite 738 from L1 band $f_o$ carrier reconstructor 728 is a composite of continuous wave signal components with frequencies near 2 $f_o$. In L1 reconstructed carrier composite 738, one continuous wave component represents the reconstructed carrier wave implicit in the signals received from each satellite in the L1 band. The frequency of each continuous wave, or reconstructed carrier component, is exactly twice that of the respective $f_o$ carrier implicit in the received signals. The phase of each reconstructed carrier is also doubled. The frequency of each reconstructed carrier is offset from exactly 2 $f_o$ due mainly to the Doppler shift of the satellite's signal as received, by an amount which varies between about plus and minus 30 Hertz, as a function of time.

The reconstructed carrier component from the particular satellite to which satellite tracking channel 32 has been assigned is selected from L1 reconstructed carrier composite 738 by phasor counter rotator 740 and 100 second integrator 746. The basis of this selection is provided by $f_o$ carrier phase estimate 742 which is generated by delay register 672 and applied to phasor counter rotator 740. The frequency, that is, the time derivative of $f_o$ carrier phase estimate 742 is extremely close, within less than about 0.015 Hertz, to the frequency of the reconstructed carrier component from the selected satellite within L1 reconstructed carrier composite 738. Therefore the phasor representing the reconstructed carrier component related to the selected satellite in output 744 from phasor counter rotator 740 rotates by less than one-half cycle during the 100 second time span of each integration performed by 100 second integrator 746. The reconstructed carrier component for the satellite to which satellite tracking channel 32 is assigned will therefore accumulate coherently during the integration which the reconstructed components for all other satellites will not. The reconstructed carrier components from other satellites will not accumulate coherently, that is, they will average to zero during the integration performed by 100 second integrator 746 because their phasor components in output 744 from phasor counter rotator 740 rotate by one or more cycles during the 100 second integration time. The other satellites' phasors rotate because their reconstructed carrier frequencies are generally not equal, within 0.01 Hertz, to the frequency of $f_o$ carrier phase estimate 742.

Thus, at the conclusion of each 100 second integration, arctangent generator 748 generates L1 $f_o$ residual phase measurement 718 which is the four-quadrant inverse tangent function of the output of 100 second integrator 746. L1 $f_o$ residual phase measurement 718 is therefore an accurate measurement of L1 band implicit $f_o$ carrier phase observable $\psi_{L1}$ for the selected satellite relative to $f_o$ carrier phase estimate 742.

$f_o$ carrier phase estimate 742 is applied to both phasor counter rotator 740 which otherwise operate in the same manner on L1 and L2 band signals, respectively.

Similarly, 100 second integrator 760 and arctangent generator 762 operate on L2 band signals from phasor counter rotator 758 to generator L2 $f_o$ residual phase measurement 720 in the same manner as 100 second integrator 746 and arctangent generator 748 operate on L1 band signals from phasor counter rotator 740 to generate L1 $f_o$ residual phase measurement 718 which is an accurate measurement of L2 band implicit $f_o$ carrier phase observable $\psi_{L2}$, for the selected satellite, relative to $f_o$ carrier phase estimate 742.

Satellite tracking channel 32 provides C/A code delay measurement 698, phase number 626, L1 $f_o$ residual phase measurement 718 and L2 $f_o$ residual phase measurement 720 to observables combiner 701, described below with respect to FIG. 15.

FIG. 15

Referring now to FIG. 15, two embodiments of observables combiner 701 are disclosed. In FIG. 15A a simplified embodiment of observables combiner 701 is shown for ease of explanation of the operation thereof. The alternate embodiment of observables combiner 701, shown in FIG. 15B, is configured from a Kalman filter in accordance with techniques well known in the art. The embodiment shown in FIG. 15B is advantageous because it makes fuller use of the information content of the observables.

In the embodiment shown in FIG. 15A, observables combiner 701 receives a measurement of C/A code group delay observable $\tau$, such as 30-bit C/A code group delay estimate $\tau_{est}$ 876 from delay register 842 as shown in FIG. 13 or C/A code delay measurement 698 from delay register 672 as shown in FIG. 14; a mesurement of 308 $f_o$ implicit carrier phase observable $\phi$ such as 48bit binary 308 $f_o$ carrier phase estimate $\phi_{est}$ 856 from phase register 840 shown in FIG. 13 or phase number 626 from phase register 616 as shown in FIG. 14; a measurement of L1 band implicit $f_o$ carrier phase observable $\psi_{L1}$ such as L1 $f_o$ carrier phase measurement 210 from L1 band $f_o$ carrier phase detector 206 as shown in FIG. 6 or L1 $f_o$ residual phase measurement 718 from codeless dual band phase detector 751 as shown in FIG. 14; and a measurement of L2 band implicit $f_o$ carrier phase observable $\psi_{L2}$ such as L2 $f_o$ carrier phase measurement 212 from L2 band $f_o$ carrier phase detector 208 as shown in FIG. 6 or L2 $f_o$ residual phase measurement 720 from codeless dual band phase detector 751 as shown in FIG. 14.

As discussed above, the measurement of C/A code group delay observable $\tau$ is unambiguous. That is, the integer millisecond ambiguity potentially affecting a C/A code delay measurement has been resolved, for example as discussed above with reference to delay register 842 and group delay initial value 37 shown in FIG. 13. In this sense C/A code group delay observable $\tau$ is therefore not significantly biased. However, it is corrupted by near-zero-mean random fluctuations of the order of 15 meters, due to noise and multipath interference, and by an error typically of the order of zero to 30 meters due to ionospheric refraction along the signal propagation path from GPS satellite 12 to antenna 22.

Since the ionospheric contribution to the measurement of C/A code group delay observable $\tau$ can have only one sign, it might be said that C/A code group delay observable $\tau$ is indeed biased. On the other hand, a correction for an expected value of the ionospheric effect could be applied to the measurement of C/A code group dely observable $\tau$, by for example an estimate from external information used in real time computer 40 or by other means not shown, so that the uncorrected, remaining effect had a zero mean in the statistical sense. Methods of generating an expected value of the ionospheric effect on a C/A code delay measurement are known. In fact, the GPS broadcast navigation data include data from which such a value may be generated. However, these data are generally not very accurate, and they may be unavailable. Therefore it is desirable to determine the ionospheric effect and thereby to remove it, based upon observed phase and/or delay characteristics of the signals received from a satellite.

As discussed with reference to FIG. 14, the measurement of 308 $f_o$ implicit carrier phase observable $\phi$ is a biased measurement of range with an integer or half-integer cycle ambiguity, corresponding to an integer or half-integer wavelength ambiguity, which is different to resolve. However, the measurement of 308 $f_o$ implicit carrier phase observable $\phi$ is a very precise indicator of variations in range. The measurement of 308 $f_o$ implicit carrier phase observable $\phi$ includes only very small noise and multipath errors, in comparison with the measurement of C/A code group delay observable $\tau$. However, the error in the measurement of 308 $f_o$ implicit carrier phase observable $\tau$ due to the ionosphere is of exactly the same magnitude as the error in the measurement of C/A code group delay observable $\tau$ due to the ionosphere when both measurements are expressed in equivalent units, such as range units. This error is typically on the order of 5 to 30 meters of range.

In the preferred embodiment, as discussed above, the signs of the measurement of both C/A code group delay observable $\tau$ and 308 $f_o$ implicit carrier phase observable $\phi$ are defined such that a displacement of the satellite along the line of sight toward antenna 22 causes an increase in each of these measurements. Therefore the effects of the ionosphere in these measurements have opposite signs. That is, the ionospheric affects on the propagation of GPS signals 15 could typically be on the order of the range equivalent of 20 meters which would appear in a measurement of C/A code group delay observable $\tau$ as an increase of group delay while the same effect would appear in a measurement of 308 $f_o$ implicit carrier phase observable $\phi$ as a decrease of phase delay.

As shown in FIG. 14 for example, the signs of L1 $f_o$ residual phase measurement 718 and L2 $f_o$ residual phase measurement 720 are also defined such that each of these measurements would also increase if the satellite moved nearer, assuming for the moment that $f_o$ carrier phase estimate 742 did not change. Because these subcarrier phase measurements are actually group delay measurements rather than phase delay measurements, such changes would have the same sign as the changes in C/A code group delay observable $\tau$, (that is they would appear as increases), rather than the sign of the changes in 308 $f_o$ implicit carrier phase observable $\phi$. Of course, the normal response of $f_o$ carrier phase estimate 742 to a motion of the satellite along the line of sight is to increase, so that normally neither L1 $f_o$ residual phase measurement 718 nor L2 $f_o$ residual phase measurement 720 would change.

Referring to FIG. 15A, the measurement of C/A code group delay observable $\tau$ is applied to scale converter 920 which accepts C/A code group delay observable $\tau$ in the numerical representation in which it was generated and generates delay range 922 which is a number representing C/A code group delay observable $\tau$ in units of range.

The measurement of 308 $f_o$ implicit carrier phase observable $\phi$ is applied to scale converter 924 which accepts the measurement of 308 $f_o$ implicit carrier phase observable $\phi$ in the numerical representation in which it was generated and generates phase range 926 which is a number representing 308 $f_o$ implicit carrier phase observable $\phi$ in the same range units as delay range 922.

Similarly, the measurements of L1 band implicit $f_o$ carrier phase observable $\psi_{L1}$ and L2 band implicit $f_o$ carrier phase observable $\psi_{L2}$ are applied to scale converters 928 and 932, respectively, which generate L1 residual range 930 and L2 residual range 934 respectively, in the same range units as phase range 926 and delay range 922.

Phase range 926 and delay range 922 are applied to L1 range substractor 936 which subtracts delay range 922 from phase range 926 to generate L1 range difference 938, which in turn is applied to averager 940. Averager 940 generates bias estimate 942 as the average of L1 range difference 938 over a period of time. The purpose of this time varying is to average or integrate out the fluctuations in L1 range difference 938 which are due to noise and multipath errors, so that bias estimate 942 will be a good estimate of the bias present in phase range 926. The length of the averaging period may be the total time span for which continuous observations are available.

On the other hand, it may be preferable to use a shorter averaging time, for example in order to limit the maximum possible span of time for which unbiased precise range 946 could be corrupted by an accidental "cycle slip", or step change in the bias of phase number 626, due to any momentary failure of phase tracking in satellite tracking channel 32.

Phase range 926 and bias estimate 942 are applied to bias subtractor 944 which subtracts bias estimate 942 from phase range 926 to generate unbiased precise range 946, which therefore is a measurement of range having the spatial and the temporal precision of phase range 926, and the freedom from ambiguity or bias of delay range 922. It should be noted that both phase range 926 and delay range 922 contribute to unbiased precise range 946.

In one sense it can be said that terminal 23 derives position information from observations of C/A code group delay observable $\tau$ with the aid of observations of 308 $f_o$ implicit carrier phase observable $\phi$. In another, equally valid sense it can be said that terminal 23 derives position information from observations of 308 $f_o$ implicit carrier phase observable $\phi$ with the aid of observations of C/A code group delay observable $\tau$. In fact, terminal 23 derives position information from a multifaceted combining of C/A code group delay observable $\tau$ and 308 $f_o$ implicit carrier phase observable $\phi$, both during and after measurement in satellite tracking channel 32. Within phase and group delay register subsystem 196 as shown in FIG. 6, and as may also be seen from the interconnections of phase register 616 and delay register 672 in FIG. 14, 308 $f_o$ implicit carrier phase observable $\phi$ and C/A code group delay observable $\tau$ are measured interactively within satellite tracking channel 32. The measurement of each aids the measurement of the other. This interaction during measurement of 308 $f_o$ implicit carrier phase observable $\phi$ and C/A code group delay observable $\tau$ is different than and separable from the interaction during the combining of these observable after measurement, as performed in codeless dual band phase detector 751.

In fact, this interactive determination may be considered to be the measurement of a new and different observable, the group-phase delay observable. Measurements of the group-phase delay observable, combined as shown above, determine a new kind of range distance between the satellite and the receiver. The process may be called "MACRORANGING" measurement, and the range so measured may be called the "MACRORANGE" distance.

Only the variation, and not the average value or the constant component of phase range 926 during the observation time period, contribute to unbiased precise range 946. The average or constant component of unbiased precise range 946 is determined by delay range 922. Thus, terminal 23 may be said to derive position information from observations of C/A code group delay observable $\tau$.

However, the measurement of 308 $f_o$ implicit carrier phase observable $\phi$ applied to bias subtractor 944 enhances the measurement of phase range 926 by removing its bias, which if not removed would constitute an error. Unbiased precise range 946 which is the output of bias subtractor 944 is phase range 926 with the bias error reduced. Delay range 922 contributes to the enhancement of phase range 926 by helping to reduce its bias error. Thus, terminal 23 can also be said to derive position information from measurements of 308 $f_o$ implicit carrier phase observable $\phi$ with the aid of measurements of C/A code group delay observable $\tau$.

Unbiased precise range 946 is corrupted by ionospheric error due to the ionospheric errors present in both delay range 922 and phase range 926. In order to correct unbiased precise range 946, it will be combined as discussed below with a correction derived from L1 residual range 930 and L2 residual range 934 L2.

L1 residual range 930 and L2 residual range 934 are applied to L1-L2 subtractor 948 which subtracts L2 residual range 934 from L1 residual range 930 to generate L1-L2 difference 950 which measures the difference between the ionospheric delays of the GPS signals received in the two bands. L1-L2 difference 950 is time averaged or filtered in L1-L2 difference averager 952 to produce ionosphere estimate 954 which is a smoothed estimate of the ionospheric effect on the signals. The reason for the averaging or filtering performed in L1-L2 difference averager 952 is to improve the estimate by smoothing out any rapid fluctuation which might be due to noise or multipath interference, etc. in L1 residual range 930 or L2 residual range 934. Usually such fluctuations are more rapid than actual fluctuations of the ionosphere.

However, the characteristic time scale of multipath-related fluctuations may vary depending on environmental factors such as antenna height, the horizontal distance to a reflector, sea conditions, ship speed, and so on. Therefore the averaging time or filter characteristics used in L1-L2 difference averager 952 should be matched to the situation at hand. More rapid changes in the relative position of antenna 22 and potential reflectors such as the sea surface as well as rapid changes in the position of antenna 22 with respect to the satellite, caused for example by rough seas, reduce the coherence of multipath errors and permit integration periods as short as one minute. Less rapid changes may require longer integration periods on the order of several minutes. Certain ionospheric changes, known as Travel Ionospheric Disturbances, are quasi periodic with quasi periods on the order of one half to three quarters of an hour. Integrations periods should therefore be typically less than 10 minutes in length.

Ionosphere estimate 954 is scaled by being multiplied by a factor of 3600/2329 in scaler 956. The product of this operation is L1 ionosphere estimate 958 which represents an estimate of the contribution of the ionosphere to unbiased precise range 946. L1 ionosphere estimate 958 is subtracted from unbiased precise range 946 by ionosphere subtractor 960 to produce vacuum range 962 in which the effect of the ionosphere on unbiased precise range 946 has been substantially removed, leaving vacuum range 962 which retains the temporal and most of the spatial precision of phase range 926 and the freedom from ambiguity or bias of delay range 922.

Referring now to FIG. 15B, the alternate embodiment of observables combiner 701 is disclosed. This embodiment is configured from a conventional Kalman filter, or sequential least-squares estimator, in accordance with well known techniques.

As shown in FIG. 15B, Kalman filter 703 in combiner 701 receives measurements of C/A code group delay observable $\tau$, 308 $f_o$ implicit carrier phase observable $\tau$, L1 band implicit $f_o$ carrier phase observable $\psi_{L1}$, and L2 band implicit $f_o$ carrier phase observable $\psi_{L2}$ from all satellite tracking channels 32, and related time-tag information such as digital real time indication 34 from real time clock 36 shown in FIG. 2. Kalman filter 703 also receives external information 707 which may include orbital and time correction information 46, phase & delay observations from shore stations 48, and ship position and velocity information 50 as shown in FIG. 2.

In Kalman filter 703, the preferred values of the standard deviations of the input measurement errors, expressed in range units, are on the order of 10 meters for C/A code group delay observable $\tau$, 1 meter for L1 band implicit $f_o$ carrier phase observable $\psi_{L1}$ and for L2 band implicit $f_o$ carrier phase observable $\psi_{L2}$, and 3 millimeters for 308 $f_o$ implicit carrier phase observable $\phi$.

Kalman filter 703 generates position information 705 which may include the current estimates, and the estimated covariances of the associated estimation errors, of the variables listed in the first column of the table shown in FIG. 15C. The variables and related information shown in FIG. 15C are typical of those which might be appropriate for determining the position of a ship of medium size such as a seismic survey ship, with the ship's terminal 23 equipped with a clock which is governed by a frequency standard of the commercially available rubidium-vapor type.

In Kalman filter 703 each estimated variable is modeled by a first-order Gauss-Markov process, by an integrated Gauss-Markov process, or by the sum of one of each such processes. As is known to those familiar with the art of filtering and estimation, the autocovariance of a first-order Gauss-Markov process is an exponential function of time-lag, and may conveniently be characterized by two parameters: the square root of the variance for zero lag, SIGMA; and the 1/e decay or correlation time, T. Preferred values of these two model parameters are shown for each variable in the second and third columns of the table shown in FIG. 15C. It should be noted that in some cases the preferred correlation time T is much longer than any possible time span of observation. In such cases the Gauss-Markov process resembles a random-walk process.

It should be understood that different sets of state variables, models, and/or statistical parametrizations may be more appropriate in other situations. The set given in the table is a nearly minimal set, in that a more elaborate parametrization may be desirable. For example, wave-induced motion of ship 10 might be modeled by means of damped harmonic oscillators. It may also be desired to introduce variables representing satellite orbit and clock parameters.

The first three variables, latitude, longitude, and height, describe the short-time-mean position of antenna 22, with wave-induced motion removed. The next two variables are the time derivatives of latitude and longitude, respectively. The latitude and the longitude of ship 10 are modeled by just the integrals of the respective derivative processes characterized in the table. The height of ship 10 is modeled simply by the first-order process with the characteristics listed after "Height".

The instantaneous position of antenna 22 is described by the sums of the short-time-mean latitude, longitude, and height variables, plus the respective offsets delta latitude, delta longitude, and delta height. It may be desirable to include such "delta" or position offset variables to model wave-induced motion of ship 10. Of course, these offset variables will tend to follow, or absorb, any short-term motion of antenna 22.

The epoch error of real time clock 36 as a function of time is modeled by the sum of the "Clock epoch" process and the integral of the "Clock rate" process characterized in the table.

The bias of 308 $f_o$ implicit carrier phase observable $\phi$ for each observed satellite is modeled explicitly, by a process which amounts to a very slow random-walk.

The ionospheric range effect in 308 $f_o$ implicit carrier phase observable $\phi$ and C/A code group delay observable $\tau$ is modeled in a standard manner as the product of a local "zenith" value and a zenith-angle-dependent "mapping" factor which is a function of each satellite's local zenith angle. The Gauss-Markov parameters given in the table pertain to the zenith value.

As mentioned above, the a priori uncertainty of the ionosphere parameter may be so small that there is no need to estimate bias parameters related to L1 band implicit $f_o$ carrier phase observable $\psi_{L1}$ and L2 band implicit $f_o$ carrier phase observable $\psi_{L2}$. However, bias parameters for these observables for each satellite may be included in the set of estimated state variables. Very rapidly after the commencement of observations of a given satellite, the estimates of these biases should converge to the correct half-integer values, normally zero. When such convergence has been obtained, a bias parameter may be removed from the set of variables, and fixed at the appropriate half-integer value.

Kalman filter 703 preferably includes means for monitoring the validity of its input data. Cycle slips in the phase tracking, which appear as half-integer or integer step changes in the phase measurements, may be detected by known methods. The root-mean-squares of the differences between the observed and the model-computed values of the observables may also be monitored and checked against a priori assumptions. An individual observation differing by more than a few times the appropriate r.m.s. value should be rejected.

3. AN ALTERNATE EMBODIMENT

Figures 16–24

Now referring to an alternate embodiment of the present invention, a system for determining position using radio signals from GPS satellites independently of knowledge of the codes used in the modulation of the signals transmitted by the satellites is disclosed in FIGS. 16 through 24.

Major portions of the system disclosed in FIGS. 16 through 24 are substantially similar to corresponding portions of the system disclosed in FIGS. 1 through 14. For example, terminal 1013-1 shown in FIG. 16 performs many of the same functions as terminal 23 shown in FIG. 2. Receiver 24 shown in FIG. 2 includes most of the same components, or close equivalents, as receiver unit 1031 shown in FIG. 17.

In both embodiments, a first composite of spread-spectrum, suppressed carrier signals received concurrently from a plurality of GPS satellites in the L1 band is down-converted by in-phase and quadrature mixing with a 308 $f_o$ local reference oscillator to a video band of frequencies, and separated into two signals representing two different portions of the L band frequency spectrum: an upper sideband signal containing those signals which were received with frequencies greater than 308 $f_o$, and a lower sideband signal containing those signals received with frequencies less than 308 $f_o$.

Figure 19:
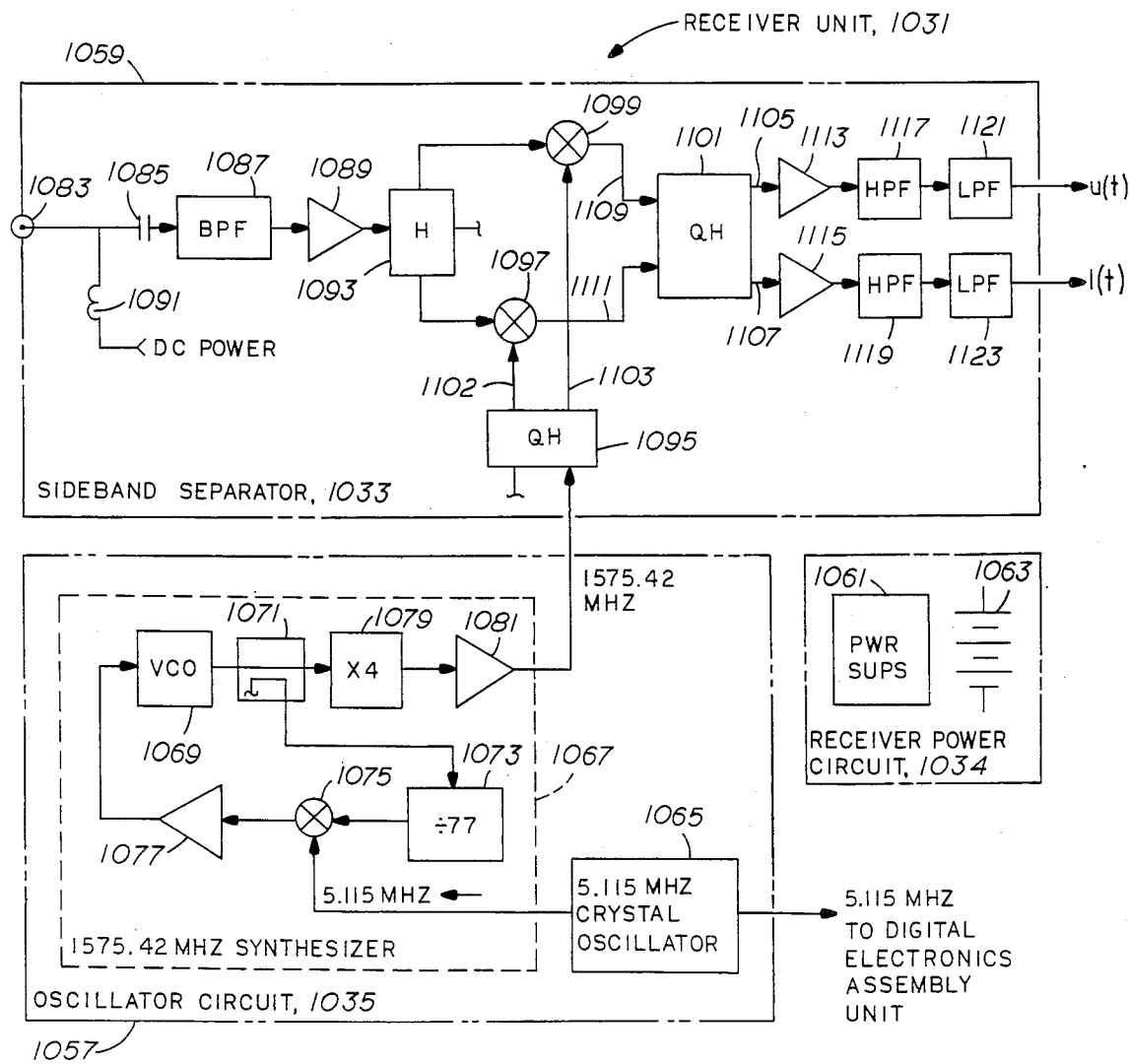
FIG. 19 is a block diagram of the receiver unit shown in FIG. 17.

Referring to FIG. 19, the upper sideband signal appears as the output of filter 1121, labeled "u(t)", and the lower sideband signal appears as the output of filter 1123, labeled "l(t)". Referring to FIG. 5, the upper sideband signal appears as the input of broadband bandpass filters 146, labeled "USB 142", and the lower sideband signal appears as the input of broadband bandpass filter 148, labeled "LSB 144".

In both embodiments, the upper sideband signal is then mixed with the lower sideband signal to generate a second composite signal simultaneously including a plurality of reconstructed carrier components which are continuous waves with discrete frequencies. This mixing is performed in exclusive-nor gate 1137 shown in FIG. 21, and in mixer 150 shown in FIG. 5.

In both systems, a reconstructed carrier component of a selected satellite is separated from the other components of the second composite signal by mixing the second composite signal with in-phase and quadrature components of a local model whose frequency is varied to track the frequency of the selected reconstructed carrier component. Then, in both systems, the phase of the selected reconstructed carrier component is determined from the inverse tangent function of the integrated quadrature mixer outputs. These operations are performed within L1 band $f_o$ carrier phase detector 206 shown in FIG. 6, and mostly within correlator assembly 1127 shown in FIG. 20. The local model used within L1 and $f_o$ carrier phase detector 206 shown in FIG. 6 is $f_o$ carrier phase estimate 204 generated by phase and group delay register subsystem 196. The local model used within correlator assembly 1127 shown in FIG. 20 is generated by numerical oscillator assembly 1129.

The second composite signal as generated in each system contains reconstructed carrier components representing both the 308 $f_o$ and the $f_o$ carriers which are implicit in the L1 band signals. However, correlator assembly 1127 selects the 309 $f_o$ implicit carriers, while L1 band $f_o$ carrier phase detector 206 selects the $f_o$ implicit carriers.

Reconstructed carriers representing the 240 $f_o$ L2 band center frequency implicit carriers are generated by the mixing together of the L2-band upper and lower sideband signals within phase and group delay register subsystem 196, shown in FIG. 3, and the phases of these carriers are measurable by the same means as already discussed.

Figure 20:
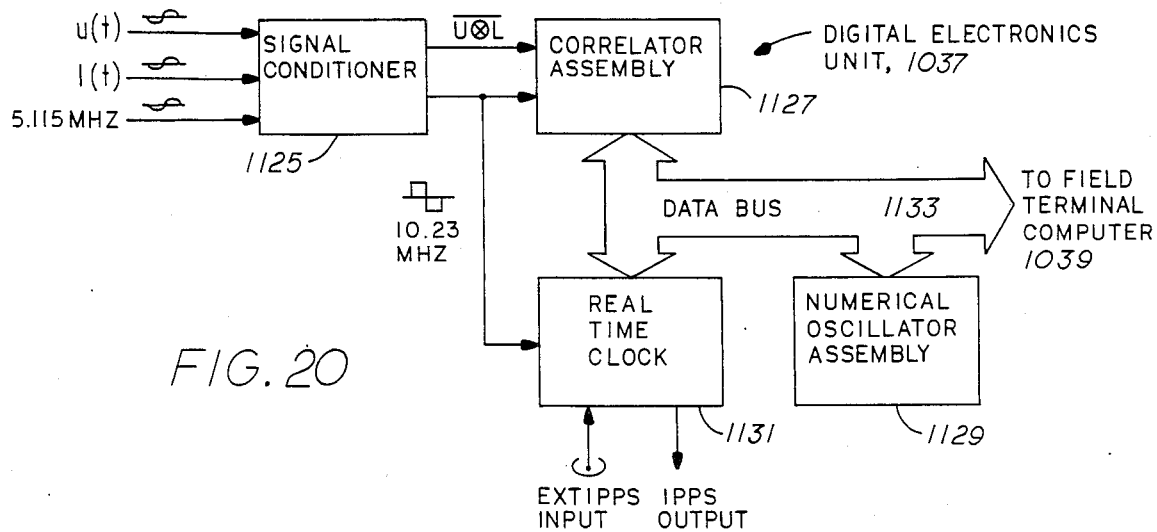
FIG. 20 is a block diagram of the digital electronics unit shown in FIG. 17.

In particular, an accurate local model could be generated by means such as numerical oscillator assembly 1129 shown in FIG. 20, or phase and group delay register subsystem 196 shown in FIG. 6, and be correlated with the second composite signal derived from the L2 band by means such as L1 band $f_o$ carrier phase detector 206 or L2 band $f_o$ carrier phase detector 208 shown in FIG. 6, or correlator assembly 1127 shown in FIG. 20.

Figure 23:
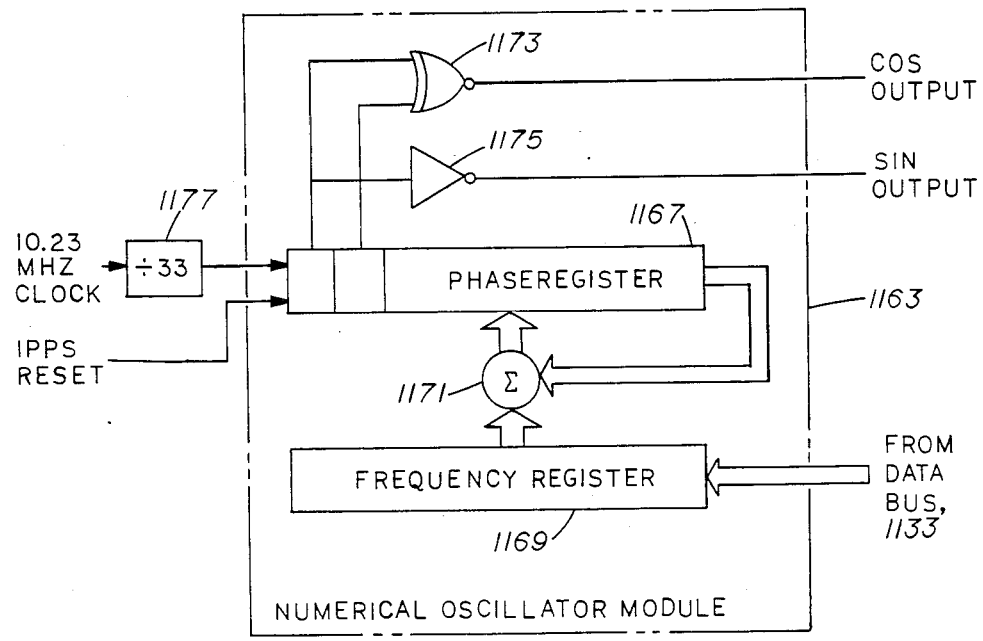
FIG. 23 is a block diagram of one of the numerical oscillator modules in the numerical oscillator assembly shown in FIG. 20.

The local model signal used to separate a selected satellite's reconstructed 240 $f_o$ carrier from an L2-band related second composite signal could be derived, as indicated above with reference to $f_o$ carrier phase estimate 204, from phase register 840 shown in FIG. 13, or it could be derived from phase register 1167 shown in FIG. 23.

In the operation of the embodiment disclosed in FIGS. 16 through 24, real time clock 1131 is synchronized by means of a direct connection to the input labeled "EXT 1 PPS INPUT" and/or the output labeled "1 PPS OUTPUT" as shown in FIG. 20. In the operation of the embodiment disclosed in FIG. 2, real time clock 36 does not need to be synchronized by means of a direct connection to another clock. As discussed above, an epoch offset of real time clock 36 may conveniently be determined "internally", from the observations of pseudorange which are made by terminal 23.

The observations used for the purpose of determining the departure from synchronization of real time clock 36 are preferably measurements of C/A code group delay observable $\tau$, such as those made by terminal 23 using the C/A code. The advantage of using C/A code group delay observable $\tau$ for this purpose is the relative lack of ambiguity in such measurements. However, it may be convenient to determine the departure from synchronization of real time clock 36 instead, or additionally, from codeless measurements of the phases of relatively low frequency carriers such as the $f_o$ carriers, the $f_o/10$ carriers, the 1 kiloHertz carriers, the 25 Hertz carriers, and/or other carriers which are implicit in the GPS signals.

The means disclosed in FIGS. 2 through 14 for the measurement of group delay, or low-frequency carrier phases, with or without use of the C/A code, therefore provide an enhancement of the embodiment disclosed in FIGS. 16 through 24. This enhancement lessens the need for direct connection of clocks for the purpose of synchronizing them.

It should be noted that it would be sufficient, for the purpose of determining the clock epoch offset, to make just one measurement of pseudorange or group delay, of the signals received from just one satellite, at just one time, if sufficient phase measurement data were available to determine any unknown position coordinates simultaneously.

The method of measuring a baseline vector between a pair of points on Earth using radio signals broadcast by GPS satellites according to the principles of this embodiment of the present invention is accomplished by measuring the implicit carrier phases of the signals received from the satellites at each end of the baseline and then processing the phase information from both locations together to determine the baseline vector. The system for measuring a baseline vector between a pair of points on earth using radio signals broadcast by GPS satellites according to the principles of this embodiment of the present invention includes a pair of field terminals, one field terminal adapted to be positioned at each point, each field terminal including an antenna, an upper and lower sideband separator, a plurality of correlators and numerical oscillators, and a field terminal computer.

This embodiment of the present invention is directed to a technique for measuring the baseline vector between a pair of points, such as survey marks, on Earth by using the double-sideband, suppressed-carrier, radio signals transmitted by Earth orbiting satellites of the NAVSTAR Global Positioning System (GPS). The technique involves measuring the phases of the carrier waves implicit in the signals received at each location, and then processing the phase information obtained at both locations to determine the baseline vector. One advantage of the technique is that it measures the carrier phases without reference to knowledge of the coded signals that are used in the satellites to modulate the carriers. Another advantage is that it does not require transmission of the received signals, either in real time or by transportation of recordings, from two locations to a common location. Another advantage is that it does not require the use of large or highly directional antennas. Still another advantage is that it is relatively immune to errors caused by scattering and reflections of radio waves occurring close to the receiving antennas.

As is known, satellites of the NAVSTAR Global Positioning System (GPS) orbit the earth at approximately 20,000 kilometers altitude and transmit signals in a frequency band centered at 1575.42 MHz, known as the "L1" band, and signals in a secondary band centered at 1227.60 MHz, known as the "L2" band. The signals are modulated such that nearly symmetrical upper and lower sidebands are generated with the carrier completely suppressed.

For either band, the signal from a given satellite received at a given location may be considered, as a function of time, to have the form:

$$s(t) = m(t) \cos(2\pi f_o t + \phi) + n(t) \sin(2\pi f_o t + \phi)$$

in which m(t) and n(t) are modulating functions, each a real-valued function of time; $f_o$ is the nominal carrier frequency, equal to 1575.42 MHz for L1 and 1227.60 MHz for the L2 band; and $\phi$ is the received carrier phase, in radians, which is unknown and to be determined. Each of the modulating functions, m(t) and n(t), is a pseudo-random function of time, with zero mean. The two functions are mutually orthogonal. Each of the functions used for the modulation of the L1 carrier for any one satellite is also orthogonal to the corresponding function used for every other satellite, although for a given satellite the same m(t) or n(t) function, or both, may be used to modulate both the L1 and the L2 carriers. The bandwidths of the two functions, m(t) and n(t), differ by a factor of exactly 10, with m(t) having the narrower, and n(t) the wider, bandwidth. Usually at L1 both m(t) and n(t) signal components are present, and at L2 only the n(t) component is present, the m(t) function being set to zero, or "turned off." The power spectral density of m(t), which corresponds to the modulating signal that is known in the GPS literature as the "clear/acquisition" code, is proportional to the function $$\frac{\sin^2(\pi F/1.023 \text{ MHz})}{(\pi F/1.023 \text{ MHz})^2}$$

wherein F represents modulation frequency. This function has a half width at half maximum of approximately 450 kHz. That is, the function value is approximately 0.5 for $F = \sim 450$ kHz, whereas the value is unity for $F = 0$. The power spectral density of n(t), which corresponds to the modulating signal that is known in the GPS literature as the "precise code" or "P code," is proportional to $$\frac{\sin^2(\pi F/10.23 \text{ MHz})}{(\pi F/10.23 \text{ MHz})^2}$$

Thus, the half width at half maximum of the power spectral density of n(t) is approximately 4.5 MHz.

For the L1, 1575.42 MHz, signal, the mean-squared value of n(t) is ordinarily equal to one-half that of m(t); that is $$<n^2(t)> = 0.5 <m^2(t)>.$$

(It is possible for a GPS satellite to be operated in extraordinary modes in which the ratio of mean-square values, or power ratio, is different from 0.5; in particular, a value of zero is possible.) Thus, the ratio of the power spectral density of n(t) to that of m(t) is ordinarily equal to around $0.5 \div 10 = 0.05$ for a value of F near zero, so that if a bandpass filter matched to the spectrum of m(t) is centered on the L1 carrier frequency, about 90 percent of the power contained in the output of this filter will stem from the m(t) signal component, and less than 10% will stem from the n(t) component. For simplicity in the remainder of this description, therefore, it will be assumed that the GPS L1 signal has no n(t) component and has the simpler form:

$$s(t) = m(t) \cos(2\pi f_o t + \phi).$$

In general, the received carrier phase, $\phi$, is a slowly varying function of time, so the actual received carrier frequency is given by the algebraic sum:

$$f = f_o + (2\pi)^{-1}(d\phi/dt),$$

where $f_o$ is the nominal carrier frequency and $d\phi/dt$ is the time-derivative of $\phi$. By "slowly varying," it is meant that $(2\pi)^{-1}(d\phi/dt)$ is very small in comparison with $f_o$ and with the bandwidth of m(t). The main reason for the time-variation of $\phi$ is Doppler shift, which may cause f to differ from $f_o$ by plus or minus up to about 4.5 kHz.

The received signal s(t) contains no discrete spectral component of power at the carrier frequency because the mean value of m(t) is zero. Thus, the carrier is completely suppressed and the power spectral density function of the L1 signal s(t) is equal to the power spectral density function of the modulation m(t), translated from baseband to the received carrier frequency f. Because m(t) is a real-valued function of time, its power spectral density is an even-symmetric function of frequency. Thus the power spectral density of s(t) has even symmetry with respect to the carrier frequency f, and is said to be a double-sideband spectrum. The portion of this power spectrum corresponding to frequencies greater than f is called the upper sideband; the portion corresponding to lower frequencies is the lower sideband. [The slight asymmetry, at most about 3 parts in $10^6$, between the upper and the lower sidebands due to Doppler "stretching" of the signal is not significant here.]

According to this embodiment of the present invention an antenna is positioned at each end of a baseline vector. The signals received by each antenna are separated into upper and lower sideband components. These separate components are filtered, converted to one-bit digital form, and then multiplied together. Their product is analyzed digitally by means of correlation with quadrature outputs of a local oscillator to determine the power, and the phase relative to that local oscillator, of the carrier wave that is implicit in the double-sideband signal being received from each satellite. Differences in Doppler shift are utilized to distinguish the carriers of different satellites. Thus, the powers and carrier phases of the signals from a plurality of satellites are measured simultaneously and numerical data representing the measurement results are obtained at each survey mark. The measurements are performed in real time at each mark without reference to signals that are received at any other place and without knowledge of anyof the coded signals that modulate the GPS carriers. The data from the measurements performed simultaneously but independently at two survey marks, once per second for a time span of sufficient duration, such as about 5,000 seconds, are then processed together to determine the baseline vector that extends from one mark to the other. Two methods of processing are disclosed. In either method, an "ambiguity function" is computed which is a function of the measurement data and of a trial value $\hat{b}$ of the baseline vector. The vector space of $\hat{b}$ is systematically searched to find the unique value of $\hat{b}$ that maximizes the computed function. This value of $\hat{b}$ is taken to be the desired determination of the unknown baseline vector $\vec{b}$.

Figure 16:
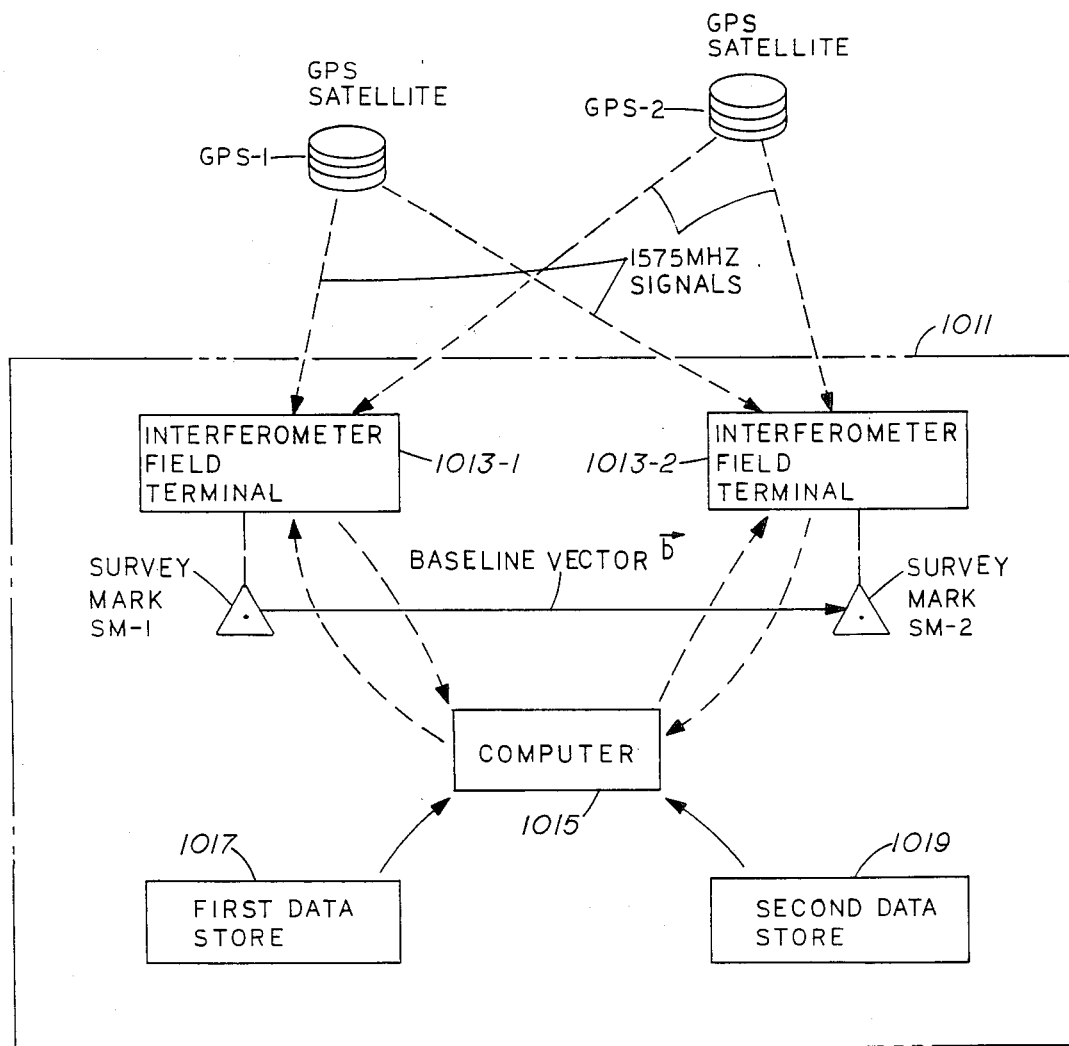
FIG. 16 illustrates a system for determining a baseline vector with GPS satellites according to the principles of an alternate embodiment of the present invention.

Referring now to FIG. 16, there is illustrated a system 1011 for determining a baseline vector $\vec{b}$ according to this embodiment of the present invention. The baseline vector $\vec{b}$, which is also referred to hereinafter sometimes by the name "baseline," is the relative position vector of one survey mark SM-2 with respect to another mark SM-1. The baseline extends from survey mark SM-1 which is at the origin or one end of the baseline, to survey mark SM-2 which is at the terminus or other end of the baseline. The system 1011 comprises two intelligent field terminals 1013-1 and 1013-2, one placed at each end of the baseline, and a computer which may be structurally and functionally incorporated into and be part of one of the terminals 1013 or may be a separate unit 1015 as shown.

The system requires for its usual operation certain numerical data from external sources. It also requires some means of transferring numerical data between the computer 1015 and each terminal 1013 before and after, or (optionally) during performance of baseline measurements.

Before measurements to determine the baseline are begun, data from a first data store 1017 representative of the orbits of a plurality of GPS satellites of which two, indentified GPS-1 and GPS-2, are shown for illustrative purposes is entered into the computer 1015, together with approximate data representative of the locations of the survey marks SM-1 and SM-2 which is obtained from a second data store 1019. The latter data might, for example, represent the survey mark locations within a few kilometers accuracy. From these satellite orbital and survey location data computer 1015 generates, in tabular form as a function of time, a prediction of the Doppler frequency shift that the 1575.42 MHz signal transmitted by each GPS satellite will have as it is received at each survey mark. Computer 1015 also generates a tabular prediction of the power level of the signal to be received from each satellite at each mark. The predicted power is zero if the satellite will be below the horizon; and it is a function of the predicted angle of elevation of the satellite above the horizon, due to the angular dependence of the gain of a receiving antenna (at the mark) and, usually to a lesser extent, of the transmitting antenna (on the satellite). The tables of predicted frequency shifts and powers, for a span of time encompassing that of the anticipated measurements, for all GPS satellites expected to be visible at each survey mark, are now communicated by any known means, such as for example by telephone or radiotelephone link to, and entered into the the memory of, a smaller computer contained within the particular field terminal 1013 that will be, or may already have been, placed at that survey mark. Alternately the frequency and power prediction tables may be generated by the computer inside the field terminal.

The Doppler frequency predictions are computed according to formulas that are well known in the art. The magnitudes of the errors in such predictions are of the order of 1 Hertz per kilometer of error in the assumed location of the survey mark. The additional error in the frequency prediction due to error in the extrapolation of the satellite orbit is normally of the order of 1 Hertz or less for predictions made at least a day in advance. Frequency prediction errors of up to several Hertz are tolerable in the context of the present invention. The predictions of received power do not need to be very accurate; errors of several decibels would be tolerable, because these predictions are not used for any very critical purpose. They serve mainly to enable the field terminal computer to check whether the desired signal, not some spurious signal, is being received. At perhaps some sacrifice in reliability, the power prediction tables could be eliminated.

A field terminal 1013, having been placed at a survey mark, now receives the 1575.42 MHz signals from a plurality of satellites, up to seven but in no case fewer that two satellites, simultaneously. For an accurate determination of the baseline to be obtained, it is essential for the terminals at both ends of the baseline to observe the satellites concurrently.

Electronic circuits (hereinafter to be described) within each terminal separate the received signals into upper and lower sideband components and, using the predictions of Doppler frequency shift, analyze these sideband components to determine the power and the phase of the carrier wave implicit in the signal received from each satellite. Data from these power and phase determinations is stored within the field terminal and eventually returned to the central computer 1015 by any conventional means.

The data from the two field terminals 1013-1 and 1013-2 must be processed together to obtain an accurate determination of the baseline vector.

It should be noted that means for long-distance communication or transfer of data are not necessary for the operation of this system. The terminals 1013-1 and 1013-2 may be physically transported to the same location as computer 1015, and there the prediction tables may be transferred from computer 1015 to the terminals 1013. Then the terminals 1013, containing the tables in their memories, may be carried to the survey marks SM-1 and SM-2 where the satellites are observed. Following the completion of these observations the terminals 1013 may be carried back to the location of the computer 1015 where the carrier phase data may be transferred from both terminals to the computer for processing.

Figure 17:
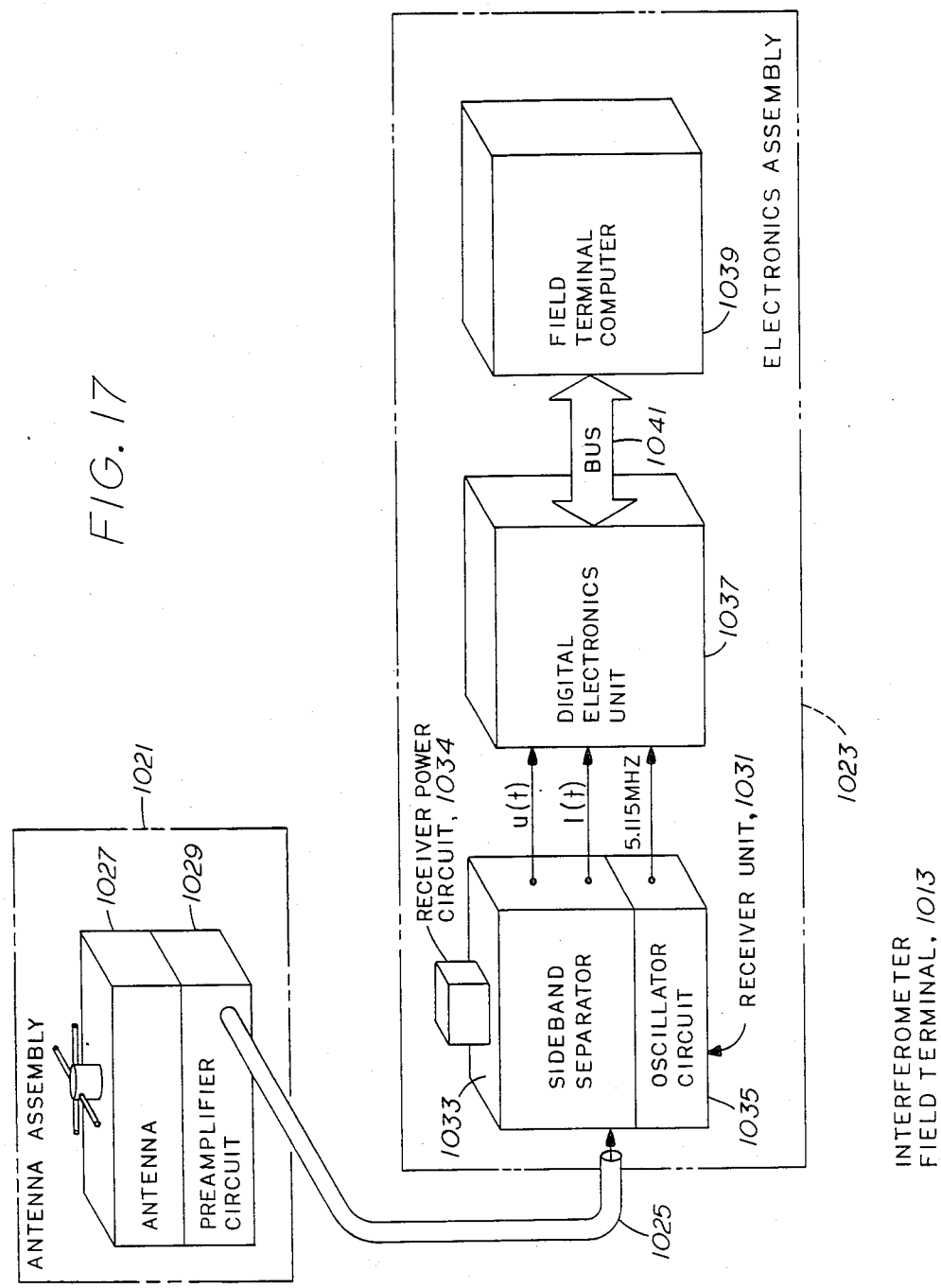
FIG. 17 is a block diagram of one of the field terminals shown in FIG. 16.

Referring now to FIG. 17, there is illustrated the major components of terminal 1013, also called the "field terminal." Each field terminal 1013 has an antenna assembly 1021 connected to an electronics assembly 1023 by means of a coaxial cable 1025.

Each antenna assembly 1021 includes an antenna 1027 and a preamplifier assembly 1029. The antenna is positioned on the survey mark SM, and may be constructed like the antenna which is described in U.S. Pat. No. 4,647,942 issued on Mar. 3, 1987 to Charles C. Counselman III and Donald H. Steinbrecher. Regardless of the manner of construction, the location of the phase center of the antenna 1027 with respect to the survey mark SM must be accurately known. The antenna described in said patent application is satisfactory in this respect; the uncertainty in the positioning of its phase center being a few millimeters at most.

Antenna 1027 receives the 1575.42 MHz radio signals that are transmitted by the GPS satellites. The received signals are amplified by the preamplifier 1029 and fed through the coaxial cable 1025 to a receiver unit 1031 contained in the electronics assembly 1023, the receiver unit 1031 including a sideband separator 1033, a receiver power circuit 1034, and an oscillator circuit 1035.

In the sideband separator 1033 the upper sideband portion of the signals, comprising that portion of the signals received from all satellites combined which occupies a range of radio frequencies extending upward from 1575.42 MHz, is separated from the lower sideband portion, which corresponds to radio frequencies below 1575.42 MHz. To effect this separation, the sideband separator 1033 uses a 1575.42 MHz reference signal which is supplied by the oscillator circuit 1035.

The receiver unit 1031 furnishes three signals, in analog form, to a digital eletronics unit 1037. One analog signal, designated u(t), represents the upper sideband component of the received radio frequency signals, translated to baseband. The second analog signal, designated l(t), represents the lower sideband component, also translated to baseband. Each of these two signals contains contributions from all visible satellites. The third signal furnished to the digital electronics unit 1037 is a sinusoidal signal with a frequency of 5.115 MHz which is the output of a free-running, stable, quartz crystal oscillator in the oscillator circuit 1035. The output of this same oscillator is multiplied in frequency by a fixed integer factor of 308 within the oscillator assembly to obtain the reference frequency of 1575.42 MHz used by the sideband separator. The accuracy of the frequencies generated by oscillator assembly 1035 is typically around one part in $10^9$, although accuracy of one part in $10^8$ would be tolerable.

In the digital electronics unit 1037 each of the three analog inputs is converted to a digital-logical signal. The digital signals are processed under the control of a field terminal computer 1039 to generate the carrier power and phase data. The digital electronics assembly 1037 is connected to the field terminal computer 1039 by means of a bi-directional data bus 1041. Field terminal computer 1039 may be a Digital Equipment Corporation (DEC) model LSI-11/2 microcomputer; the data bus 1041 in this case may be the DEC "Q" bus.

The carrier phase data are stored in the memory of the field terminal computer 1039 until it is desired to communicate these data to the central computer 1015 for processing. As noted, the central computer 1015 may be eliminated and the processing performed in one of the field terminal computers 1039. The phase data may also be written out by the field computer 1039 onto a data storage medium such as a magnetic tape cassette or a disk (not shown). The data may also be communicated via direct electrical connection, or via a modem and telephone connection, or by many other standard means.

Figure 18:
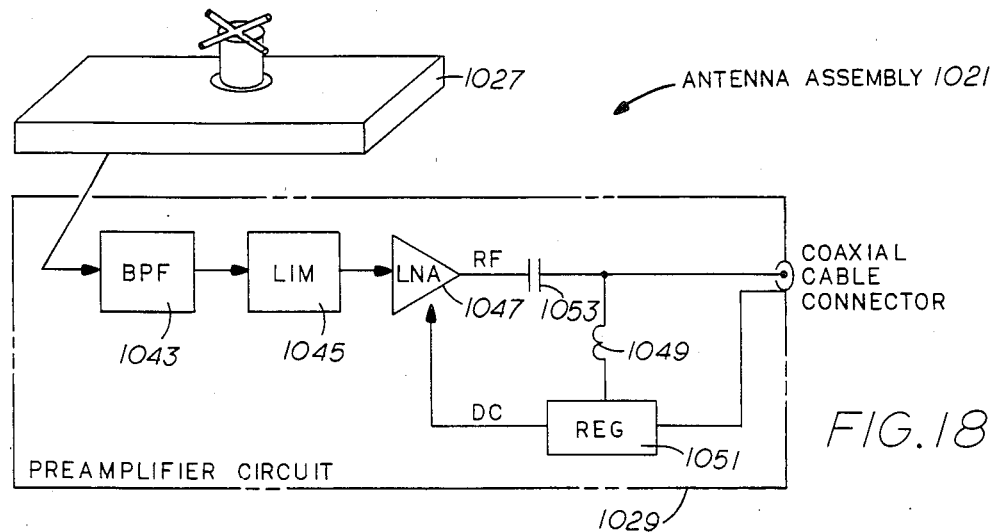
FIG. 18 is a block diagram of the antenna assembly shown in FIG. 17.

Now referring to FIG. 18, there are shown in further detail the components of the antenna assembly 1021. Assembly 1021 includes an antenna 1027 which, as mentioned, is constructed so that its phase center can be accurately positioned with respect to the survey mark. The 1575.42 MHz radio signals received by antenna 1027 are fed to the preamplifier circuit 1029 whose function is to raise their power level sufficiently to overcome the attenuation of the coaxial cable 1025 that connects the antenna assembly 1021 to the receiver unit 1031, and to overcome the background noise that is generated within the input amplifier in the receiver unit 1031.

In the preamplifier circuit 1029 the signals received from antenna 1027 are first filtered by a bandpass filter 1043 of approximately 50 MHz bandwidth centered on 1575.42 MHz. The function of filter 1043 is to prevent overloading of receiver assembly 1031 by strong spurious signals that may be present outside the GPS signal band. The output of bandpass filter 1043 is fed into a passive diode limiter 1045 which serves to protect a low-noise amplifier 1047 from being burned out by any very strong signals such as those that might be radiated by nearby high power radars. The low-noise amplifier 1047 is a standard Gallium-Arsenide field-effect-transistor (FET) amplifier with a noise figure of about 2 db.

D.C. power for the low noise amplifier is supplied via the coaxial cable 1025 connected to the preamplifier assembly 1029 from the receiver unit 1031, through a radio-frequency choke 1049 and a voltage regulator 1051. A capacitor 1053 couples the radio-frequency output of the low noise amplifier 1047 to the cable 1025 while blocking the D.C. from the amplifier.

Referring to FIG. 19, there is shown in more detail the components of the receiver unit 1031. The receiver unit 1031 includes a receiver power circuit 1034, a sideband separator 1033 and an oscillator circuit 1035. The receiver power circuit 1034 provides D.C. power for the operation of the oscillator circuit 1035, the sideband separator 1033, and, through the coaxial cable 1025, the low noise amplifier 1047 in the antenna assembly 1021. The oscillator circuit 1035 provides a reference frequency of 1575.42 MHz to the sideband separator 1033 and a reference frequency of 5.115 MHz to the digital electronics unit 1037. The sideband separator 1033 separates the signals that are received in a radio frequency band centered on 1575.42 MHz and extending upward and downward from this frequency, into separate upper and lower sideband components at baseband.

The receiver power circuit 1034 contains regulated D.C. power supplies 1061 and, in addition, a storage battery 1063. The battery 1063 enables power to be supplied without interruption to the crystal oscillator 1065 in the oscillator circuit 1035, to the real-time clock in the digital electronics unit 1037, and to the data memory of the field terminal computer 1039, despite interruptions of the main, external, source of electrical power that may occur. Thus, the frequency stability of the oscillator will be maintained, the clock epoch setting will not be lost, and data stored in the computer memory will not be lost.

The oscillator 1065 in the oscillator circuit 1035 is a quartz crystal oscillator, such as a Frequency and Time Systems (FTS) model 1001, which provides an output frequency of 5.115 MHz within one part in $10^8$ or less. The FTS model 1001 has stability of about one part in $10^{10}$ per day and one part in $10^{12}$ over time intervals of from 1 to 100 seconds, and is therefore more than adequate in this application. Oscillator 1065 provides two identical outputs, one which goes to the digital electronics unit 1037, and the other which goes to a 1575.42 MHz synthesizer 1067 in the oscillator circuit 1035.

The 1575.42 MHz synthesizer 1067 contains a voltage-controlled transistor oscillator (VCO) 1069 which oscillates at a frequency of 393.855 MHz, equal to 77 times 5.115 MHz. This oscillator's phase is stabilized with respect to the phase of the 5.115 MHz reference through the action of a phase-locking loop comprised of the VCO 1069, a coupler 1071, a divider 1073, a phase-frequency error detector 1075, and a loop filter 1077. Part of the VCO 1069 output power is coupled by the coupler 1071 to the input of the frequency divider 1073 which is comprised of standard emitter-coupled-logic (ECL) integrated circuits that divide by 11 and then by 7. The output of divider 1073 is the "variable" input and the 5.115 MHz output of oscillator 1065 is the "reference" input to the standard ECL integrated-circuit phase-frequency detector 1075 such as Motorola type number MC12040. The output of the detector 1075 is low-pass filtered in loop filter 1077 to obtain the control voltage which is input to the VCO 1069. The output of VCO 1069 is quadrupled in frequency by a succession of two standard, balanced, diode doublers 1979 and amplified by an amplifier 1081 to obtain the 1575.42 MHz output frequency which drives the sideband separator 1033.

The signals in a band centered on 1575.42 MHz, received from antenna assembly 1021 through the coaxial cable 1025 at the input 1083 of the sideband separator 1033 are coupled by a D.C. blocking capacitor 1085 through a bandpass filter 1087 and amplified by an input amplifier 1089. D.C. power for the preamplifier 1029 (in the antenna assembly) is coupled to the coaxial cable 1025 through a radio-frequency choke 1091 from the receiver power 1034.

The r.f. power-splitter, or "hybrid" 1093, the 1575.42 MHz local-oscillator quadrature hybrid 1095, the two doubly-balanced mixers 1097 and 1099, and the broadband video-frequency quadrature hybrid 1101 in the sideband separator 1033 comprise a dual, single-sideband, radio-frequency-to-baseband converter or "demodulator" of the conventional, "phasing" type. Such a demodulator has been described, for example, in an article in the Proceedings of the IEEE, vol. 59 (1971), pp. 1617-1618, by Alan E. E. Rogers. Its operation here may be described as follows.

Let $f_o$ denote the frequency of the reference signal furnished to the sideband separator 1033 by the oscillator circuit 1035. Nominally, $f_o$ equals 1575.42 MHz, which equals the nominal carrier frequency of the GPS satellite "L1" transmissions, before (first-order) Doppler shift. Then the outputs 1102 and 1103 of the quadrature hybrid 1095 may be written as $\sin 2\pi f_o t$ and $\cos 2\pi f_o t$, respectively. These outputs, which are in phase quadrature, are the "local oscillator" inputs to mixers 1097 and 1099, respectively. The r.f. inputs to the two mixers are identical. The baseband outputs of the mixers are accordingly identical except for a phase shift of $\pi/2$ radians. (By "baseband" we refer to the range of frequencies, nearer to zero than to $f_o$, that corresponds to the difference between the input frequency and $f_o$). The sense of this phase shift, leading or lagging, depends on whether the input signal frequency is above or below $f_o$. Thus it is possible to select either upper-sideband (input frequency higher) or lower-sideband inputs and to reject the opposite sideband by shifting the phase of one mixer output by an additional $\pi/2$ radians, and then either adding or subtracting (depending on which sideband is desired) the two mixer outputs.

The quadrature hybrid 1101, which has two inputs 1109 and 1111 and two outputs 1105 and 1107, performs this $\pi/2$ phase shift and addition/subtraction. The upper output 1105 of the hybrid 1101 is given by the arithmetic sum of the upper input 1109, plus the lower input 1111, both inputs having been delayed in phase by an amount that is dependent on frequency, but with the phase shift of the lower input greater than that of the upper input by a constant $\pi/2$ radians, independent of frequency. The lower output 1107 is given by the arithmetic difference of the same two differentially phase-shifted inputs 1109 and 1111, with the difference being taken in the sense: upper minus lower. The specified, $\pi/2$ radian (one-quarter cycle), phase difference is accurately maintained for all frequencies between $f_{HP}$ and at least $f_{LP}$, where $f_{HP} \approx 10$ kHz is much smaller than $f_{LP} \approx 450$ kHz, and $f_{LP}$ is approximately equal to the one-sided bandwidth of the GPS C/A modulation m(t), as previously discussed. The design of a quadrature hybrid having these properties is given in the cited article by Rogers.

Now the outputs of the quadrature hybrid 1101 are separately amplified by identical video amplifiers 1113 and 1115, and filtered by high-pass 1117 and 1119 and low-pass 1121 and 1123 filters. Filters 1117 and 1119 are identical high-pass filters with low-frequency cutoff at $f_{HP}$. The purpose of the high-pass filters 1117 and 1119 is to eliminate the direct-current components and any low-frequency spectral components of the mixer outputs with frequencies similar to, or lower than, the maximum possible magnitude of Doppler shift that a GPS satellite signal might have.

It is desired to reject any such components because otherwise they could interfere with the subsequent determination, in the digital electronics assembly and computer of the field terminal, of the received, Doppler-shifted, carrier phase. Such potentially interfering signals might include low-frequency "flicker" noise generated in the mixers themselves, or might result from a combination of mixer imbalance and (undesired) low-frequency amplitude or phase fluctuations of the 1575.42 MHz reference signal or of the gain of any radio-frequency signal amplifiers preceding the mixers. Another potential source of low-frequency interference is "hum" or ripple on power-supply output voltages or currents. Another source could be an interfering continuous-wave signal close in frequency to $f_o$.

Low pass filters 1121 and 1123 are identical low-pass filters with bandwidth equal to $f_{LP}$, equal to the one-sided bandwidth of m(t). The response of each filter, as a function of frequency, is tailored to match the power spectral density of m(t). The purpose of these filters is to reject noise and interference outside the bandwidth of m(t). Note that the wide bandwidth GPS "P code" modulation signal n(t) here would normally constitute a source of interference. Most, approximately 80 percent, of the power stemming from n(t) is rejected by these low-pass filters. This degree of rejection is sufficient to ensure that the "P code" interference has a negligible effect. We note, however, that if the narrow band, m(t), modulation were turned off in the GPS satellites, then the wideband n(t) moldulation would no longer represent an undesired, interfering, signal; it would become the desired signal. Such a switch in the GPS signal structure could be accommodated by increasing the bandwidths of the low-pass filters 1121 and 1123 by a factor of 10, to match them to the new "signal."

The output, u(t), from low pass filter 1121 represents the down-converted and filtered, upper sideband component of the original signal s(t); and the output l(t) from low pass filter 1123 represents the lower sideband. It should be noted that the spectrum of u(t) will be shifted upward in frequency, and the spectrum of l(t) will be shifted downward in frequency, relative to the spectrum of the original modulation m(t) by an amount equal to $(f-f_o)$, the difference between the actual received carrier frequency f and the local oscillator frequency $f_o$. [If the Doppler shift of the carrier, $(f-f_o)$, is negative, then the u(t) spectrum is shifted downward and l(t), upward.] The magnitude of this shift is assumed to be smaller than $f_{HP}$, and much smaller than $f_{LP}$. This assumption will be satisfied if the frequency shift arises primarily from Doppler shift, which can never exceed 5 kiloHertz in magnitude, provided that $f_{HP}$ is set approximately equal to 10 kHz. Any offset of the frequency of the reference crystal oscillator 1065 from the desired, 5.115 MHz, frequency will cause a (308 times greater) shift of the u(t) and l(t) spectra, too. Normally, however, such a shift will be very much smaller than $f_{HP}$.

In addition to the frequency shift of the upper and lower sideband outputs u(t) and l(t), there is a frequency-dependent, dispersive, phase shift of each output due to the quadrature hybrid 1101. However, for the particular quadrature hybrid design of Rogers (op. cit.), this phase shift is too small to be important. Similarly, the additional phase shifts introduced by the bandpass filter 1087 and the high and low pass filters 1117, 1119, 1121, and 1123, will be trivial if standard filter designs are employed. Each of these effects also tends to cancel when the difference between terminals is taken in the subsequent data processing. The cancellation is not exact because no two filters are ever exactly the same; also, the Doppler shifts at different sites are different at any given time. However, the residual effects are negligible, as has been shown by direct calculation and confirmed by actual experiment.

Now referring to FIG. 20, there is shown a block diagram of the digital electronics unit 1037. The digital electronics unit 1037 includes a signal conditioner 1125, a correlator assembly 1127 comprising a set of seven identical correlators, a numerical oscillator assembly 1129 comprising a corresponding set of seven identical numerical oscillators, and a real-time clock 1131, with the correlator assembly 1127, the numerical oscillator assembly 1129 and the real time clock 1131 being connected by a data bus 1133 to one another and to the field terminal computer 1039. The first function of the signal conditioner 1125 is to converter the analog upper-sideband signal u(t), the analog lower-sideband signal l(t), and the analog 5.115 MHz sinusoidal signal each to a binary-valued "digital" or "logic" signal that is suitable for processing by conventional transistor-transistor logic (TTL) circuits.

The signal conditioner 1125 produces just two outputs. One is a binary-valued, TTL-logic-level, square, periodic waveform with a frequency of 10.23 MHz, produced by frequency-doubling the 5.115 MHz input. This 10.23 MHz output serves as a "clock" signal to control the timing of all the subsequent, digital, circuits. This clock signal is divided by 1023 ($= 3 \times 11 \times 31$) in the real-time clock 1131 to obtain one tick per 100 microseconds; further divisions by successive factors of 10 then yield a complete decimal representation of the time in seconds, with the least significant digit representing units of $10^{-4}$ seconds. The time is always readable in this form via the data bus 1133. The operations of the correlator assembly 1127, the numerical oscillator assembly 1129, and the field terminal computer 1039 are all governed by the real-time clock 1131 through the data bus 1133.

The second "digital" output of the signal conditioner 1125 is derived from the analog u(t) and l(t) inputs, and is a binary-valued, TTL-logic-level, nonperiodic waveform. This output is produced by a TTL exclusive-nor logic gate which has two inputs: one input represents the sign of the u(t) input and the other, the sign of l(t). thus the gate output is "True" (T, or binary 1) if and only if the analog u(t) and l(t) signals have the same sign.

Figure 21:
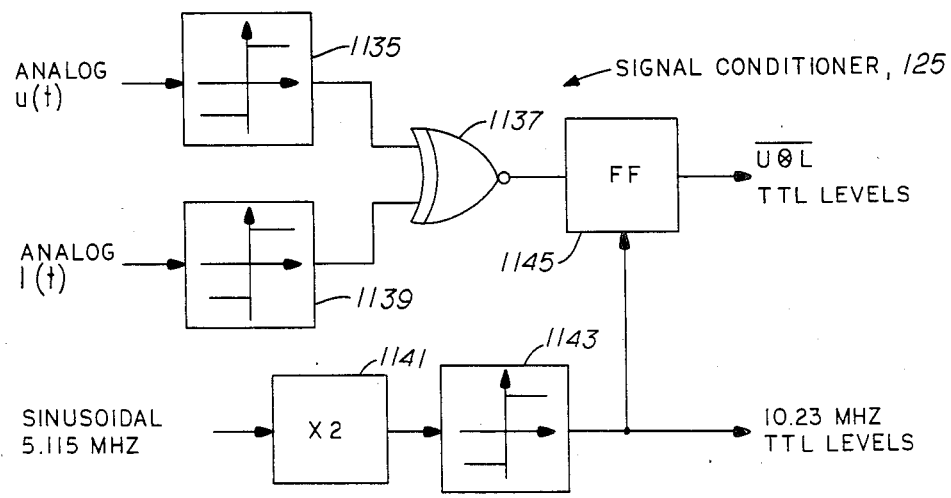
FIG. 21 is a block diagram of the signal conditioner shown in FIG. 20.

In FIG. 21 is shown a block diagram of the signal conditioner 1125. The analog signal u(t) is input to a comparator 1135 whose output is a TTL logic level, True when u(t) is positive and False when u(t) is negative. This TTL logic signal is applied as one input to an TTL exclusive-nor gate 1137. The analog signal l(t) is similarly fed to a comparator 1139 whose output is applied as the other input of the exclusive-nor gate 1137. The sinusoidal 5.115 MHz signal obtained from crystal oscillator 1065 is input to a conventional analog frequency doubling circuit 1141 whose output is fed to a third comparator 1143 to produce a 10.23 MHz, square-wave, TTL level output. The 10.23 MHz output is also used as the "clock" input to a flip-flop 1145 which samples and holds the output from gate 1137. Thus the output of flip-flop 1145 is the exclusive-nor function of the signs of u(t) and l(t), sampled at a uniform rate of $10.23 \times 10^6$ times per second, and held between sampling times. It is well known in the art of radio interferometry, as discussed for example by J. M. Moran in an article appearing in Methods of Experimental Physics, vol. 12, part C, pp. 228-260, that the binary-valued function of time U⊗L has a Fourier transform, or "spectrum," that is a good approximation, both in phase and in relative amplitude, to the Fourier spectrum of the analog product u(t)l(t). The accuracy of the approximation depends on the analog signals being random and Gaussian in character. Also, the correlation coefficient between the two inputs must be much smaller than 1 in magnitude. (In effect, the noise "dithers" out the nonlinearities of the comparators. The exclusive-nor gate 1137 may be regarded as a multiplier, each of whose inputs has values of +1 and −1.) These conditions are well satisfied in the present system. Thus, in the following, the logic-level from flip-flop 1145 is considered as representing simply the product u(t)l(t).

The U⊗L "product" from the signal conditioner 1125 is input in parallel to each of seven identical correlators in the correlator assembly 1127.

Before describing the construction of the correlator assembly 1127, its principles of operation will be briefly explained.

In each correlator, the u(t)l(t) product is correlated with binary approximations to sine and cosine functions of time that are generated by a corresponding one of the seven numerical oscillators. The frequency of the oscillator is controlled by the field terminal computer 1039 according to the time indicated by the real-time clock 1131. At any given time, the oscillator frequency is set equal to twice the predicted Doppler frequency shift of the 1575.42 MHz carrier wave transmitted by one of the satellites. One oscillator and one correlator are associated with each of the satellites in view, up to a maximum of seven satellites. (In principle, if more than seven satellites were ever in view, more numerical oscillators and correlators could be used in the system. In practice, seven is sufficient.) If the predicted Doppler shift is sufficiently close to the actual Doppler shift, then the outputs of the correlator will accurately measure the power and the phase of the signal from the one particular satellite for which the prediction was made, and will not be significantly affected by the presence of signals from other satellites which have different Doppler shifts.

In mathematical terms, the operation of one of the numerical oscillators and its associated correlator is described as follows: As a function of the time, t, indicated by the real time clock 1131, the predicted Doppler frequency shift of the satellite's carrier is given by $f_p(t)$. The value of $f_p(t)$ is interpolated from the table of pre-computed values that was previously stored in the memory of the field terminal computer. The numerical oscillator generates two functions of time: $\cos[2\phi_p(t)]$ and $\sin[2\phi_p(t)]$, in phase quadrature, wherein $\phi_p(t)$ represents a predicted phase which is a function of time. The function $\phi_p(t)$ is initially equal to zero at the time, $t_o$, when the numerical oscillator begins to oscillate; and at any subsequent time $\phi_p(t)$ is given by the integral $$\phi_p(t) = 2\pi U \int_{t_o}^{t} f_p(t')dt'$$

where $f_p(t')$ represents the instantaneous value of $f_p$ at an intervening time $t'$. The factor of $2\pi$ is necessary if, as is customary, the frequency $f_p$ is measured in units of cycles per unit of time and the phase $\phi_p$ is supposed to be measured in units of radians rather than cycles.

Now the correlator, operating between times $t_0$ and $t_1$, forms quantities a and b from its inputs [u(t)l(t)], $\cos[2\phi_p(t)]$ and $\sin[2\phi_p(t)]$, according to the formulas $$a = U\int_{t_0}^{t_1} u(t)l(t) \cos[2\phi_p(t)]dt$$

and $$b = U\int_{t_0}^{t_1} u(t)l(t) \sin[2\phi_p(t)]dt.$$

The time interval of integration, $t_1 - t_0$, is equal to 1 second, and the indicated integrations are performed each second. At each 1-second tick from the real-time clock, the values of the integrals are "strobed" into storage registers, the integrations are reset to zero, the numerical oscillator is restarted, and a new integration period begins. Thus, at the end of each second of time, the correlator delivers outputs a and b which represent the time-averages, over the preceding one-second interval, of the product u(t)l(t) $\cos[2\phi_p(t)]$ and the product u(t)l(t) $\sin[2\phi_p(t)]$ respectively. These outputs represent the correlations of the product u(t)l(t) with the cosine and sine functions.

During the 1-second interval, the oscillator frequency $f_p(t)$ is updated every 0.1 second by the computer, prompted by the 0.1-second "ticks" from the real-time clock. This updating is necessary because the satellite Doppler shift changes, due to the motion of the satellite relative to the field terminal on the ground, and the changing projection of the relative velocity along the line of sight, at a rate which may be a substantial fraction of 1 Hertz per second.

Now the correlator outputs a and b may be combined to obtain estimates of the power and the carrier phase of the signal from the particular satellite for which the prediction, $f_p(t)$, was made.

Define a complex number c whose real part is equal to a and whose imaginary part is equal to b. That is, $$c = a + jb$$

where j is the square root of minus one. Then $$c \simeq C <m^2> <\exp[2j(\phi - \phi_p)]>$$

where C is a positive, real, constant scale factor; $<m^2>$ is the time average, over the integration interval from $t_0$ to $t_1$, of the square of the GPS modulating function m(t); and $<\exp[2j(\phi - \phi_p)]>$ is the time average, over the same interval, of the complex exponential function $\exp[2j(\phi - \phi_p)]$. Provided that the difference, $(\phi - \phi_p)$, between the received GPS carrier signal phase, $\phi = \phi(t)$, and the corresponding prediction, $\phi_p = \phi_p(t)$, does not vary by a substantial fraction of a cycle during the integration time, then the magnitude of c is approximately proportional to the average received power:

$$vcv \equiv (a^2 + b^2)^{\frac{1}{2}} \simeq C <m^2>;$$

and the angle of c is approximately equal to twice the average phase difference, $(\phi - \phi_p)$.

$$jc \equiv \tan^{-1}(b/a) \simeq 2 <(\phi - \phi_p)>.$$

Note that from b and a, the angle of c is determined uniquely, modulo $2\pi$ radians. Thus, the difference $(\phi - \phi_p)$ is determined modulo $\pi$ radians.

In order for the received signal power and carrier phase (modulo $\pi$) to be determined accurately from a and b according to these formulas, two conditions must be satisfied: first, as mentioned, the actual phase, $\phi(t)$, must differ from the predicted phase, $\phi_p(t)$ by an amount that changes by much less than a cycle during the one-second integration time; second, the correlator output signal to noise ratio, given by $$SNR_c = (2/\pi)(\pi/4)(B_{eff}T_{int})^{\frac{1}{2}} F$$
$$= (\tfrac{1}{2})(B_{eff}T_{int})^{\frac{1}{2}} F,$$

must be much greater than one, where $B_{eff}$ is the effective bandwidth of the signals u(t) and l(t), equal to about $5 \times 10^5$ Hz; $T_{int}$ is the integration time, equal to 1 second, and F is the fraction of the power present in u(t) and l(t) that stems from the GPS m(t) signal, not from noise. The factor of $(2/\pi)$ accounts for the loss of correlation between u(t) and l(t) that is caused by the analog-to-digital conversion of these signals by the comparators in the signal conditioner. The factor of $(\pi/4)$ accounts for the loss associated with the use of square-wave approximations to the sine and cosine functions in the correlator. The square root of the $B_{eff}T_{int}$ product is equal to about 700. Therefore there is the relation:

$$SNR_c \simeq 350 \cdot F.$$

The fraction, F, of either-sideband power stemming from the GPS satellite depends on the receiving antenna gain and the receiving system noise figure. For the "MITES" antenna and the receiving system described above, and for a satellite elevation angle above 20°, it is known from experiment that F exceeds about 0.03. Therefore, $$SNR_c \gtrsim 10,$$

which is sufficient for accurate power and phase measurements. The standard deviation of the noise in each part, real and imaginary, of the complex quantity c is given by $$\sigma_c \simeq vcv / SNR_c.$$

The first-mentioned condition for accuracy in the measurements of the power and phase, namely that $(\phi - \phi_p)$ not vary by a substantial fraction of a cycle during the 1-second integration time, is equivalent to the condition that the difference between the actual received carrier frequency, f, and the local reference frequency, $f_o$, does not differ from the predicted (numerical oscillator) frequency, $f_p$, by a substantial fraction of 1 Hertz. This condition is satisfied in the present system by applying feedback control to the frequency of the numerical oscillator, to keep this frequency close to the actual received carrier frequency. This control is exercised by means of a simple program executed by the field terminal computer 1039. A description of this program follows.

The complex number c formed from the a and b correlator outputs at the end of the kth one-second integration interval is designated $c(t_k)$, where $t_k$ represents the time at the middle of that interval. To the numerical oscillator frequency for the (k+1)st interval is added a corrective bias of $$K \cdot j[c(t_k)c^*(t_{k-1})]/2\pi \text{ Hertz,}$$

where K is a positive real constant less than 1, j[] denotes the angle of the complex quantity enclosed by the brackets []; and $c^*(t_{k-1})$ is the complex conjugate of the complex number c from the next-preceding, (k−1)st interval.

The principle of operation of this program may be understood from the following example: If the frequency prediction is, say, too low by 0.1 Hertz, then the angle of c will advance by 0.1 cycle in 1 second, and the complex quantity $c(t_k)c^*(t_{k-1})$ will have an angle of $(+0.1) \times (2\pi)$ radians (plus some zero-mean noise). Addition of the bias, which is positive in this case, will reduce the magnitude of the negative error in the frequency prediction from (0.1 Hz) to $(1-K) \times (0.1$ Hz).

The value of K must be greater than zero or no reduction of a frequency prediction error will result from the feedback. The value must be less than 1 or the feedback will result in unstable oscillation of the error, due to the delay in applying the correction. The exact value is not critical, and the optimum value may be determined by experiment. A nominal value of 0.5 is used in the present system.

An important other effect of this frequency feedback is that the numerical oscillator frequency will be "pulled" toward the actual received carrier frequency from an initial frequency which may be as much as several Hertz above or below. This "pull-in" phenomenon is well known in the art of phase or frequency-tracking feedback loops, as discussed for example in the book entitled Phaselock Techniques, by Floy M. Gardner, published by John Wiley & Sons, Inc., New York, 1966.

The significance of the "pull-in" phenomenon for the present system is that a priori knowledge of the survey mark position does not need to have less than a few kilometers of uncertainty.

A potentially adverse side-effect of the "pull-in" phenomenon in the present system is that the numerical oscillator that is supposed to be tracking a particular satellite may instead be pulled to the frequency of a different satellite if the latter's frequency is near the former's, and if the latter's signal is strong in comparison with the former's. To limit the damage that might result from such occurrences, the field terminal computer program contains a provision that limits the magnitude of the accumulated bias that may be added to the a priori frequency prediction, to about 10 Hz. Since the difference between two satellites' frequencies changes, typically, by about 1 Hz per second, it follows that only about 10 seconds of measurement data, or less than about 1 percent of the total data obtained at a field site, may be invalidated by tracking of a wrong satellite. Experience indicates that this percentage is insignificant.

Figure 22:
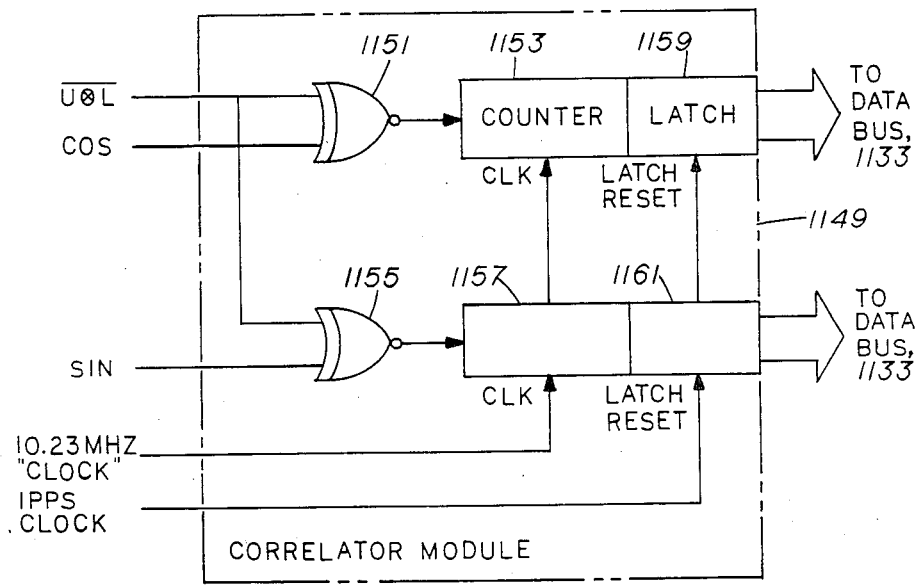
FIG. 22 is a block diagram of one of the correlator modules in the correlator assembly shown in FIG. 20.

Now referring to FIG. 22, we see a block diagram of a correlator module 1149, one of the seven identical such modules in the correlator assembly 1127. All seven modules have the same input U⊗L, which is the U⊗L output of the signal conditioner 1125. Each module 1149 also receives a "cosine" input and a "sine" input from a corresponding one of the seven numerical oscillator modules. The U⊗L input and the cosine input go to an exclusive-nor gate 1151 whose output is the input to a "clocked" digital counter 1153. The U⊗L input and the sine input go to another exclusive-nor gate 1155 whose output is the input to another counter 1157. Once per second, the contents of the counter registers 1153, 1157 are latched in respective output buffers 1159, 1161 by a pulse from the real time clock 1131 in the digital electronics assembly 1037, and the counters are then reset to zero. At a rate of 10.23 MHz, governed by the "clock" signal from the signal conditioner 1125, each counter 1153, 1157 increments by one if and only if its input, from its associated exclusive-nor gate 1151, 1155, is "True". Thus, at the end of each one-second interval, the output buffer 1159, 1161 contents indicate the number of times, between zero and 10,230,000, that the U⊗L and the cosine/sine inputs matched during the preceding 1 second. The output buffer 1159, 1161 contents of each counter are connected to the data bus 1133, through which the field terminal computer 1039 reads the contents each second. Each counter/latch may be a single integrated circuit such as the 1032-bit device, model no. LS7060, made by LSI Systems, Inc.

The quantity a, defined previously by the crosscorrelation between [u(t)l(t)] and cos [2$\phi_p$(t)] is obtained in the field terminal computer 1039 by subtracting 5,115,000 from the output of the "cosine" counter and dividing the result by 5,115,000. The quantity b is obtained similarly to subtracting 5,115,000 from the "sine" counter output and dividing the result by 5,115,000. (Thus, unit magnitude of a or b represents perfect correlation between [u(t)l(t)] and the cosine or the sine function, respectively. Before these results are stored in the memory of the field terminal computer 1039, each number may be truncated to as few as 4 bits in order to conserve memory space.)

Now referring to FIG. 23, there is illustrated a block diagram of one of the seven identical numerical oscillator modules 1163 in the numerical oscillator assembly 1129, each of which 1163 furnishes a "cosine" and a "sine" input to one correlator module 1149. Each numerical oscillator 1163 comprises a binary phase register 1167 and a binary frequency register 1169; a binary adder 1171; an exclusive-nor gate 1173; an inverter 1175; and a frequency divider 1177.

The phase register 1167 and the frequency register 1169 each have 32 bits, and the adder 1171 is a 32-bit adder. The binary number contained in phase register 1167 at any time represents the phase of the oscillator output, with the most significant bit representing one-half cycle, the next-most significant bit representing one-quarter cycle, and so on. The binary number contained in frequency register 1169 similarly represents the frequency of the oscillator, with the most significant bit in this case having a value of 155,000 Hz, equal to 1/66th cycle per period of the 10.23 MHz "clock" signal from the signal conditioner 1125. Adder 1171 adds together the numbers contained in the frequency and phase registers 1169 and 1167, respectively. The sum is loaded into the phase register 1167, replacing the previous contents, once per cycle of the output from divider 1177, which divides the 10.23 MHz "clock" signal by a fixed factor of 33. Phase register 1167 is thus updated at a rate of exactly 310,000 times per second. The amount by which the phase advances upon each update is given by the contents of the frequency register 1169. The frequency register 1169, as mentioned, is updated 10 times per second via the data bus 1133 by the field terminal computer 1039. (Negative as well as positive frequencies are represented by the contents of the frequency register, using the conventional twos-complement method. According to this invention, the negative of a binary number is formed by complementing each bit, then adding one. The largest positive number is accordingly represented by having the most significant bit zero, and all other bits ones. The most significant bit being one implies that the number is negative.)

The sine output of the numerical oscillator 1163 is obtained from inverter 1175 which inverts the most significant bit of the phase register 1167. The sine output has a value of one when the phase is between zero and plus one-half cycle, and a value of zero when the phase is between one-half and one cycle (which is the same as the phase being between minus one-half and zero cycles). The cosine output of the numerical oscillator 1163 is taken from the exclusive-nor gate 1173 whose inputs are the most and the next-most significant bits of the phase register. The cosine output has a value of one when and only when the phase is within plus or minus one-quarter cycle of zero.

Figure 24:
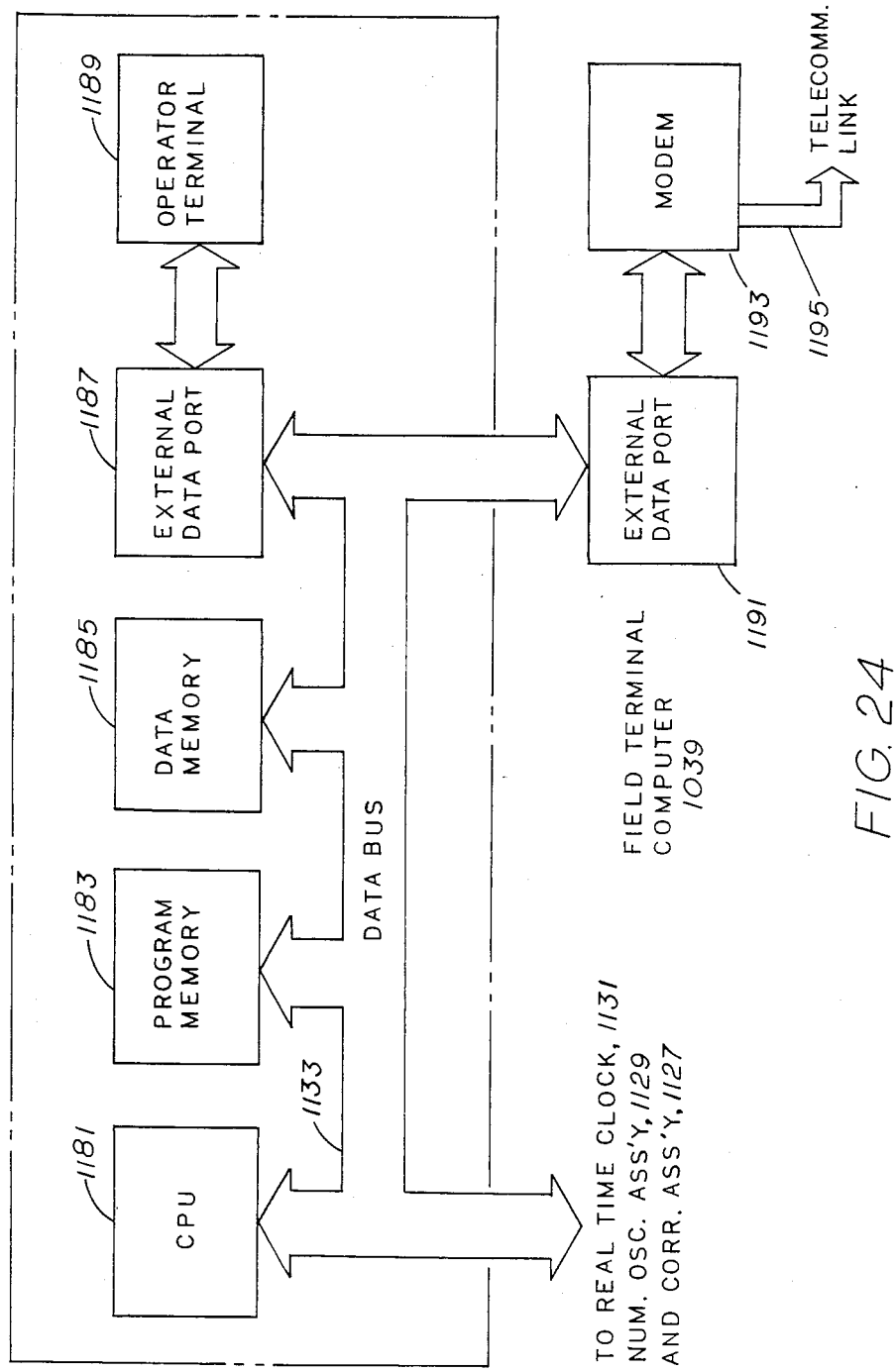
FIG. 24 is a block diagram of the field terminal computer shown in FIG. 17.

Now referring to FIG. 24, there is shown a block diagram of the field terminal computer 1039. The computer comprises a central processing unit (CPU) 1181, a program memory 1183, a data memory 1185, an external, bi-directional data port 1187 which is connected to an operator terminal 1189, and an external, bi-directional data port 1191 which is connected to a modulator-demodulatur (modem) 1193 which is in turn connected to a telephone line, a radiotelephone, or some other telecommunications link 1195. The parts of the computer 1039 are interconnected by means of a data bus 1133, which also serves to connect computer 1039 to other parts of the field terminal (see FIG. 20).

CPU 1181 may be a Digital Equipment Corporation (DEC) model LSI-11/2 (part number KD11-GC); program memory 1183 may be a 32K byte programmable read-only memory such as DEC part number MRV11-C; data memory 1185 may be a 32 K byte, random-access, read-write memory such as DEC part number MXV11-AC; the two external bi-directional data ports (1187 and 1191) may be the RS-232 serial data ports which are included in the MXV11-AC; operator terminal 1189 may be the DEC model VT-100 or any equivalent serial ASCII terminal which, like the VT-100, can be connected to the RS-232 serial data interface of the MXV11-AC, or through any other suitable external data port device to the computer; modem 1193 may be any standard, RS-232 compatible, device, and may be eliminated completely if, as mentioned, the field terminal computer 1039 is connected directly to the base terminal computer 1015. The data bus 1133 may be the LSI-11 Q-bus. The real-time clock 1131, the numerical oscillator assembly 1129, and the correlator assembly 1127 may be connected to the Q-bus by constructing them on standard circuit cards that plug directly into the card-edge connectors of the "backplane" of an LSI-11 computer system. Such circuit cards are available from DEC equipped with special integrated circuits that can handle all data communication between the Q-bus and the special terminal circuits which are constructed on the cards.

The measurement data stored in the memory 1185 of the field terminal computer 1039 comprise a time series of complex numbers for each of up to seven satellites observed, with one such number being obtained each second of time. These data are obtained for a time span of about 5,000 seconds, during which at least two satellites are always observed, with the average number of satellites observed being at least four. For the ith satellite at the time t, the complex datum is designated $A_i(t)$, where the magnitude of this complex number is proportional to the measured power of the signal received from that satellite at that time, the constant of proportionality being arbitrary but the same for all satellites, and where the angle of the complex number is equal to twice the carrier phase measured for the same satellite at the same time, with the phase for each satellite being referred to the same local reference oscillator signal, namely the 1575.42 MHz signal generated by the oscillator circuit 1035 of the field terminal 1013-1.

The complex data $A_i(t)$, $i=1, \ldots, 7$, are derived by the field terminal computer 1039 from the a and b outputs of the seven correlators 1149 in the correlator assembly 1127 as follows. For the ith correlator, $$A_i(t) = [a(t) + jb(t)] \exp[2j\phi_p(t)],$$

where a(t) and b(t) represent, respectively, the normalized a and b outputs for the 1-second "integration," or counting, interval centered at the time t; j is the square root of minus one; and $2\phi_p(t)$ is twice the predicted carrier phase of the ith satellite at the time t. Note that the complex number $A_i(t)$ is equal to the complex number c derived from the ith correlator output, multiplied by $\exp[2j\phi_p(t)]$. The angle of $A_i$ represents (twice) the received carrier phase referred to (twice) the phase of the 1575.42 MHz local reference, whereas the angle of c is referred to (twice) the sume of that reference oscillator phase plus the numerical oscillator phase.

For the purpose of this explanation, it is considered that the data set $\{A_i(t)\}$ is the one generated by the field terminal 1013-1 which is at the origin of the baseline vector. The other field terminal 1013-2, that is the field terminal at the terminus of the base line vector, observing the same satellites at the same times as the first terminal, yields data corresponding to $A_i(t)$, designated $B_i(t)$. The same satellites are observed because both terminals were given prediction data from the same central computer 1015, which numbered the satellites 1 through 7 in just one way. The observations at the two terminals are effectively simultaneous because the two terminals' clocks were synchronized immediately prior to the observations, and the clock rates differ by a trivial amount. (The principal effect of the rate difference between the crystal oscillators that govern the rates of the clocks is to vary the phase difference between the 1575.42 MHz references.) It will not matter if, at a particular time, a particular satellite is visible from one terminal but hidden from the other. The magnitude of either $A_i(t)$ or $B_i(t)$ in this case will simply be zero, or nearly so.

The operations performed by the central computer 1015 in order to complete the determination of the baseline vector, given the power and phase measurement data collected from two field terminals 1013-1 and 1013-2 located at the ends of the baseline vector, will now be discussed.

The first step in the processing of the $A_i(t)$ and the $B_i(t)$ data in the central computer is to multiply the complex of $A_i(t)$, denoted by $A_i^*(t)$, by $B_i(t)$. The product $$S_i(t) = A_i^*(t) B_i(t),$$

has an angle, $jS_i(t)$, equal to twice the difference between the measured phases of the carrier signals received from the ith satellite at the two terminals, each phase having been with respect to the local reference oscillator in the respective terminal. Accordingly, the angle of $S_i(t)$ is related to the difference between the phases of the local oscillators and to the baseline vector between the terminals by the theoretical relation $$jS_i(t) \approx \Delta\phi_{LO} + (4\pi f_i/c)\vec{b}\cdot\vec{s}_i(t),$$

wherein $\Delta\phi_{LO}$ represents the local-oscillator phase difference, $f_i$ is the received frequency for the ith satellite, nearly equal to 1575.42 MHz, c is the speed of light, $\vec{b}$ is the baseline vector, and $s_i(t)$ is a unit vector in the direction of the ith satellite as viewed at the time t from the midpoint of the baseline vector. (This relation yields the angle $jS_i(t)$ in radians rather than cycles. Since the frequency $f_i$ is specified in cycles, rather than radians, per second, a factor of $2\pi$ must be included. The reason that $4\pi$, rather than $2\pi$, appears here is that each field terminal measures twice the received signal phase.) This relation is approximate inasmuch as it ignores second-order parallax, effects of the propagation medium, multipath, relativistic effects, noise, etc. These small effects are neglected here for the sake of clarity. The error associated with the neglect of these effects is equivalent to a baseline error of less than about 1 cm for a baseline length of less than about 1 km. [Except for the effect of noise, which is completely random, it is possible to model the effects which we have neglected above, in order to obtain a more accurate theoretical representation of $jS_i(t)$. This modeling is described, for example, in the article by I. I. Shapiro entitled "Estimation of astrometric and geodetic parameters from VLBI observations," appearing in Methods of Experimental Physics, vol. 12, part C, pp. 261–276, 1976.]

Theoretically, the magnitude of S is given by $$vS_iv = C \cdot G^2 (\cos \theta_i),$$

where C is a constant and G is the directive power gain of a receiving antenna, writen as a function of the cosine of the ith satellite's zenith angle $\theta_i$. G is assumed to be independent of azimuth, and is normalized such that the power received by an isotropic antenna of matched circular polarization is equal to 1. For the MITES antenna design, $$G(\cos\theta) \simeq (1.23) \cdot (1 + \cos\theta)^2 \cdot \sin^2((3\pi/4)\cos\theta), 0° \leq \theta \leq 90°;$$

$$G(\cos\theta) = 0, 90° \leq \theta.$$

The value of this function is approximately 2.46 at the zenith ($\theta=0$); it has one maximum, of about 3.63, at $\theta \simeq 40°$, has unit value at $\theta \simeq 72°$, and approaches 0 as $\theta$ approaches 90°.

The next step in the processing of the measurement data obtained from the two terminals is to sum the complex numbers $S_i(t)$ over i to obtain a sum $S(t)$ for each measurement time t:

$$S(t) = \sum_{i=1}^{n} S_i(t),$$

wherein the sum ranges over all the satellites that were observed at the time t.

The next step in the processing of the measurement data is to choose a trial value, $\hat{b}$, of the baseline vector $b$, and from this value $\hat{b}$ to compute a function of time $S(t)$ which represents theoretically the value that $S(t)$ would have had if the true value, $\ddot{b}$, of the baseline vector were equal to the trial value, $\hat{b}$:

$$\hat{S}(t) = \sum_{i=1}^{n} \nu A_i(t)\nu \cdot \nu B_i(t)\nu \cdot \exp[-j4\pi \hat{b} \cdot \ddot{s_i}(t)/\lambda_i]$$

wherein $\lambda$ is the radio wavelength corresponding to the received carrier frequency. That is, $\lambda_i = c/f_i$. The method of choosing a value of $\hat{b}$ is described below. Note that in the theoretical function $S(t)$, as opposed to the measurement-derived function $S(t)$, no term is present to represent the local-oscillator phase difference. Also, the constant scale factor C is omitted.

Next, the magnitude of $S(t)$ is multiplied by the magnitude of $S(t)$ and the product of these magnitudes is summed over all of the measurement times to obtain a value, $R(\hat{b})$, that depends on $\hat{b}$ as well, of course, as on the measurements:

$$R(\hat{b}) = \sum_{l} \nu S(t_l) \nu \cdot \nu \hat{S}(t_l) \nu,$$

wherein $t_l$ represents the lth of the set of about 5,000 measurement times. $R(\hat{b})$ is called an "ambiguity function."

The next step in the processing is to repeat the computation of $R(\hat{b})$ for various values of $\hat{b}$ and to determine the particular value of $\hat{b}$ for which the function of $R(\hat{b})$ has the greatest value. This value of $\hat{b}$ is the desired determination of the baseline vector $\ddot{b}$.

The trial value $\hat{b}$ of the baseline vector is chosen initially to equal the best a priori estimate of $\ddot{b}$ that is available from independent information on the positions of the survey marks, such as the positions obtained by identifying landmarks on a map. The maximization of $R(\hat{b})$ with respect to $\hat{b}$ is conducted by searching a three-dimensional volume that is centered on this initial value of $\hat{b}$ and is large enough to encompass the uncertainty of the initial estimate. In the search, every point of a uniformly spaced three-dimensional grid is examined to locate the one point at which $R(\hat{b})$ is maximum. The grid spacing is initially 1 meter. Then the volume extending 2 meters from that one point of maximum $R(\hat{b})$ is searched by examining a grid with 20 centimeter spacing. The maximum of $R(\hat{b})$ is found on this more finely spaced grid. Then the grid spacing is halved and the linear extent of the grid is also halved, and the search is repeated. This process of halving is continued until the grid spacing is under 1 millimeter. The value of b that finally maximizes $R(\hat{b})$ is taken to be the desired determination of the baseline vector $\ddot{b}$. By using a number of satellites n equal to 5, a baseline vector determination can be obtained by the method of the present invention with an accuracy of about 5 millimeters in each coordinate for a baseline length of about 100 meters.

In another embodiment of a method of processing measurement data according to this invention, an ambiguity function $R(\hat{b})$ is also formed from the measurement data and from a trial value, $\hat{b}$, of the baseline; however, the method of forming the function is different. In this embodiment, as in the previous embodiment, the complex conjugate of $A_i(t)$ is multiplied by $B_i(t)$ to obtain a complex product $S_i(t)$:

$$S_i(t) = A_i^*(t)B_i(t)$$

wherein $A_i(t)$ is a complex number representative of the measurements of the signal received from the ith satellite at one terminal at the time t, the magnitude of $A_i(t)$ being proportional to the power received and the angle $jA_i(t)$ being twice the phase of the carrier relative to the local oscillator of the terminal, and $B_i(t)$ is like $A_i(t)$ except that it is derived from the other terminal, at the other end of the baseline vector.

Next, $S_i(t)$ is multiplied by a certain complex exponential function of a trial value, $\hat{b}$, of the baseline vector, and the product is then summed over all satellites observed at the time t to obtain a sum $S(t)$ which is a function of the time and of the trial value, $\hat{b}$:

$$S(t) = \sum_{i=1}^{n} S_i(t) \exp[-j4\pi \hat{b} \cdot \ddot{s_i}(t)/\lambda_i]$$

wherein $s_i(t)$ is a unit vector in the direction of the ith satellite at the time t and $\lambda_i$ is the wavelength of the signal received from the ith satellite. (Note that if $\hat{b}$ equals $\ddot{b}$, then the angle of each term in the sum over i is equal to $\Delta\phi_{LO}$, independent of i.)

Next, the magnitude of $S(t)$ is taken and is summed over all observing times to obtain the function $R(\hat{b})$:

$$R(\hat{b}) = \sum_{l} \nu S(t_l) \nu,$$

wherein $t_l$ is the lth of the approximately 5,000 measurement times.

Finally, the value of $\hat{b}$ which maximizes $R(\hat{b})$ is found, by the same search procedure that was described in connection with the original data-processing method. This value of $\hat{b}$ is the desired determination of the baseline vector $\ddot{b}$. This latter embodiment is more efficient computationally than the first described embodiment.

4. THE PREFERRED MULTI-ANTENNA EMBODIMENT

FIG. 25

Figure 25:
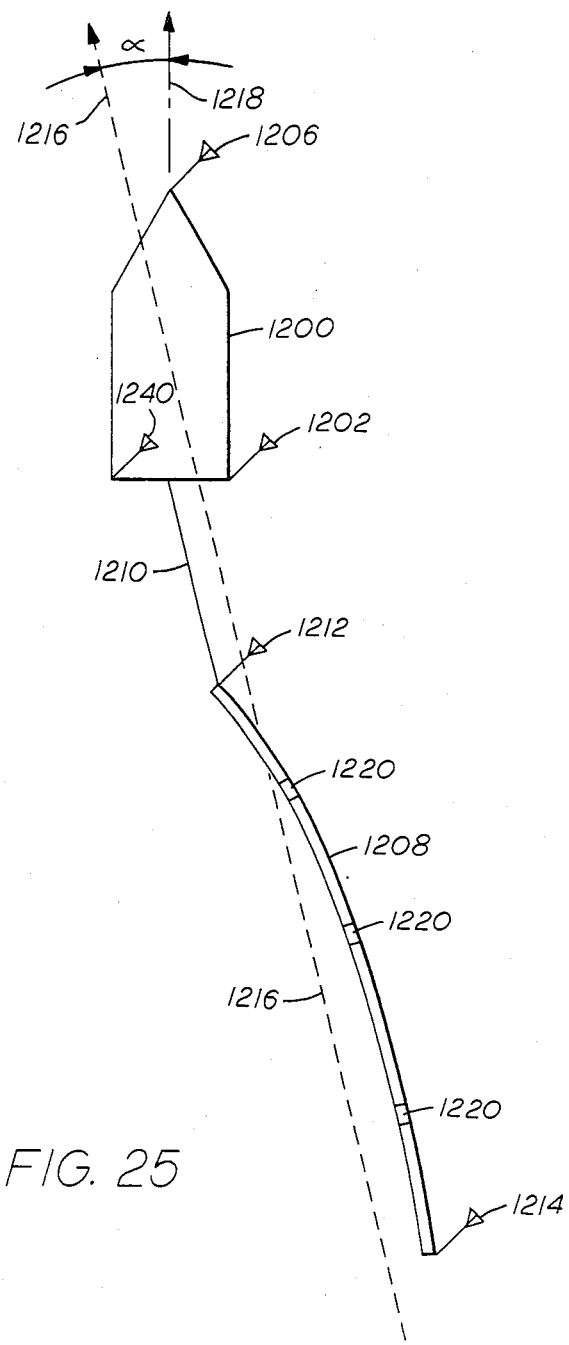
FIG. 25 illustrates a system for determining ship and streamer position information using signals from GPS satellites, received on a ship and on a streamer towed thereby, in accordance with a preferred embodiment of the present invention.

Now referring to a preferred multi-antenna embodiment of the present invention, a system for determining ship and towed sensor position using radio signals from GPS satellites is disclosed in FIG. 25.

The system disclosed in FIG. 25 utilizes the components of the single antenna system disclosed in FIGS. 1 through 15 and additional components such as additional antennas and satellite tracking channels.

As shown in FIG. 25, seismic survey vessel 1200 may be provided with a plurality of antennas, substantially similar in design and function to antenna 22, such as ship's antennas 1202, 1204 and 1206. Seismic survey vessel 1200 tows seismic streamer cable 1208 by means of tow cable 1210 connected therebetween. Seismic streamer cable 1208 is provided with a pair of antennas similar to antenna 22, shown as streamer antennas 1212 and 1214.

Ship's antennas 1202, 1204 and 1206 may conveniently be positioned on the deck of seismic survey vessel 1200 at the points of a triangle to best define a planar surface representing the deck. As shown in FIG. 25, ship's antennas 1202 and 1204 are positioned at the port and starboard stern, respectively, while ship's antenna 1206 is positioned at the bow. Streamer antennas 1212 and 1214 may conveniently be mounted upon floating buoys, not shown, conventionally placed at the leading and trailing ends of seismic streamer cable 1208.

The exact location of the antennas may be dictated by the configuration of the ship and/or streamer as well as by the requirements of the mission at hand. For example, additional antennas may be required at other points along seismic streamer cable 1208 if the exact shape of the cable must be known for a particular survey.

Means are provided for connecting ship's antennas 1202, 1204 and 1206 and streamer antennas 1212 and 1214 to terminal 23, shown in FIG. 1. Corresponding additional receivers 24 and sets of satellite tracking channels 32 may be included in terminal 23 to generate measurements related to the signals received by the additional antennas.

Alternatively, time-division multiplexing means, not shown, may be incorporated in terminal 23, whereby signals from the various antennas are successively switched to terminal 23, and terminal 23 may operate on the signals from the different antennas during corresponding time intervals. A multiplexing interval of about 20 milliseconds would be convenient with the system described in FIGS. 1 through 16 modified to use the five antenna shown in FIG. 25.

The multiple antennas may conveniently be connected to terminal 23 by means of coaxial or fiber optical cable including, in part, cable provided within seismic streamer cable 1208.

The use of multiple antennas 22, such as ship's antennas 1202, 1204 and 1206 and streamer antennas 1212 and 1214, in conjunction with terminal 23 provides several benefits. One benefit is that a satellite signal could be received by one antenna while the view of the satellite from another antenna was obstructed.

Even if a satellite were simultaneously in view of more than one antenna, the simultaneous availability of observations from the plurality of antennas is very useful for other reasons. One use would be to combine the observations from different antennas to determine the relative position or baseline vector between any two ship's antennas 1202, 1204 and 1206 to derive information related to the orientation of ship 1200.

If information on the orientation of ship 1200 is available, from any source such as the use of multiple antennas 22 described above or from other means such as the ship's compass or an inertial navigation system on ship 1200, this orientation information may be combined with the observations from ship's antennas 1202, 1204 and 1206 to distinguish the signals which came directly from the satellite from other, undesired, signals which had been reflected from ship 1200 or from the sea surface.

In effect, any pair of ship's antennas 1202, 1204 and 1206 forms an interferometer. The baseline vector of the interferometer could be computed by real time computer 40 from the position and orientation information, as mentioned above. The expected fringe phase of the signal received from each satellite, that is the difference between the phases of the signals received simultaneously at the ends of the baseline from the satellite, may be computed from knowledge of the baseline vector and the direction of the satellite.

Similarly, the fringe phase may be computed for the same interferometer receiving a reflected signal. In the latter case, the actual position of the satellite would be replaced in the calculation with the position of the satellite's reflected image. The position of the image could be computed from knowledge of the reflecting surface, which might be a surface of ship 1200 such as the main deck, or the sea surface.

Based on such calculations of the fringe phases for both direct and reflected signals, a linear superposition of the complex signals received from both ship's antennas may be formed with the complex signal combination coefficients computed such that in the combined signal, the reflected-signal contributions canceled, leaving the desired, direct-signal contributions. This superposition to reject reflections must be done on a satellite-specific basis. Separate phase data are available for each satellite. The superposition must also of course be done on a continually time-varying basis.

In other words, an interferometer or set of interferometers, formed by a plurality of single antenna elements may be regarded as phased array antenna forming a beam with one or more nulls. The direction of a null can be steered relative to a coordinate frame fixed with respect to the array, by varying the relative phases and amplitudes with which the signals from individual antennas are combined.

A null can be aimed at the direction from which a reflected signal is expected to arrive, based on knowledge of the relative geometry of the satellite, the reflecting surface, and the array of antennas. Thus, a reflected signal can be rejected. The computations required to accomplish this rejection may be performed by real time computer 40 with multiple antennas 22 connected to terminal 23.

In addition to determining the position and orientation of seismic survey vessel 1200 by means of ship's antennas 1202, 1204 and 1206, multiple streamer antennas 1212 and 1214 can be utilized to determine the exact position of sensors 1220, positioned in and along seismic streamer cable 1208. Seismic streamer cable 1208 does not often lie along seismic survey track 1216, the seismic track desired to be surveyed.

The physical effects of wind and sea currents, as well as intentional changes in ship's direction, often require seismic survey vessel 1200 to be steered along heading 1218 which differs from seismic survey track 1216, its desired heading, by an angle sufficient to compensate for these effects. Tow cable 1210 is also affected by these effects, as is seismic streamer cable 1208, by different amounts which change with time. As can be seen in FIG. 25, this results in the positioning of sensors 1220, within seismic streamer cable 1208 along the shape of seismic streamer cable 1208 which is not necessarily the same as seismic survey track 1216, the desired positioning of the sensors.

Knowledge of the exact positions of sensors 1220 during a seismic survey is becoming more important as a result of the emergence of more sophisticated survey techniques such as 3-D. These techniques utilize information collected at a particular point to clarify or enhance the information collected by the sensors at another point. Such enhancement requires accurate knowledge of the positions of the sensors at all times during a survey.

The shape of seismic streamer cable 1208, and therefore the positions of sensors 1220, during a particular seismic survey may be modeled in Kalman filter 703, shown above in FIG. 15. Streamer shape may determined in Kalman filter 703 during or after the survey from knowledge of the positions of the leading and trailing ends of seismic streamer cable 1208, the relevant physical effects, such as ship's speed and orientation, wind and sea currents, and the expected physical characteristics of seismic streamer cable 1208.

The relevant physical effects are provided to real time computer 40 via ship position and velocity information 50, as shown in FIG. 2. The positions of the leading and trailing edges of seismic streamer cable 1208 may be determined by real time computer 40 from that portion of measurements 42, also shown in FIG. 2, related to streamer antennas 1212 and 1214 as discussed below in greater detail.

The physical characteristics of seismic streamer cable 1208 are included in external information 707 provided to Kalman filter 703 as shown in FIG. 15. These characteristics may be derived from a knowledge of the physical structure of seismic streamer cable 1208 or empirically from testing under similar conditions.

Although measurements 42 may include the same observables for streamer antennas 1212 and 1214 as provided for other similar antennas 22, it may be more efficient and cost effective to provide only C/A code group delay observable $\tau$, as shown in FIG. 15, for each such streamer antenna 1212 and 1214. In fact, it may be convenient to provide all observables for only one antenna, such as antenna 22, and provide only C/A code group delay observable $\tau$, for each other antenna. This is efficient because differential effects of ionospheric refraction between antenna 22 and any other ship or streamer antenna are negligible. However, for the purpose of canceling reflected signals as described above, the L1 center frequency carrier phase observable $\phi$ should be provided in addition to $\tau$, for the shipboard antennas.

I claim:

1. A method of determining ship towed sensor position information from code modulated, overlapping spread spectrum signals transmitted by a plurality of GPS satellites and modulated by satellite specific codes, comprising the steps of:

receiving a first composite of satellite signals related to ship position;

forming identical, synchronous, digital representations of the composite in a plurality of satellite tracking channels;

developing estimates in each tracking channel of group delay and phase delay, with respect to a common time base, of a satellite specific, code modulated component of the composite;

detecting a component in each channel by logical combination of the composite representation with a model of the component generated synchronously from the common time base in accordance with the estimates;

updating the estimates in accordance with the detected components to form time series of phase and group delay observations for each channel;

receiving a second composite of satellite signals related to sensor position;

forming a digital representations of the second composite;

developing an estimate of delay, with respect to the common time base, of a satellite specific, code modulated components of the second composite;

detecting said component by logical combination of the second composite representations with a model of the component generated synchronously from the common time base in accordance with the related estimate;

updating the estimate in accordance with the detected component to form time series of observations related to the second composite; and processing the observations to determine sensor position.

2. The method of claim 1 further comprising:

updating the group delay estimate in response to changes of a predetermined magnitude in phase delay.

3. The method of claim 2 wherein the observation processing step further comprises:

deriving times series of instantaneous sensor position information by time averaging the observations over intervals long enough to include sensor position changes due to ship motion.

4. The method of claim 3 wherein the time averaging step further comprises:

taking differences between observations;

determining the average of the differences over a time period sufficiently long to include a plurality of independent observations from each time series; and determining instantaneous sensor position information from the observations and the averaged differences therebetween.

5. The method of claim 4 wherein the sensor position information is determined from the difference between the phase observations and the averaged differences.

6. The method of claim 1 further comprising the steps of:

continuously monitoring an aspect of the detection to develop an indication of the validity thereof; and inhibiting the updating of a particular estimate in response to the related validity indication.

7. The method of claim 6 wherein the estimate updating step further comprises:

changing the group delay observations by a predetermined magnitude whenever a change in the group delay of the related component is detected.

8. The method of claim 7 further comprising:
adjusting the group delay estimate by a predetermined magnitude in response to changes of the same magnitude in the phase observations, uninhibited by the validity indication.

9. The method of claim 8 further comprising the steps of:
forming a time series of observations from a third composite of satellite signals related to another aspect of sensor position.

* * * * *

UNITED STATES PATENT AND TRADEMARK OFFICE
CERTIFICATE OF CORRECTION

PATENT NO. : 4,809,005
DATED : Feb. 28, 1989
INVENTOR(S) : Charles C. Counselman, III It is certified that error appears in the above-indentified patent and that said Letters Patent is hereby corrected as shown below:

Title page, item [54], the word "GAS" should be --GPS--

Signed and Sealed this

Second Day of April, 1996

Attest:

BRUCE LEHMAN

Attesting Officer

Commissioner of Patents and Trademarks